United States Patent
Smith et al.

(10) Patent No.: US 12,017,443 B2
(45) Date of Patent: Jun. 25, 2024

(54) INTERLAYER AND LAMINATE WITH CONTROLLED DEBONDING ZONE TREATMENTS WITH ENHANCED PERFORMANCE

(71) Applicant: Kuraray America, Inc., Wilmington, DE (US)

(72) Inventors: Charles Anthony Smith, Vienna, WV (US); Stephen John Bennison, Wilmington, DE (US)

(73) Assignee: Kuraray Europe GmbH, Hattersheim am Main (DE)

( * ) Notice: Subject to any disclaimer, the term of this patent is extended or adjusted under 35 U.S.C. 154(b) by 272 days.

(21) Appl. No.: 17/328,423

(22) Filed: May 24, 2021

(65) Prior Publication Data

US 2021/0362468 A1    Nov. 25, 2021

Related U.S. Application Data

(60) Provisional application No. 63/191,518, filed on May 21, 2021, provisional application No. 63/191,447, (Continued)

(51) Int. Cl.
  *B32B 7/06*     (2019.01)
  *B32B 7/12*     (2006.01)
  (Continued)

(52) U.S. Cl.
  CPC .............. *B32B 7/06* (2013.01); *B32B 7/12* (2013.01); *B32B 17/06* (2013.01); *C09J 7/203* (2018.01);
  (Continued)

(58) Field of Classification Search
  CPC ... B32B 7/06; B32B 7/12; B32B 17/06; C09J 2301/21; C09J 2301/20; C09J 2301/204; C09J 2400/143
  See application file for complete search history.

(56) References Cited

U.S. PATENT DOCUMENTS

| | | | |
|---|---|---|---|
| 3,344,014 | A | 9/1967 | Watkin |
| 3,404,134 | A | 10/1968 | Watkin |

(Continued)

FOREIGN PATENT DOCUMENTS

| | | | |
|---|---|---|---|
| CA | 2388107 | A1 | 5/2001 |
| EP | 1235683 | A1 | 9/2002 |

(Continued)

OTHER PUBLICATIONS

U.S. Appl. No. 62/333,371, filed May 9, 2016.
U.S. Appl. No. 62/414,015, filed Oct. 28, 2016.

*Primary Examiner* — Joanna Pleszczynska
(74) *Attorney, Agent, or Firm* — Element IP, PLC

(57) ABSTRACT

The present invention relates to a laminate structure comprising an adhesive polymeric interlayer (API) that comprises discrete zones. Such discrete zones are located at the interface of the API and the glass substrate. Generally, the discrete zones comprise two sets of discrete zones, debonding and adhesive. These zones allow for a unique combination of modified API-glass debonding, laminate toughness, and laminate durability. Various spatial patterns and densities of debonding are described, as well as the resulting material properties.

26 Claims, 10 Drawing Sheets

Related U.S. Application Data filed on May 21, 2021, provisional application No. 63/191,486, filed on May 21, 2021, provisional application No. 63/191,577, filed on May 21, 2021, provisional application No. 63/191,545, filed on May 21, 2021, provisional application No. 63/155,009, filed on Mar. 1, 2021, provisional application No. 63/126,135, filed on Dec. 16, 2020, provisional application No. 63/028,782, filed on May 22, 2020.

(51) Int. Cl.
*B32B 17/06* (2006.01)
*C09J 7/20* (2018.01)
*C09J 7/29* (2018.01)

(52) U.S. Cl.
CPC ............ *C09J 7/29* (2018.01); *C09J 2301/204* (2020.08); *C09J 2301/21* (2020.08); *C09J 2400/143* (2013.01); *C09J 2431/005* (2013.01)

(56) References Cited

U.S. PATENT DOCUMENTS

| | | | |
|---|---|---|---|
| 3,445,423 A | 5/1969 | Sunshine et al. | |
| 3,505,160 A | 4/1970 | Michaels et al. | |
| 3,607,178 A | 9/1971 | Dennison et al. | |
| 3,881,043 A | 4/1975 | Rieser et al. | |
| 4,292,372 A | 9/1981 | Moynihan | |
| 4,668,574 A * | 5/1987 | Bolton | B32B 17/10743 428/339 |
| 5,028,674 A | 7/1991 | Hatch et al. | |
| 5,342,653 A | 8/1994 | Simon et al. | |
| 5,478,412 A | 12/1995 | Simon et al. | |
| 5,547,736 A | 8/1996 | Simon et al. | |
| 5,908,704 A * | 6/1999 | Friedman | B32B 17/1055 428/192 |
| 6,500,888 B2 | 12/2002 | Baumgartner et al. | |
| 6,518,365 B1 | 2/2003 | Powell et al. | |
| 6,749,707 B2 | 6/2004 | Saksa | |
| 7,121,380 B2 | 10/2006 | Garnier et al. | |
| 7,351,468 B2 | 4/2008 | Smith et al. | |
| 7,445,683 B2 | 11/2008 | Pesek et al. | |
| 7,642,307 B2 | 1/2010 | Wong et al. | |
| 7,763,360 B2 | 7/2010 | Paul et al. | |
| 7,951,865 B1 | 5/2011 | Paul et al. | |
| 7,960,017 B2 | 6/2011 | Pesek et al. | |
| 7,989,083 B2 | 8/2011 | Morikawa et al. | |
| 8,329,793 B2 | 12/2012 | Rymer et al. | |
| 8,334,033 B2 | 12/2012 | Hausmann et al. | |
| 8,399,096 B2 | 3/2013 | Hausmann et al. | |
| 8,399,097 B2 | 3/2013 | Bennison et al. | |
| 8,399,098 B2 | 3/2013 | Bennison et al. | |
| 8,741,439 B2 | 6/2014 | Shimamoto et al. | |
| 8,883,317 B2 | 11/2014 | Matsuda et al. | |
| 10,022,908 B2 | 7/2018 | Cui et al. | |
| 2010/0239802 A1 | 9/2010 | Kuwahara et al. | |
| 2012/0204940 A1 | 8/2012 | Asanuma et al. | |
| 2013/0183507 A1 | 7/2013 | Matsuda et al. | |
| 2016/0167348 A1 | 6/2016 | Bennison et al. | |
| 2016/0214352 A1 | 7/2016 | Yoshida et al. | |
| 2016/0214354 A1 | 7/2016 | Yoshida et al. | |
| 2017/0072665 A1 | 3/2017 | Iwamoto et al. | |
| 2017/0217132 A1 | 8/2017 | Iwamoto et al. | |
| 2017/0253704 A1 | 9/2017 | Yoshida | |
| 2017/0320297 A1 | 11/2017 | Bennison et al. | |
| 2018/0117883 A1 | 5/2018 | Olson et al. | |
| 2019/0030863 A1 | 1/2019 | Smith | |
| 2020/0251082 A1 | 8/2020 | Smith et al. | |

FOREIGN PATENT DOCUMENTS

| | | |
|---|---|---|
| JP | 2007-091491 A | 4/2007 |
| JP | 2009-256128 A | 11/2009 |
| JP | 2012-214305 A | 11/2012 |
| WO | WO 2003/033583 A1 | 4/2003 |
| WO | WO 2014/100313 A1 | 6/2014 |
| WO | WO 2015/013242 A1 | 1/2015 |
| WO | WO 2015/085165 A1 | 6/2015 |
| WO | WO 2015/199750 A1 | 12/2015 |
| WO | WO 2016/076336 A1 | 5/2016 |
| WO | WO 2016/076337 A1 | 5/2016 |
| WO | WO 2016/076338 A1 | 5/2016 |
| WO | WO 2016/076339 A1 | 5/2016 |
| WO | WO 2016/076340 A1 | 5/2016 |

* cited by examiner

INTERLAYER AND LAMINATE WITH CONTROLLED DEBONDING ZONE TREATMENTS WITH ENHANCED PERFORMANCE

CROSS REFERENCE TO RELATED APPLICATIONS

This application claims the benefit of U.S. Provisional Application No. 63/028,782, filed May 22, 2020, U.S. Provisional Application No. 63/126,135, filed Dec. 16, 2020, U.S. Provisional Application No. 63/155,009, filed Mar. 1, 2021, U.S. Provisional Application No. 63/191,486, filed May 21, 2021, U.S. Provisional Application No. 63/191,447, filed May 21, 2021, U.S. Provisional Application No. 63/191,518, filed May 21, 2021, U.S. Provisional Application No. 63/191,545, filed May 21, 2021, and U.S. Provisional Application No. 63/191,577, filed May 21, 2021, the entireties of which are incorporated herein for any and all purposes.

FIELD OF THE INVENTION

The present invention relates to interlayers based on thermoplastic resins that provide enhanced properties to rigid substrates through the use of controlled debonding zone treatments, and to rigid substrate-laminates comprising such interlayers.

BACKGROUND OF THE INVENTION

Laminated glass is generally made by laminating two pieces of glass onto a polymeric interlayer. One particular advantage of laminated glass versus solid glass sheets is impact and shatter resistance due to adhesion of the glass to the interlayer sheet.

In safety glass laminates, optimal adhesion of the interlayer to glass is a balance. Too much adhesion detracts from the ability of the laminate to absorb and dissipate energy during an impact event, and too little adhesion can result in optical defects (at the time of lamination and later upon environmental exposure and weathering), and can also detrimentally affect the ability of the interlayer to retain glass shards on impact.

Many publications disclose techniques for adjusting the adhesion between the interlayer and the glass substrate that enables the laminated structure to absorb and dissipate high energy events (e.g. impacts). For example, U.S. Pat. No. 3,607,178 describes washing the glass prior to lamination with water containing calcium and magnesium salts, and U.S. Pat. No. 4,292,372 describes incorporating calcium and/or magnesium carboxylates into the interlayer sheeting to reduce adhesion.

Many different materials have been used as the polymeric interlayer. For example, sheets containing a polyvinyl acetal, also known as polyvinyl butyral, and a plasticizer are widely utilized as an interlayer for laminated glass because they have excellent adhesion-to-glass properties. Laminated glass containing such interlayers can be made with good transparency, mechanical strength, flexibility, acoustic damping, and shatter resistance.

At least partially neutralized ethylene acid copolymers (ionomers) have also been used as interlayers for preparing laminated safety glass, for example, as disclosed in U.S. Pat. Nos. 3,404,134; 3,344,014; 7,445,683; 7,763,360; 7,951,865; 7,960,017; 8,399,097; 8,399,098; U.S. Pat. App. Pub. Nos. 2018/0117883, and 2019/0030863; Int. Pat. App. Nos. WO2016/076336A1; WO2016/076337A1; WO2016/076338A1; WO2016/076339A1; and WO2016/076340A1; and U.S. patent application Ser. No. 16/781,787.

While ionomer resins can be chosen to produce interlayers having excellent flexural strength and optical properties, the adhesion properties to glass may not be optimal. In particular, because ionomers are generally neutralized acid copolymers, they may develop lamination defects, particularly in high moisture environments.

For example, when using ionomer resins as interlayers for float glass, adhesion is often satisfactory on the "tin side" but not on the "air side" of the glass, so special precautions need to be taken into account during the lamination process to properly orient such glass sheets to ensure contact of the "tin side" to the interlayer.

Other resins can also be used as interlayers or portions of interlayers for float glass, including polyvinyl butyral and thermoplastic elastomers. These, too, can exhibit difficulties with adhesion, laminate toughness, and durability.

Patent references also discuss approaches on enhancing adhesion through the use of primers. For example, U.S. Pat. No. 3,445,423 discloses using a solution of gamma-aminopropyl-triethoxysilane as a primer for bonding the outside marginal portion of a windshield to a metal receiving member using a polyurethane composition.

U.S. Pat. No. 3,881,043 discloses the application of an adhesion primer to the perimeter of a windshield to reduce the tendency for premature delamination. Another embodiment involves the application of the adhesion promoting composition to be applied in a pattern of dots throughout the extent of the interfacial surface to increase the overall magnitude of adhesion.

U.S. Pat. Nos. 5,342,653; 5,478,412; and 5,5477,36 disclose a method of applying anti-adhesion projections to the surface of the sheet to counteract the high adhesion of the sheet to glass between the projections. These projections are said to operate on a physical blocking of adhesion means and by preference, do not rely on chemical means.

U.S. Pat. No. 10,022,908 discloses application of a primer to the surface of the interlayer which raises the adhesion between the interlayer and glass surface and can provide increased adhesion retention under exposure to high humidity conditions.

U.S. Pat. No. 3,505,160 discloses the application of an adhesion reducing substance ("a poor adhesive") in the interior portion of a windshield to increase the impact performance in a region where occupant impact could likely occur in an accident scenario.

U.S. Pat. App. Pub. No. 2019/0030863 discloses that a certain class of silanes can successfully and advantageously be used in very specific amounts and under limited conditions as glass adhesion promoters for sodium-neutralized ionomers, allowing the optimal use of such ionomers in the preparation of interlayers and glass laminates having enhanced interlayer-to-glass adhesion properties.

Most of the prior art involves approaches where the overall adhesion is monotonic across the laminate interface. Additionally, the combination of improved adhesion, laminate toughness, and laminate durability is not disclosed therein.

SUMMARY OF THE INVENTION

The present invention addresses the above-described problems by providing a means where the integrity of the laminate prepared with the multi-modal bonding robustness of the interlayer/glass laminate assembly is improved while retaining adequate laminate integrity and durability but providing improved impact performance. This is carried out by providing discrete debonding zones at the interface of the adhesive polymeric interlayer and the glass substrate.

In one embodiment, this invention relates to an adhesive polymeric interlayer (API) comprising:
- a first polymeric material,
- a first and a second surface,
- a first discrete zone on the first surface with a maximum mean peel adhesion, and
- a second discrete zone on the first surface with a minimum mean peel adhesion greater than about 0.01 kJ/m$^2$,
- wherein the maximum mean peel adhesion is at least about 2 times greater than the minimum mean peel adhesion.

In another embodiment, this invention relates to an adhesive polymeric interlayer (API) as described above, wherein one of said first or second discrete zones comprises the first polymeric material, and the other of the first and second discrete zones comprises a first material chemically and/or physically different from the first polymeric material.

In yet another embodiment, this invention relates to an adhesive polymeric interlayer (API) as described above, wherein the first material is characterized by: (i) a molecular weight different than that of the first polymeric material, (ii) a crystallinity different than that of the first polymeric material, (iii) a density different than that of the first polymeric material, (iv) a glass transition temperature different than that of the first polymeric material, (v) a melt flow index different than that of the first polymeric material, or (vi) a combination of one or more of said characteristics.

In one embodiment, this invention relates to an adhesive polymeric interlayer (API) as described above, wherein said first and/or second discrete zones are distributed in an ordered pattern.

In another embodiment, this invention relates to an adhesive polymeric interlayer (API) as described above, wherein said first and/or second discrete zones are distributed stochastically.

In yet another embodiment, this invention relates to an adhesive polymeric interlayer (API) as described above, wherein one of said first or second discrete zones is substantially continuous, and the other of said first or second discrete zones is characterized by:
(i) a regular shape,
(ii) a stochastic or a random shape,
(iii) one-dimensional patterns, and/or
(iv) a cluster of regular, random, and/or one-dimensional patterns.

In one embodiment, this invention relates to an adhesive polymeric interlayer (API) as described above, wherein the weight content of one of said first and second discrete zones as a percentage of the total of the API is in the range of from about 0.001% to about 30%.

In another embodiment, this invention relates to an adhesive polymeric interlayer (API) as described above, wherein said API comprises at least two zones, wherein the zone with maximum mean peel adhesion has a mean peel adhesion that is from about 2 times to about 250 times greater than a mean peel adhesion of the zone with minimum mean peel adhesion.

In yet another embodiment, this invention relates to an adhesive polymeric interlayer (API) as described above, wherein said API comprises at least two zones, wherein at least one of the zones has a mean peel adhesion of from about 0.01 to about 12.0 kJ/m$^2$.

In one embodiment, this invention relates to an adhesive polymeric interlayer (API) as described above, wherein said first polymeric material comprises a polyvinylacetal, an ionomer, a thermoplastic elastomer, an ethyl vinylacetate, or combinations thereof.

In another embodiment, this invention relates to the adhesive polymeric interlayer as described above, wherein said API comprises a polyvinylacetal, an ionomer, a thermoplastic elastomer, a silane, an ethyl vinylacetate, or combinations thereof.

In yet another embodiment, this invention relates to the adhesive polymeric interlayer as described above, wherein the discrete debonding zones within said adhesive polymeric interlayer comprise a polyvinylacetal, an ionomer, a thermoplastic elastomer, a silane, an ethyl vinylacetate, or combinations thereof.

In one embodiment, this invention relates to the adhesive polymeric interlayer as described above, wherein at least one of the discrete debonding zones comprises the ionomer, wherein the ionomer resin is a sodium-neutralized ethylene-α,β-unsaturated carboxylic acid copolymer.

In another embodiment, this invention relates to an adhesive polymeric interlayer (API) as described above, wherein said first material comprises a polyvinylacetal, an ionomer, a thermoplastic elastomer, a silane, an ethyl vinylacetate, or combinations thereof.

In yet another embodiment, this invention relates to an adhesive polymeric interlayer (API) as described above, wherein the second discrete zone is the first polymeric material, and the first polymeric material is an ionomer resin.

In one embodiment, this invention relates to an adhesive polymeric interlayer (API) as described above, wherein the first discrete zone is the first polymeric material, and the first polymeric material is a polyvinylacetal.

In another embodiment, this invention relates to the adhesive polymeric interlayer as described above, wherein the polyvinylacetal is a polyvinylbutyral.

In another embodiment, this invention relates to an adhesive polymeric interlayer (API) as described above, wherein the first material is an adhesion modifying agent.

In one embodiment, this invention relates to the adhesive polymeric interlayer as described above, wherein the adhesion modifying agent is a silane, an alkali metal salt, an alkaline earth metal salt or a carboxylic group-containing olefinic polymer.

In another embodiment, this invention relates to the adhesive polymeric interlayer as described above, wherein the adhesion modifying agent is a silane.

In yet another embodiment, this invention relates to an adhesive polymeric interlayer (API) as described above, wherein the adhesion modifying agent is present in a range of from about 0.001% to about 75% by weight of the first polymeric material.

In yet another embodiment, this invention relates to the adhesive polymeric interlayer as described above, wherein the adhesion modifying agent is present in a range of from about 0.001% to about 25% by weight of the first polymeric material.

In one embodiment, this invention relates to the adhesive polymeric interlayer as described above, wherein the adhesion modifying agent is present in a range of from about 5% to about 25% by weight of the first polymeric material.

In another embodiment, this invention relates to the adhesive polymeric interlayer as described above, wherein the adhesion modifying agent is present in a range of from about 10% to about 20% by weight of the first polymeric material.

In yet another embodiment, this invention relates to the adhesive polymeric interlayer as described above, wherein the adhesion modifying agent is present in a range of from about 50% to about 75% by weight of the first polymeric material.

In one embodiment, this invention relates to the adhesive polymeric interlayer as described above, wherein the adhesion modifying agent is present in a range of from about 60% to about 70% by weight of the first polymeric material.

In one embodiment, this invention relates to an adhesive polymeric interlayer (API) as described above, wherein one of the first or second discrete zones has a thickness of from about 0.001 mm to about 10.0 mm.

In one embodiment, this invention relates to the adhesive polymeric interlayer and laminate structure as described above, wherein the interlayer has a thickness of from about 0.35 mm to about 5.0 mm.

In another embodiment, this invention relates to an adhesive polymeric interlayer (API) as described above, wherein each discrete zone is shaped as a dot, a circle, a partial circle, an oval, a partial oval, a triangle, a square, a rectangle, a pentagon, a hexagon; a heptagon, or is amorphous.

In yet another embodiment, this invention relates to an adhesive polymeric interlayer (API) as described above, wherein an effective diameter of the discrete zone is in a range of from about 0.1 mm to about 50 mm.

In one embodiment, this invention relates to an adhesive polymeric interlayer (API) as described above, wherein the peel strength ratio of the zone with maximum peel strength ($Z_{max}$) to the zone with the minimum peel strength ($Z_{min}$), that is, ($Z_{max}/Z_{min}$) is greater than or equal to 5.

In another embodiment, this invention relates to an adhesive polymeric interlayer (API) as described above, wherein:
all discrete zones have different peel strength;
one or more discrete zones have the same peel strength; or
one or more discrete zones have different peel strength.

In yet another embodiment, this invention relates to an adhesive polymeric interlayer (API) as described above, wherein the effective diameter of the regular shaped discrete zone, the random shaped discrete zone, or the cluster discrete zone is from about 1 multiple to about 150,000,000-multiples of the thickness of the discrete zone.

In one embodiment, this invention relates to a laminate structure, comprising a stack of:
(i) a first glass substrate; and
(ii) an adhesive polymeric interlayer as recited above;
wherein said first glass substrate adheres to said adhesive polymeric interlayer (API).

In another embodiment, this invention relates to a laminate structure as described above, comprising a stack of:
(i) a first glass substrate;
(ii) an adhesive polymeric interlayer as recited above; and
(iii) a second glass substrate;
wherein said first glass substrate adheres to said second glass substrate through said adhesive polymeric interlayer (API).

In yet another embodiment, this invention relates to a laminate structure as described above, wherein the discrete zones have a surface area on one side that is:
(i) from about 1% to about 80% of the surface areas of one of the glass substrate;
(ii) from about 10% to about 60% of the surface areas of one of the glass substrate;
(iii) from about 20% to about 50% of one of the glass substrate;
(iv) from about 30% to about 40% of the surface areas of one of the glass substrate
(v) from about 5% to about 25% of the surface areas of one of the glass substrate; or
(vi) from about 1% to about 35% of the surface areas of one of the glass substrate.

In one embodiment, this invention relates to a laminate structure as described above, wherein said adhesive polymeric interlayer comprises at least two zones, wherein at least one of the zones has a mean peel adhesion of:
(i) from about 0.01 to about 12.0 kJ/m$^2$;
(ii) from about 0.1 to about 4.0 kJ/m$^2$;
(iii) from about 0.5 to about 3.0 kJ/m$^2$;
(iv) from about 8.0 to about 12.0 kJ/m$^2$; or
(v) from about 9.0 to about 11.0 kJ/m$^2$.

In another embodiment, this invention relates to a laminate structure as described above, wherein the adhesive polymeric interlayer comprises from 0.04 to 10,000 zones per cm$^2$.

In another embodiment, this invention relates to a laminate structure as recited above, wherein at least one of said one or more discrete debonding zones is coplanar to said API and/or to at least one of said first glass substrate or said second glass substrate.

Surprisingly, it has been shown that interlayer and laminate performance is enhanced by providing a debonding region within the adhesive polymeric interlayer at the interface of the adhesive polymeric interlayer and the glass sheet, which allows for controlled debonding, as exemplified by employing less adhesion-promoting material. Additionally, it has been shown that non-uniform, controlled adhesion produces unique combinations of debonding region-glass adhesion, laminate tear resistance, and laminate post-breakage durability. The enhanced performance is measured by different ways, including ball-on-ring, cyclic weathering, and other tests as described herein. The improved adhesion leads to improved durability of the laminates comprising such debonding regions.

Controlled debonding zone treatments (CDZT) have been found to allow further optimization of laminate performance characteristics; primarily laminate tear resistance at a given unit thickness of the debonding region at the interface of the glass and the API within the API compared with conventional art. The durability of laminates can also be optimized to balance aspects of laminate integrity with that of energy absorbing capability under impact or other extreme applied forces acting to breach the laminate.

The CDZT methodology considers the total zone in and around the interfacial contact region between the interlayer and the rigid substrate. This would include the zone/areas which may not receive any direct application of a treatment, i.e., those areas/zones substantially possessing the original properties of the polymeric interlayer and of rigid substrate. The debonding behavior of these areas/zones factor into the design and magnitude of the debonding nature of the treatment area/zones. It is the debonding behavior and interaction of these differing zones that provides the benefits in this subject art.

The CDZT approach involves defining both a range and boundary limits for the energy required to effectuate a debonding 'event' at or near the interface between the glass substrate and the polymeric interlayer. These boundary conditions would have at least a lower limit and an upper limit. Each lower and upper limit would be generated through the application of a treatment such that at least a bimodal or multi-modal adhesion level is created, wherein the adhesion/debonding characteristics are defined by a combination of at least the composition of the applied treatment and intertwined with the geometric aspects of the imposed 'pattern'. That is, the CDZT consists of both the 'interstitial' space/zones and that of the specific application of 'patterned treatment'. The CDZT technology has been found to provide superior laminate performance over that of the conventional art. This can be accomplished in various modes and possessing some or all of the characteristics listed herein.

The lower boundary condition should not be one of 'poor adhesion' that is, debonding or delamination that would occur under normal laminate use (typical stresses applied through means such as thermal expansion/contraction, caliper variations in the polymeric interlayer and/or non-planarity and waviness in the rigid substrate, edge pinching of the laminate and the like) and other environmental imposed effects that would affect the long-term durability aspects of the integrity of the laminate (e.g. moisture ingress). It is desired for a laminate to possess an adequate degree of durability and ability to maintain integrity throughout its expected environmental exposure and use.

The upper boundary condition could be set at adhesion/debonding limit where above which there is no measurable influence on the tear-resistance of the interlayer of the laminate. This can either be measured directly through either the ball-on-ring test or ball-drop test or other test which exerts sufficient energy into the laminate causing glass fracture and the resultant possibility of a breach within the polymeric interlayer to occur.

Another means for setting/establishing an upper boundary condition could be performed utilizing the energy value obtained during a peel test at and above which, tearing of the interlayer occurs in more than 50% of the sampling cases. When the debonding energy is so high that polymeric interlayer at around 0.8-mm thickness results in frequent tearing rather than debonding from the rigid substrate, then it can be expected that similar tearing can be expected in the fully laminated condition during an impact or other energetic event of sufficient magnitude to create a tear.

The CDZT technology, while not wanting to be held to theory, in one aspect can be one of a chemical nature, not physical nature. A debonding treatment can consist of the application of a chemically active substance or mixture which can alter the adhesive/debonding characteristics at or near the interface between the rigid substrate and the polymeric interlayer. A treatment can alternatively consist of the application of an energetic 'beam', such as electron beam, gamma, plasma, electron discharge, laser, ion-beam or other energetic means such as, plasma, flame-treatment, UV/VIS/IR radiation, microwaves or chemical alteration, via, coating techniques, chemical vapor deposition, and the like. Combinations of a chemical substance(s) with energetic sources can also be employed as a treatment. The treatment may be of an infinitesimally small dimension (i.e. only surface atomic or molecular monolayer affected by the treatment or the treatment may be of a finite thickness (approaching up to 30%) of the API thickness. The treatment may be applied to either the rigid substrate or to the polymeric interlayer or both. It is generally most advantageous to apply to the polymeric interlayer. The application directly to and as part of the interlayer provides for ease of the manufacturing, for example, roll-to-roll processing and the like.

The CDZT technology can be designed and is most advantageous when the relative positioning of the interlayer to the rigid substrate can be translated and/or rotated in an universal fashion without concerns of alignment of said 'pattern' to substrate edge(s) and with the delamination performance at an edge or planar continuity disruption (hole, cutout, recess, insert, etc.) being demonstrably affected.

The CDZT can optionally include a directionality component to the impending delamination front. The pattern can be produced in a complimentary and preferred geometric orientation such that it provides a more effective bonding relationship against a delamination front than randomly situated. For example, the line pattern in EX-D-011 and -012 both possess the same spacing parameters and volume fractions as applied, but when the lines are oriented such that the delamination front is perpendicular to said lines (EX-D-012), the total amount of delamination is minimized over that of the lines oriented in the same direction as the delamination front (EX-D-011). Since, delamination fronts are frequently found to originate and advance from the 'edge' of a given laminate, a pattern can advantageously be constructed so as to best resist the progress of such delamination.

The design of the applied treatment can be defined by various descriptors. The surface coverage (or volume fraction) is one aspect that can be adjusted to achieve a desired effect or outcome. The design can employ the entire design range from a stochastic 'pattern' to a regular, repeatable pattern and all variations in-between. The design elements can vary in proximity to one another. Designs can have an open structure (isolated 'islands') or be of a closed structure (connected pathways of direct or circuitous nature). The applied design can be defined as they relate to either the lower boundary or upper boundary adhesion/debonding aspects of the applied treatment.

The CZDT provides for enhanced laminate performance with respect to the energy level required to breach the laminate and/or the durability of the laminate to withstanding various harsh environmental factors (wide-temperature swings/exposures and high moistures) or imposed stress (flexure, dead or live loads, lamination stress, etc.). Additionally, it can provide improved robustness in performance over a broad range of manufacturing variations; such as, rigid substrate composition, substrate surface cleanliness (e.g. glass washing conditions), moisture conditions, improper lamination temperature and dwell time, etc.

In addition to the embodiments listed above, the applied treatment may also create a debonding event that can exhibit a cohesive failure mode, at least in some portion of the CZDT region. This cohesive failure mode(s) is designed to be part of the debonding separation of polymeric interlayer from rigid substrate.

These and other embodiments, features and advantages of the present invention will be more readily understood by those of ordinary skill in the art from a reading of the following detailed description and associated drawings.

BRIEF DESCRIPTION OF THE DRAWINGS

Various embodiments of the present invention are described in detail below with reference to the attached drawing Figures:

FIG. 2a depicts a primary configuration of a laminate consisting of top lite of glass 10, an interlayer comprising on its outer surfaces, a zone 26 and 28 which is defined as 'a controlled debonding zone treatment' layer which possesses properties influenced by the underlying interlayer and combined with a bottom lite of glass 12.

DETAILED DESCRIPTION OF THE INVENTION

Figure 1:
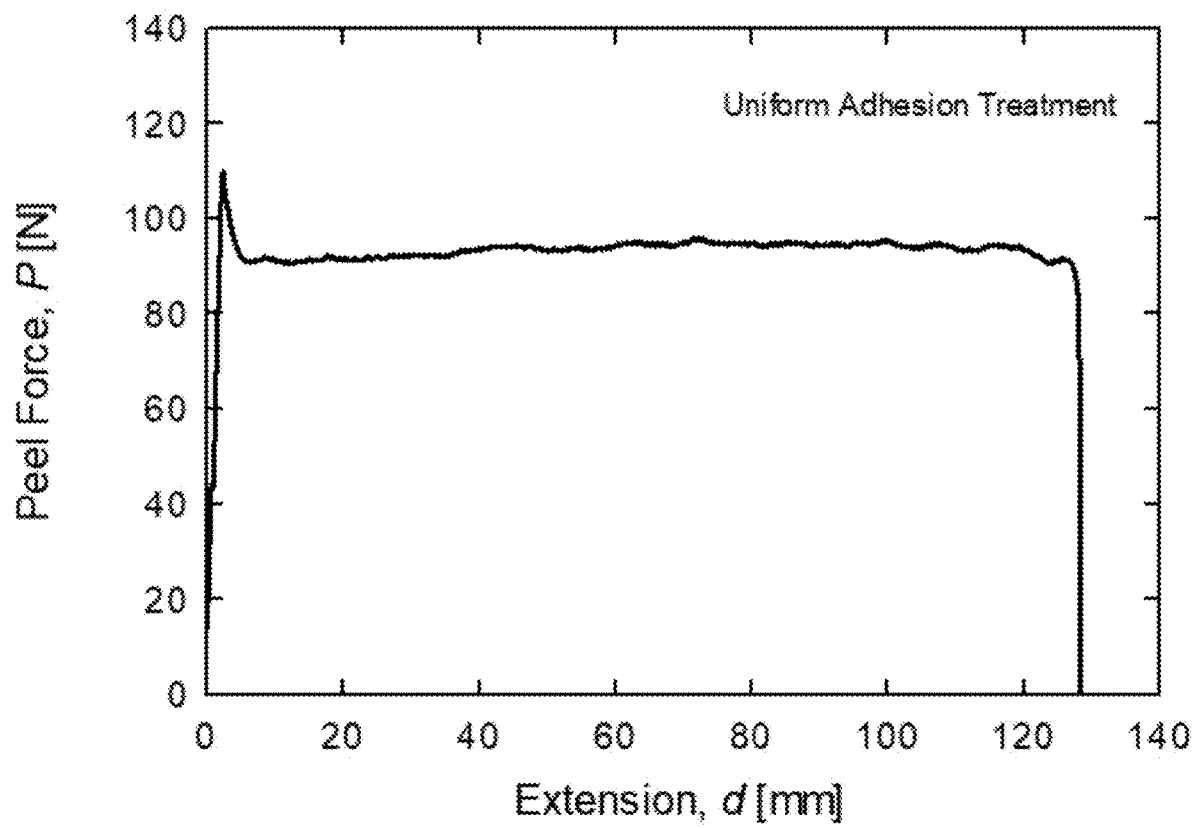
FIG. 1 shows the peel force of a typical interlayer/glass 'laminate' possessing relatively uniform adhesion—this is representative of the conventional art.

The present invention relates to a polymeric interlayer composition, and a glass laminate containing such interlayer. More specifically, the present invention relates to a laminate structure comprising an adhesive polymeric interlayer (API) that comprises discrete zones. Such discrete zones are located on the API, at the interface of the API and the glass substrate. These discrete zones allow for a unique combination of modified API-glass debonding, laminate toughness, and laminate durability. Various spatial patterns and densities of these discrete zones are described, as well as the resulting material properties.

The basic framework of the present invention is described in terms of a leopard spots pattern. However, the invention similarly applies to other discrete zones, as described infra.

In one embodiment, some leopard spots are surface treated for debonding, and/or some are surface treated for adhesion-enhancement, and/or some are not treated at all. In one embodiment, the discrete darker spots are debonding in their function. In one embodiment, these debonding zones are engendered by various surface treatments. The discrete zones with debonding tendencies are likely to fail first upon impact, in comparison with the zones in between the spots.

In another embodiment, the discrete darker spots have been treated to enhance their adhesive function. However, the zones in between the spots would be debonding in their function. These debonding zones are engendered by various surface treatments, or they are debonding relative to the surface-treated discrete zones that have enhanced adhesion. The discrete zones or leopard spots with adhesive tendencies are not likely to fail first upon impact in comparison with the zones in between the spots.

In another embodiment, some of the leopard spots have adhesive tendencies but some other leopard spots have debonding tendencies. These adhesive and debonding tendencies can be created by surface treatment or by virtue of their relative peel strength. Similarly, some of the zones in between the spots can have adhesive tendencies, and some zones have debonding tendencies.

Stated differently, in one embodiment, the adhesive polymeric interlayer (API), on one or both surfaces, comprises two sets of discrete zones, adhesive discrete zones and debonding discrete zones. Each set of discrete zones has at least one discrete zone. In the first set of discrete zones—that is the adhesive zones—a zone exists that has a mean peel adhesion that is the highest amongst all discrete zones on the surface of the API. In the second set of discrete zones—that is the debonding zones, a discrete zone exists that has a mean peel adhesion that is the lowest amongst all discrete zones on the surface of the API. But a condition of the present invention is, the maximum mean peel adhesion of a discrete zone (residing within the set of adhesive discrete zones) is at least about 2 times greater than the minimum mean peel adhesion of a discrete zone (residing within the set of debonding discrete zones).

In one embodiment, some discrete zones are subjected to debonding treatment, and some discrete zones are not subjected to any debonding treatment, the latter demonstrating a higher adhesive tendency than the treated discrete zones. Similarly, and in another embodiment, some discrete zones are subjected to debonding treatment, and some other discrete zones are subjected to a surface treatment that enhances adhesion. Similarly, and in yet another embodiment, some discrete zones are subjected to debonding treatment, some discrete zones are subjected to a surface treatment that enhances adhesion, and some discrete zones are not subjected to any treatment at all. The adhesion-providing discrete zones or the debonding-facilitating discrete zones reside on the same relative spectrum of mean peel strength.

Definitions

Controlled Debonding

By controlled debonding is meant a zonal variability in the generally planar direction, in adhesion, in the vicinity of the interfacial region between the API and the glass substrate. Stated another way, the adhesion strength of the interface comprising the debonding zones varies generally in the planar direction at the interface of the glass substrate and the API. This variation is described in the multiple exemplary embodiments, infra.

Controlled Debonding Zone Treatment

A treatment which alters the debonding fracture energy of the interfacial zone at or near the interface of the rigid substrate and the polymeric interlayer. Energy release rates/work at separation will be reported as kilojoules/m$^2$ for adhesion measurements.

Discrete Zones

By "discrete zones" is meant that the zones are contained at the surface of the API but are substantially discrete, that is, the zones, which may or may not cover generally the entire area of the adhesive polymeric interlayer (API), in the planar direction, are substantially separate from each other with defined boundaries. The likely random imperfections in discreteness of the zones, given the limitations of the materials, and/or the process of making the materials—for example, two zones that are substantially discrete may "bleed into" each other, de minimis—are acknowledged in the present invention. The discrete zones may have different debonding fracture energy or same debonding fracture energy. The discrete zones may not visually look different but at their discrete boundary, the debonding fracture energy generally changes more than the variance in the fracture energy nominally found on adhesive polymeric interface as would be known in the art.

Discrete Debonding Zones

By "discrete debonding zones" or "debonding zones" is meant that the zones are described as debonding in terms of their mean peel strength. If the glass substrates and the adhesive polymeric interlayer debond, there is substantial likelihood that the debonding is primarily within the "debonding zones."

The description infra discusses discrete zones in terms of their debonding, with the specific examples of controlled debonding zone treatment to engender such debonding zones. Discrete zones, whether subjected to controlled debonding treatment, or not, are situated on the API surface, in various shapes, some providing more adhesion to the glass substrate, and some less. This invention envisions, for example, surface treatment that increases the peel strength of a discrete zone.

Patterned Adhesion

Patterned adhesion is meant that the debonding treatment is arranged in some geometric fashion with the disposition within the interfacial region of the interlayer and rigid substrate. There is some regularity with a patterned treatment. This treatment will create debonding discontinuities that differ from the interstitial spaces adjoining the pattern. There may be more than one pattern treatment applied, either differing in pattern type, geometry parameters and can be made to be overlapping or imposed upon the underlying pattern treatment or falling within the interstitial space or any combination thereof.

Stochastic

By "stochastic" is meant that an item or pattern is randomly determined and generally cannot be predicted precisely. Therefore, as used herein, a stochastic pattern is a random one.

Stochastically Varying Adhesion

By "stochastically varying adhesion" is meant that the debonding treatment is approaching a 'random-like' disposition within the interfacial region of the interlayer and rigid substrate. This treatment will create debonding discontinuities from that of a more uniform field of adhesion/debonding.

Uniform Adhesion

By uniform adhesion is meant that the adhesion/debonding in the interfacial region occurs substantially in a manner that does not vary more than +/−10% from location-to-location as measured on an interfacial area region basis from 5% to 100% of the polymeric interlayer thickness.

Universal Positioning

By "universal positioning" is meant the adhesion modifier is applied to either the glass or the interlayer or both, in a manner that allows the glass panels to be laid out onto the interlayer without regard to orientation, thus allowing the interlayer to be cut with a minimal amount of waste.

Circularity

Circularity, C, is defined as the degree to which the zone is similar to a circle, taking into consideration the smoothness of the perimeter, length P. This means circularity is a measurement of both the zone and roughness. Thus, the further away from a perfectly round, smooth circle a zone becomes, the lower the circularity value. Circularity is a dimensionless value. Where A is the feature area, ISO9276-6 defines circularity as:

$$C = \sqrt{\frac{4\pi A}{P^2}}$$

Solidity

Solidity, S, is the measurement of the overall concavity of a zone. It is defined as the image area, A, divided by the convex hull area, Ac, as given below. Thus, as the zone becomes more solid, the image area and convex hull area approach each other, resulting in a solidity value of one. However, as the zone digresses from a closed circle, the convex hull area increases and the calculated solidity decreases. Solidity is a dimensionless value.

$$S = \frac{A}{A_c}$$

Effective Diameter

By "effective diameter" is meant the diameter of a circle with an area equivalent to the area of a zone having any shape as described herein.

In an aspect, the invention provides a polymeric interlayer comprising a controlled debonding treatment which, when combined with one or more layers of glass to form a laminate, provides a combination of improved toughness, adhesion and durability.

In an aspect, the invention provides one or more rigid substrates comprising a controlled debonding treatment which, when combined with one or more layers of a polymeric interlayer to form a laminate, provides a combination of improved toughness, adhesion and durability.

In an aspect, the invention provides a laminate, comprising at least one polymeric interlayer and at least one sheet of glass, wherein a controlled debonding treatment is disposed onto the surface of the polymeric interlayer, the glass, or both, to provide a controlled debonding zone or region, wherein said laminate exhibits a combination of improved toughness, adhesion and durability.

In another aspect, the invention provides a controlled debonding treatment that is substantially uniform and creates discrete debonding zones with variable fracture toughness so that debonding occurs at a prescribed fracture energy level.

In another aspect, the invention provides a controlled debonding treatment that is substantially discrete and creates debonding zones with variable fracture toughness with higher and lower fracture energy.

In yet another aspect, the invention provides a controlled debonding treatment that is substantially discrete and has a substantially uniform pattern; and creates debonding zones with variable fracture toughness with higher and lower fracture energy.

In yet another aspect, the invention provides a controlled debonding treatment that is substantially discrete and has a substantially stochastic pattern; and creates debonding zones with variable fracture toughness with higher and lower fracture energy.

In the present disclosure, glass is used as an exemplary substrate. Others substrates such as polymeric substrates can also be used. For example, polycarbonate and other transparent polymeric substrates are also envisioned in the present invention.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers comprising at least three monomers.

The term "acid copolymer" as used herein refers to a copolymer comprising copolymerized units of an $\alpha$-olefin, an $\alpha,\beta$-ethylenically unsaturated carboxylic acid, and optionally other suitable comonomer(s) such as, for example, an $\alpha,\beta$-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

The term "ionomer" as used herein generally refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. The alkali metal ionomer as used herein is a sodium ionomer, for example a copolymer of ethylene and methacrylic acid, wherein all or a portion of the carboxylic acid groups of the copolymerized methacrylic acid units are neutralized, and substantially all of the neutralized carboxylic acid groups are in the form of sodium carboxylates.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Poly(vinyl)acetal Resin

In accordance with the present invention, there is provided herein a plasticized polyvinylacetal composition, preferably a polyvinylbutyral composition, wherein the composition comprises (a) a polyvinylacetal resin having a hydroxyl number of from about 12 to about 34, preferably of from about 15 to about 34, as determined according to ASTM D1396-92; (b) a plasticizer in an amount of from about 20, or from about 30, to about 60, or to about 50, parts per hundred (pph), based on the dry weight of the polyvinylacetal resin; and (c) a light stabilizer/antioxidant additive package comprising an oligomeric hindered amine light stabilizer with antioxidant functionality (HALS); wherein substantially no additional antioxidant is present. It is further provided that the plasticized polyvinylacetal composition is a plasticized polyvinylbutyral composition. Additionally, sheets comprising the plasticized polyvinylacetal composition, as well as laminates comprising said sheets, are provided herein.

Suitable polyvinylacetal resins and processes for their preparation are in a general sense well known to those of ordinary skill in the relevant art, as exemplified by previously incorporated U.S. Pat. No. 8,329,793B2, US2016/0214354A1, US2016/0214352A1, US2017/0253704A1, US2017/0072665A1 and US2017/0217132A1, and other publications mentioned below. These resins show, for example, acceptable impact strength per end-use standards, acceptable adhesion, low color, low haze, and relatively little change in end-use conditions.

The polyvinylacetal resin can be produced by conventionally known methods of acetalization of polyvinyl alcohol with an aldehyde. The polyvinyl alcohol is produced by hydrolysis of a corresponding polyvinyl acetate.

A viscosity average polymerization degree of polyvinyl alcohol serving as a raw material of the polyvinylacetal resin is typically 100 or more, or 300 or more, or 400 or more, or 600 or more, or 700 or more, or 750 or more, or 900 or more, or 1200 or more. When the viscosity average polymerization degree of polyvinyl alcohol is too low, there is a concern that the penetration resistance or creep resistance properties, particularly creep resistance properties under high-temperature and high-humidity conditions, such as those at 85° C. and at 85% RH, are lowered. In addition, the viscosity average polymerization degree of polyvinyl alcohol is typically 5000 or less, or 3000 or less, or 2500 or less, or 2300 or less, or 2000 or less. When the viscosity average polymerization degree of polyvinyl alcohol is more than 5000, there is a concern that the extrusion of a resin film is difficult.

It is to be noted that since the viscosity average polymerization degree of the polyvinylacetal resin coincides with the viscosity average polymerization degree of polyvinyl alcohol serving as a raw material, the above-described preferred viscosity average polymerization degree of polyvinyl alcohol coincides with the typical viscosity average polymerization degree of the polyvinylacetal resin.

The polyvinylacetal resin is generally constituted of vinyl acetal units, vinyl alcohol units and vinyl acetate units, and these respective units can be, for example, measured by the "Testing Methods for Polyvinyl Butyral" of JIS K 6728, or a nuclear magnetic resonance method (NMR).

Typically, a polyvinylacetal resin is used having a hydroxyl number of from about 12 to about 34, preferably of from about 15 to about 34 (as determined according to ASTM D1396-92).

In the case where the polyvinylacetal resin contains a unit other than the vinyl acetal unit, by measuring a unit quantity of vinyl alcohol and a unit quantity of vinyl acetate and subtracting these both unit quantities from a vinyl acetal unit quantity in the case of not containing a unit other than the vinyl acetal unit, the remaining vinyl acetal unit quantity can be calculated.

The aldehyde which is used for acetalization of polyvinyl alcohol is preferably an aldehyde having 1 or more and 12 or less carbon atoms. When the carbon number of the aldehyde is more than 12, the reactivity of the acetalization is lowered, and moreover, blocking of the resin is liable to be generated during the reaction, and the synthesis of the polyvinyl acetal resin is liable to be accompanied with difficulties.

The aldehyde is not particularly limited, and examples thereof include aliphatic, aromatic, or alicyclic aldehydes, such as formaldehyde, acetaldehyde, propionaldehyde, n-butyl aldehyde, isobutyl aldehyde, valeraldehyde, n-hexyl aldehyde, 2-ethylbutyl aldehyde, n-heptyl aldehyde, n-octyl aldehyde, n-nonyl aldehyde, n-decyl aldehyde, benzaldehyde, cinnamaldehyde, etc. Of those, aliphatic aldehydes having 2 or more and 6 or less carbon atoms are preferred, and above all, butyl aldehyde is especially preferred. In addition, the above-described aldehydes may be used solely or may be used in combination of two or more thereof. Furthermore, a small amount of a polyfunctional aldehyde or an aldehyde having other functional group, or the like may also be used in combination in an amount in the range of 20% by mass or less.

The polyvinylacetal resin is most preferably polyvinyl butyral.

Plasticizers for Poly(vinyl)acetal Resins

In one embodiment, the polyvinylacetal resin compositions of the present invention contain a plasticizer. Suitable plasticizers can be chosen from any that are known or used conventionally in the manufacture of plasticized PVB sheeting compositions. For example, a plasticizer suitable for use herein can be a plasticizer or a mixture of plasticizers selected from the group consisting of: diesters obtained from the chemical reaction of aliphatic diols with carboxylic acids, including diesters of polyether diols or polyether polyols; and, esters obtained from polyvalent carboxylic acids and aliphatic alcohols. For convenience, when describing the sheet compositions of the present invention, a mixture of plasticizers can be referred to herein as "plasticizer". That is, the singular form of the word "plasticizer" as used herein can represent the use of either one plasticizer or the use of a mixture of two or more plasticizers in a given sheet composition. The intended use will be apparent to a reader skilled in the art. Preferred plasticizers for use herein are diesters obtained by the reaction of triethylene glycol or tetraethylene glycol with aliphatic carboxylic acids having from 6 to 10 carbon atoms; and diesters obtained from the reaction of sebacic acid with aliphatic alcohols having from 1 to 18 carbon atoms. More preferably the plasticizer is either tetraethylene glycol di(2-heptanoate) (4G7), triethyleneglycol di-(2-ethyl hexanoate) (3GO), dihexyl adipate (DHA), triethylene glycol di(2-ethylbutyrate) (3GH) or dibutyl sebacate (DBS). Most preferably the plasticizer is 3GO.

In one embodiment, the discrete zones are created by an 'unplasticized' PVB or any other suitable material (polymer or otherwise). Stated another way, a plasticizer is not required in the treatment as applied.

Optional Additives for Poly(vinyl)acetal Resins

The poly(vinyl) acetal resins of present invention may include a surfactant. A surfactant suitable for use herein can be any that is known to be useful in the art of polyvinylacetal manufacture. For example, surfactants suitable for use herein include: sodium lauryl sulfate; ammonium lauryl sulfate; sodium dioctyl sulfosuccinate; ammonium perfluorocarboxylates having from 6 to 12 carbon atoms; sodium aryl sulfonates, adducts of chlorinated cyclopentadiene and maleic anhydride; partially neutralized polymethacrylic acid; alkylaryl sulfonates; sodium N-oleyl-N-methyl laurate; sodium alkylaryl polyether sulfonates; triethanolamine lauryl sulfate; diethyl dicyclohexyl ammonium lauryl sulfate; sodium secondary-alkyl sulfates; sulfated fatty acid esters; sulfated aryl alcohols; and the like. Preferable surfactants include sodium lauryl sulfate, sodium dioctyl sulfosuccinate, sodium cocomethyl tauride, and decyl(sulfophenoxy) benzenesulfonic acid disodium salt. It has been found that sodium dodecyl sulfate (SDS) and sodium lauryl sulfate (SLS) are particularly useful.

The surfactant can be included in any effective amount for the particular set of process conditions practiced. The surfactant can be included in an amount of from about 0.01, or from about 0.10, or from about 0.15, to about 0.85, or to about 0.80, or to about 0.75, or to about 0.70, pph by weight, based on the weight of poly vinylacetate resin ultimately used to prepare the polyvinylacetal.

In addition, it is also possible to control the adhesion of the resulting laminate to a glass or the like, if desired, through the addition of one or more adhesion modifier. Typical adhesion modifiers include, for example, those disclosed in International Patent Application Publication No. WO03/033583A1. Alkali metal salts and alkaline earth metal salts are typically used, for example, salts of potassium, sodium, magnesium, and the like. Examples of the salt include salts of organic acids, such as octanoic acid, hexanoic acid, butyric acid, acetic acid and formic acid; inorganic acids, such as hydrochloric acid and nitric acid; and the like. Magnesium compounds are preferred.

Ionomer

In accordance with the present invention, the ionomer resin is a sodium-neutralized ethylene.α,β-unsaturated carboxylic acid copolymer, which includes resins having constituent units derived from ethylene, constituent units derived from an α,β-unsaturated carboxylic acid and optionally other constituent units as described below, in which at least a part of the constituent units derived from the α,β-unsaturated carboxylic acid are neutralized with a sodium ion.

In the ethylene·α,β-unsaturated carboxylic acid copolymer serving as a base polymer, a content proportion of the constituent units derived from an α,β-unsaturated carboxylic acid is typically 2% by mass or more, or 5% by mass or more (based on total copolymer mass). In addition, the content proportion of the constituent units derived from an α,β-unsaturated carboxylic acid is typically 30% by mass or less (based on total copolymer mass).

Examples of the α,β-unsaturated carboxylic acid constituting the ionomer include, without limitation, acrylic acid, methacrylic acid, itaconic acid, maleic acid, fumaric acid, and mixtures of two or more thereof. In one embodiment, the α,β-ethylenically unsaturated carboxylic acid is selected from acrylic acid, methacrylic acid, and mixtures thereof. In another embodiment, the α,β-ethylenically unsaturated carboxylic acid is methacrylic acid.

The ethylene acid copolymer may further comprise copolymerized units of one or more additional comonomer(s), such as an α,β-ethylenically unsaturated carboxylic acid ester. When present, alkyl esters having 3 to 10, or 3 to 8 carbons, are typically used. Specific examples of suitable esters of unsaturated carboxylic acids include, without limitation, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, dimethyl maleate, diethyl maleate, dibutyl maleate, dimethyl fumarate, diethyl fumarate, dibutyl fumarate, dimethyl fumarate, vinyl acetate, vinyl propionate, and mixtures of two or more thereof. In one embodiment, the additional comonomers are selected from methyl acrylate, methyl methacrylate, n-butyl acrylate, n-butyl methacrylate, isobutyl acrylate, isobutyl methacrylate, glycidyl methacrylate, vinyl acetate, and mixtures of two or more thereof. In another embodiment, the additional comonomer is one or more of n-butyl acrylate, n-butyl methacrylate, isobutyl acrylate and isobutyl methacrylate. In another embodiment, the additional comonomer is one or both of n-butyl acrylate and isobutyl acrylate.

Suitable ethylene acid copolymers have a melt flow rate (MFR) of from about 1, or from about 2, to about 4000 g/10 min, or to 1000 g/10 min, or to about 400 g/10 min, as determined in accordance with ASTM method D1238-89 at 190° C. and 2.16 kg.

Finally, suitable ethylene acid copolymers may be synthesized as described, for example, in U.S. Pat. Nos. 3,404,134, 5,028,674, 6,500,888, 6,518,365, 8,334,033 and 8,399,096. In one embodiment, a method described in U.S. Pat. No. 8,399,096 is used, and a sufficiently high level and complementary amount of the derivative of the second α,β-ethylenically unsaturated carboxylic acid is present in the reaction mixture.

To obtain the ionomers, the ethylene acid copolymers are partially neutralized by reaction with one or more bases. An example of a suitable procedure for neutralizing the ethylene acid copolymers is described in U.S. Pat. Nos. 3,404,134 and 6,518,365. After neutralization, about 1%, or about 10%, or about 15%, or about 20%, to about 90%, or to about 60%, or to about 55%, or to about 30%, of the hydrogen atoms of carboxylic acid groups present in the ethylene acid copolymer are replaced by other cations. Stated alternatively, about 1%, or about 10%, or about 15%, or about 20%, to about 90%, or to about 60%, or to about 55%, or to about 30%, of the total content of the carboxylic acid groups present in the ethylene acid copolymer are neutralized. In another alternative expression, the acid groups are neutralized to a level of about 1%, or about 10%, or about 15%, or about 20%, to about 90%, or to about 60%, or to about 55%, or to about 30%, based on the total content of carboxylic acid groups present in the ethylene acid copolymers as calculated or measured for the non-neutralized ethylene acid copolymers. The neutralization level can be tailored for the specific end-use.

The counterions to the carboxylate anions in the ionomer are sodium cations. While ionomers used in the present invention are sodium-neutralized ionomers, counterions other than sodium cations may be present in small amounts of less than 5 equivalent %, or less than 3 equivalent %, or less than 2 equivalent %, or less than 1 equivalent %, based on the total equivalents of carboxylate groups in the ionomer. In one embodiment, the counterions are substantially sodium ions.

Suitable cations other than sodium include any positively charged species that is stable under the conditions in which the ionomer composition is synthesized, processed and used. Suitable cations may be used in combinations of two or more. Typically, such other cations are metal cations, which may be monovalent, divalent, trivalent, or multivalent. Monovalent metal cations include but are not limited to cations of potassium, lithium, silver, mercury, copper, and the like. Divalent metal cations include but are not limited to cations of beryllium, magnesium, calcium, strontium, barium, copper, cadmium, mercury, tin, lead, iron, cobalt, nickel, zinc, and the like. Trivalent metal cations include but are not limited to cations of aluminum, scandium, iron, yttrium, and the like. Multivalent metal cations include but are not limited to cations of titanium, zirconium, hafnium, vanadium, tantalum, tungsten, chromium, cerium, iron, and the like. When the metal cation is multivalent, complexing agents such as stearate, oleate, salicylate, and phenolate radicals may be included, as described in U.S. Pat. No. 3,404,134. Typically, when present, the metal cations used are monovalent or divalent metal cations, such as lithium, magnesium, zinc, potassium, and combinations of one or more of these metal cations.

In one embodiment, counterions other than sodium are present in at most "contaminant" amounts, as one would typically find in industrial situations, as would be recognized by persons of ordinary skill in the relevant art.

The resulting sodium-neutralized ethylene acid copolymer has a melt index, as determined in accordance with ASTM method D1238-89 at 190° C. and 2.16 kg, that is lower than that of the corresponding ethylene acid copolymer. The ionomer's melt index depends on a number of factors, including the melt index of the ethylene acid copolymer, the amount of copolymerized acid, the neutralization level, the identity of the cation and its valency. Moreover, the desired value of the ionomer's melt index may be determined by its intended end use. Typically, however, the ionomer has a melt index of about 1000 g/10 min or less, or about 750 g/10 min or less, or about 500 g/10 min or less, or about 250 g/10 min or less, or about 100 g/10 min or less, or about 50 g/10 min or less, or about 25 g/10 min or less, or about of 20 g/10 min or less, or about 10 g/10 min or less, or about 7.5 g/10 min or less, as determined in accordance with ASTM method D1238-89 at 190° C. and 2.16 kg.

In one embodiment, the ionomer is an at least partially sodium-neutralized ethylene acid dipolymer comprising (consisting essentially of) copolymerized units of:
(i) ethylene, and
(ii) from about 10 wt %, or from about 15 wt %, or from about 18 wt %, or from about 20 wt %, to about 30 wt %, or to about 25 wt %, or to about 23 wt % or to about 22 wt %, of at least one $\alpha,\beta$-unsaturated carboxylic acid having 3 to 10 carbon atoms,
wherein the weight percentages of the copolymerized units are based on the total weight of the ethylene acid copolymer and the sum of the weight percentages of the copolymerized units is 100 wt %, and wherein at least a portion of carboxylic acid groups of the $\alpha,\beta$-unsaturated carboxylic acid are neutralized to form an ionomer comprising carboxylate groups having sodium counterions.

In one embodiment, the ionomer is an at least partially sodium-neutralized ethylene acid terpolymer comprising copolymerized units of:
(i) ethylene,
(ii) from about 10 wt %, or from about 15 wt %, or from about 18 wt %, or from about 20 wt %, to about 30 wt %, or to about 25 wt %, or to about 23 wt % or to about 22 wt %, of at least one $\alpha,\beta$-unsaturated carboxylic acid having 3 to 10 carbon atoms,
(iii) from about 2 wt %, or from about 3 wt %, or from about 4 wt %, or from about 5 wt %, to about 15 wt %, or to about 12 wt %, or to about 11 wt %, or to about 10 wt %, of at least one $\alpha,\beta$-unsaturated carboxylic acid ester having 3 to 10 carbon atoms, and
(iv) optionally a derivative of an $\alpha,\beta$-unsaturated carboxylic acid other than (iii) in an amount such that (iii)+(iv) is about 15 wt % or less, or about 12 wt % or less, or about 11 wt % or less,
wherein the weight percentages of the copolymerized units are based on the total weight of the ethylene acid copolymer and the sum of the weight percentages of the copolymerized units is 100 wt %, and wherein at least a portion of carboxylic acid groups of the $\alpha,\beta$-unsaturated carboxylic acid are neutralized to form an ionomer comprising carboxylate groups having sodium counterions.

Such terpolymer ionomers are generally disclosed in International Patent Application Nos. WO 2015/199750A1 and WO 2014/100313A1, as well as in previously incorporated U.S. Provisional Application Ser. No. 62/333,371 (filed 9 May 2016).

In one embodiment of the dipolymer or terpolymer as described above, the $\alpha,\beta$-unsaturated carboxylic acid is methacrylic acid.

In one embodiment of the terpolymer as described above, the $\alpha,\beta$-unsaturated carboxylic acid ester is n-butyl acrylate, isobutyl acrylate or a mixture thereof.

In one embodiment of the terpolymer described above, the copolymer consists essentially of copolymerized units of (i), (ii) and (iii).

Thermoplastic Elastomer

Thermoplastic elastomers can be used in the multilayer polymeric interlayer described above. These materials generally provide polymeric interlayer sheets and laminates comprising these sheets with improved acoustic properties, as described in US Published Patent Application No. 2017/0320297A1. Generally speaking, these materials, also referred to as "elastomers", generally include materials with soft and hard segments, such as a polystyrene-based elastomer (soft segment: polybutadiene, polyisoprene/hard segment: polystyrene), a polyolefin-based elastomer (soft segment: ethylene propylene rubber/hard segment: polypropylene), a polyvinyl chloride-based elastomer (soft segment: polyvinyl chloride/hard segment: polyvinyl chloride), a polyurethane-based elastomer (soft segment: polyether, polyester, or polycarbonate/hard segment: polyurethane), a polyester-based elastomer (soft segment: aliphatic polyester/hard segment: aromatic polyester), a polyether ester-based elastomer (soft segment: polyether/hard segment: polyester), a polyamide-based elastomer (soft segment: polypropylene glycol, polytetramethylene ether glycol, polyester, or polyether/hard segment: polyamide (such as a nylon resin)), a polybutadiene-based elastomer (soft segment: amorphous butyl rubber/hard segment: syndiotactic 1,2-polybutadiene resin), an acrylic elastomer (soft segment: polyacrylate ester/hard segment: polymethyl methacrylate). It is to be noted that the above-described thermoplastic elastomers may be used solely or may be used in combination of two or more thereof.

A content of the hard segment in the thermoplastic elastomer is preferably about 5% by mass or more, or about 7% by mass or more, or about 8% by mass or more, or about 10% by mass or more, or about 14% by mass or more, or about 16% by mass or more, or about 18% by mass or more, relative to the total amount of the thermoplastic elastomer. A content of the hard segment is preferably about 40% by mass or less, or about 30% by mass or less, or about 20% by mass or less, relative to the total amount of the thermoplastic elastomer. When the content of the hard segment is less than about 5% by mass, there is a tendency for the molding of the layer B to be difficult, the height of the peak of tan δ is small, the flexural rigidity of the laminate is small, or the sound insulating properties in a high-frequency region is lowered. When the content of the hard segment is more than about 40% by mass, there is a tendency for the characteristics of the thermoplastic elastomer to be hardly exhibited, the stability of sound insulating performance is lowered, or the sound insulating characteristics in the vicinity of room temperature are lowered.

A content of the soft segment in the thermoplastic elastomer is preferably about 60% by mass or more, or about 70% by mass or more, or about 80% by mass or more, relative to the total amount of the thermoplastic elastomer. The content of the soft segment is preferably about 95% by mass or less, or about 92% by mass or less, or about 90% by mass or less, or about 88% by mass or less, or about 86% by mass or less, or about 84% by mass or less, or about 82% by mass or less relative to the total amount of the thermoplastic elastomer. When the content of the soft segment is less than about 60% by mass, the characteristics of the thermoplastic elastomer tend to be hardly exhibited. When the content of the soft segment is more than about 95% by mass, there is a tendency that the molding of the layer B is difficult, the height of the peak of tan δ is small, the flexural rigidity of the laminate is small, or the sound insulating properties in a high-frequency region are lowered. Here, in the case where a plurality of the thermoplastic elastomers is mixed, the contents of the hard segment and the soft segment in the thermoplastic elastomer are each considered as an average value of the mixture.

From the viewpoint of making both the moldability and the sound insulating properties compatible with each other, it is more preferred to use a block copolymer having a hard segment and a soft segment as the thermoplastic elastomer. Furthermore, from the viewpoint of further improving the sound insulating properties, it is preferred to use a polystyrene-based elastomer.

In addition, crosslinked rubbers of natural rubber, isoprene rubber, butadiene rubber, chloroprene rubber, nitrile rubber, butyl rubber, ethylene propylene rubber, urethane rubber, silicone rubber, chlorosulfonated polyethylene rubber, acrylic rubber, fluorine rubber, and the like may be used as the thermoplastic elastomer.

The thermoplastic elastomer is preferably a copolymer of an aromatic vinyl monomer and a vinyl monomer or a conjugated diene monomer, or a hydrogenated product of the copolymer. From the viewpoint of making both the function as a rubber exhibiting sound insulating properties and the function as a plastic compatible with each other, the copolymer is preferably a block copolymer having an aromatic vinyl polymer block and an aliphatic unsaturated hydrocarbon polymer block, for example, a polystyrene-based elastomer.

In the case where a copolymer having an aromatic vinyl polymer block and a vinyl polymer block or a conjugated diene polymer block, for example, a block copolymer having an aromatic vinyl polymer block and an aliphatic unsaturated hydrocarbon polymer block is used as the thermoplastic elastomer, the binding form of these polymer blocks is not particularly limited, and it may be any of a linear binding form, a branched binding form, a radial binding form, and a combined binding form of two or more thereof. Of those, a linear binding form is preferred.

When the aromatic vinyl polymer block is expressed as "a", and the aliphatic unsaturated hydrocarbon polymer block is expressed as "b", examples of the linear binding form include a diblock copolymer expressed by a-b, a triblock copolymer expressed by a-b-a or b-a-b, a tetrablock copolymer expressed by a-b-a-b, a pentablock copolymer expressed by a-b-a-b-a or b-a-b-a-b, an $(a\text{-}b)_n X$ type copolymer (X represents a coupling residual group, and n represents an integer of 2 or more), and a mixture thereof. Of those, a diblock copolymer or a triblock copolymer is preferred, and the triblock copolymer is more preferably a triblock copolymer expressed by a-b-a.

A sum total of an aromatic vinyl monomer unit and an aliphatic unsaturated hydrocarbon monomer unit in the block copolymer is preferably about 80% by mass or more, or about 95% by mass or more, or about 98% by mass or more relative to the whole of the monomer units. It is to be noted that a part or the whole of the aliphatic unsaturated hydrocarbon polymer blocks in the block copolymer may be hydrogenated.

A content of the aromatic vinyl monomer unit in the block copolymer is preferably about 5% by mass or more, or about 7% by mass or more, or about 8% by mass or more, or about 14% by mass or more, or about 16% by mass or more, or about 18% by mass or more, relative to the whole of the monomer units of the block copolymer. A content of the aromatic vinyl monomer unit is preferably about 40% by mass or less, or about 30% by mass or less, or about 25% by mass or less, or about 20% by mass or less, relative to the whole of the monomer units of the block copolymer.

When the content of the aromatic vinyl monomer unit in the block copolymer is less than about 5% by mass, there is a tendency that the molding of the layer A is difficult, a deviation of glasses is caused due to heat, the height of the peak of tan δ is small, the flexural rigidity of the laminate is small, or the sound insulating properties in a high-frequency region are lowered. When the content of the aromatic vinyl monomer unit in the block copolymer is more than about 40% by mass, there is a tendency that the characteristics as the thermoplastic elastomer are hardly exhibited, or the stability of sound insulating performance is lowered.

The content of the aromatic vinyl monomer unit in the block copolymer can be determined from a charge ratio of the respective monomers in synthesizing the block copolymer, or the measurement results of $^1$H-NMR or the like of the block copolymer. Here, in the case where a plurality of the block copolymers is mixed, the content of the aromatic vinyl monomer unit in the block copolymer is considered as an average value of the mixture.

In the aromatic vinyl polymer block, a monomer other than the aromatic vinyl monomer may be copolymerized so long as its amount is small. A proportion of the aromatic vinyl monomer unit in the aromatic vinyl polymer block is preferably about 80% by mass or more, or about 95% by mass or more, or about 98% by mass or more relative to the whole of the monomer units in the aromatic vinyl polymer block.

Examples of the aromatic vinyl monomer constituting the aromatic vinyl polymer block include styrene; alkylstyrenes, such as α-methylstyrene, 2-methylstyrene, 3-methylstyrene, 4-methylstyrene, 4-propylstyrene, 4-cyclohexylstyrene and 4-dodecylstyrene; arylstyrenes, such as 2-ethyl-4-benzyl styrene, 4-(phenylbutyl)styrene, 1-vinylnaphthalene and 2-vinylnaphthalene; halogenated styrenes; alkoxystyrenes; vinylbenzoate esters; and the like. These aromatic vinyl monomers may be used solely or may be used in combination of two or more thereof.

A content of the aliphatic unsaturated hydrocarbon monomer unit in the block copolymer is preferably about 60% by mass or more, or about 70% by mass or more, or about 75% by mass or more, or 80% by mass or more, relative to the whole of the monomer units of the block copolymer. The content of the aliphatic unsaturated hydrocarbon monomer unit in the block copolymer is preferably about 95% by mass or less, or about 92% by mass or less, or about 90% by mass or less, or about 88% by mass or less, or about 86% by mass or less, or about 84% by mass or less, or about 82% by mass or less, relative to the whole of the monomer units of the block copolymer.

When the content of the aliphatic unsaturated hydrocarbon monomer unit in the block copolymer is less than about 60% by mass, there is a tendency that the characteristics as the thermoplastic elastomer are hardly exhibited, or the stability of sound insulating performance is lowered. When the content of the aliphatic unsaturated hydrocarbon monomer unit in the block copolymer is more than about 95% by mass, there is a tendency that the molding of the layer B is difficult, the height of the peak of tan δ is small, the flexural rigidity of the laminate is small, or the sound insulating properties in a high-frequency region are lowered.

The content of the aliphatic unsaturated hydrocarbon monomer unit in the block copolymer can be determined from a charge ratio of the respective monomers in synthesizing the block copolymer, or the measurement results of $^1$H-NMR or the like of the block copolymer. Here, in the case where a plurality of the block copolymers is mixed, the content of the aliphatic unsaturated hydrocarbon monomer unit in the block copolymer is considered as an average value of the mixture.

In the aliphatic unsaturated hydrocarbon polymer block, a monomer other than the aliphatic unsaturated hydrocarbon monomer may be copolymerized so long as its amount is small. A proportion of the aliphatic unsaturated hydrocarbon monomer unit in the aliphatic unsaturated hydrocarbon polymer block is preferably about 80% by mass or more, or about 95% by mass or more, or about 98% by mass or more, relative to the whole of the monomer units in the aliphatic unsaturated hydrocarbon polymer block.

Examples of the aliphatic unsaturated hydrocarbon monomer constituting the aliphatic unsaturated hydrocarbon polymer block include ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-pentene, 3-methyl-1-hexene, 4-methyl-1-hexene, 5-methyl-1-hexene, 3,3-dimethyl-1-pentene, 3,4-dimethyl-1-pentene, 4,4-dimethyl-1-pentene, vinylcyclohexane, hexafluoropropene, tetrafluoroethylene, 2-fluoropropene, fluoroethylene, 1,1-difluoroethylene, 3-fluoropropene, trifluoroethylene, 3,4-dichloro-1-butene, butadiene, isoprene, dicyclopentadiene, norbornene, acetylene, and the like. These aliphatic unsaturated hydrocarbon monomers may be used solely or may be used in combination of two or more thereof.

From the viewpoints of ease of availability and handling properties, the aliphatic unsaturated hydrocarbon monomer is preferably an aliphatic unsaturated hydrocarbon having 2 or more carbon atoms, or an aliphatic hydrocarbon having 4 or more carbon atoms, and is preferably an aliphatic unsaturated hydrocarbon having 12 or less carbon atoms, or an aliphatic hydrocarbon having 8 or less carbon atoms. Among those, butadiene, isoprene, and a combination of butadiene and isoprene are preferred.

In addition, from the viewpoints of easiness of availability and handling properties as well as easiness of synthesis, the aliphatic unsaturated hydrocarbon monomer is preferably a conjugated diene. From the viewpoint of improving the heat stability, in the case of using a conjugated diene as the constituent unit of the aliphatic unsaturated hydrocarbon polymer block, the conjugated diene is preferably a hydrogenated product resulting from hydrogenating a part or the whole thereof. On that occasion, a hydrogenation ratio is preferably 80% or more, or 90% or more. The hydrogenation ratio as referred to herein is a value obtained by measuring an iodine value of the block copolymer before and after the hydrogenation reaction.

From the viewpoints of mechanical characteristics and molding processability, a weight average molecular weight of the block copolymer is preferably about 30,000 or more, or about 50,000 or more and preferably about 400,000 or less, or about 300,000 or less. A ratio (Mw/Mn) of weight average molecular weight to number average molecular weight of the block copolymer is preferably about 1.0 or more, and preferably about 2.0 or less, or about 1.5 or less. Here, the weight average molecular weight refers to a weight average molecular weight as reduced into polystyrene as determined by the gel permeation chromatography (GPC) measurement, and the number average molecular weight refers to a number average molecular weight as reduced into polystyrene as determined by the GPC measurement.

Though a production method of the block copolymer is not particularly limited, the block copolymer can be, for example, produced by an anionic polymerization method, a cationic polymerization method, a radical polymerization method, or the like. For example, in the case of anionic polymerization, specific examples thereof include:

(i) a method of successively polymerizing an aromatic vinyl monomer, a conjugated diene monomer, and subsequently an aromatic vinyl monomer by using an alkyllithium compound as an initiator;

(ii) a method of successively polymerizing an aromatic vinyl monomer and a conjugated diene monomer by using an alkyllithium compound as an initiator and subsequently adding a coupling agent to undergo coupling;

(iii) a method of successively polymerizing a conjugated diene monomer and subsequently an aromatic vinyl monomer by using a dilithium compound as an initiator;

and the like.

In the case of using a conjugated diene as the aliphatic unsaturated hydrocarbon monomer, by adding an organic Lewis base on the occasion of anionic polymerization, a 1,2-bond quantity and a 3,4-bond quantity of the thermoplastic elastomer can be increased, and the 1,2-bond quantity and the 3,4-bond quantity of the thermoplastic elastomer can be easily controlled by the addition amount of the organic Lewis base. By controlling them, the peak temperature or height of tan δ can be adjusted.

Examples of the organic Lewis base include esters, such as ethyl acetate; amines, such as triethylamine, N,N,N',N'-tetramethylethylenediamine (TMEDA) and N-methylmorpholine; nitrogen-containing heterocyclic aromatic compounds, such as pyridine; amides, such as dimethylacetamide; ethers, such as dimethyl ether, diethyl ether, tetrahydrofuran (THF) and dioxane; glycol ethers, such as ethylene glycol dimethyl ether and diethylene glycol dimethyl ether; sulfoxides, such as dimethyl sulfoxide; ketones, such as acetone and methyl ethyl ketone; and the like.

In the case of subjecting the unhydrogenated polystyrene-based elastomer to a hydrogenation reaction, the hydrogenation reaction can be conducted by dissolving the obtained unhydrogenated polystyrene-based elastomer in a solvent inert to a hydrogenation catalyst, or allowing the unhydrogenated polystyrene-based elastomer to react directly with hydrogen without being isolated from a reaction liquid in the presence of a hydrogenation catalyst. The hydrogenation ratio is preferably about 60% or more, or about 80% or more, or about 90% or more.

Examples of the hydrogenation catalyst include Raney nickel; heterogeneous catalysts in which a metal, such as Pt, Pd, Ru, Rh and/or Ni, is supported on a carrier, such as carbon, alumina and/or diatomaceous earth; Ziegler-based catalysts composed of a combination of a transition metal compound with an alkylaluminum compound and/or an alkyllithium compound; metallocene-based catalysts; and the like. The hydrogenation reaction can be generally conducted under conditions at a hydrogen pressure of about 0.1 MPa or more and about 20 MPa or less and at a reaction temperature of about 20° C. or higher and about 250° C. or lower for a reaction time of about 0.1 hours or more and about 100 hours or less.

In a preferred embodiment, the thermoplastic elastomer has a sea-island phase separated structure in which the hard segment block is included as an island component and the soft segment block is included as a sea component. It has been found that the phase separation size of an island component is sometimes increased in a layer to be used in an interlayer for a laminated glass, and therefore, the interlayer for a laminated glass shrinks when producing a laminated glass or the haze of the laminated glass is decreased, and also found that a laminated glass using an interlayer for a laminated glass having a specific structure has excellent sound insulating properties even when the thickness is reduced and also has low shrinkability.

More specifically in this embodiment, the thermoplastic elastomer includes a hard segment block and a soft segment block, and the layer B has a sea-island phase separated structure in which the hard segment block is included as an island component and the soft segment block is included as a sea component, and when the degree of orientation (1) is defined by the following formula (I) based on the maximum intensity value and the minimum intensity value in an arbitrary azimuth range of 180° including the azimuth at which the intensity reaches the maximum in the azimuthal intensity distribution of periodic scattering or coherent scattering by the hard segment block or the soft segment block obtained for the layer A by small-angle X-ray scattering measurement, the degree of orientation (1) is about 0.9 or less.

Degree of orientation (1)=(maximum intensity value−minimum intensity value)/(maximum intensity value+minimum intensity value)  (I)

It is preferred that the degree of orientation (2), as defined by the following formula (II), is about 10 or less.

Degree of orientation (2)=maximum intensity value/minimum intensity value  (II)

It is also preferred that, when an island component having a largest major axis size is selected from the island components having a substantially elliptical shape or a substantially continuous linear shape in each phase image obtained by observation with an atomic force microscope of a region in the range of 200 nm×200 nm at arbitrary 5 sites on a sliced surface obtained by slicing a central area in the thickness direction of the layer B along a plane substantially parallel to the layer B, the average of the major axis size of the selected island components is about 100 nm or less.

Specific examples of suitable thermoplastic elastomers can be found, for example, by reference to US Published Patent Application No. 2010/0239802.

In one preferred embodiment, the thermoplastic elastomer is a hydrogenated block copolymer formed by hydrogenating a block copolymer comprising at least a polymer block (A) constituted predominantly from an aromatic vinyl compound unit and a polymer block (B) constituted predominantly from a 1,3-butadiene unit or constituted predominantly from an isoprene unit and a 1,3-butadiene unit, wherein a content of the polymer block (A) is from about 5% to about 40% mass on the basis of a total amount of the hydrogenated block copolymer, wherein the polymer block (B) has a hydrogenation rate of about 70% or more, and wherein the hydrogenated block copolymer has a glass transition temperature of from about −45° C. to about 30° C.

In another preferred embodiment, the thermoplastic elastomer is a hydrogenated block copolymer formed by hydrogenating a block copolymer comprising at least a polymer block (C) constituted predominantly from an aromatic vinyl compound unit and a polymer block (D) constituted predominantly from a 1,3-butadiene unit or constituted predominantly from an isoprene unit and a 1,3-butadiene unit, wherein a content of the polymer block (C) is from about 10% to about 40% mass on the basis of a total amount of the hydrogenated block copolymer, wherein the polymer block (D) has a hydrogenation rate of about 80% or more, and wherein the hydrogenated block copolymer has a glass transition temperature of less than about −45° C.

In the above two preferred embodiments, desirably the aromatic vinyl compound is styrene, and/or the polymer block (B) and (D) are constituted predominantly from an isoprene unit and a 1,3-butadiene unit, and/or the hydrogenated block copolymer is a tri-block copolymer having an A1-B-A2 or C1-D-C2 type structure.

Ethylene Vinyl Acetate (EVA)

In the present invention, the acoustic damping layer can be an ethylene vinyl acetate (EVA)-type material, such as disclosed in US Published Patent Application No. 2016/0167348A1. Preferably, the EVA material comprises ethylene vinyl acetate having a vinyl acetate content of greater than about 25 wt %, or from about 30 wt %, to about 40 wt %, or to about 35 wt %, or about 33 wt %; an initial melt flow index of at least about 14 g/10 min, and a final melt flow index of about 2 g/10 min or lower, or about 1.5 g/10 min or lower, after the material is cross-linked by one or more methods known to those of ordinary skill in the relevant art (for example, thermally crosslinked with the aid of a peroxide crosslinker).

Silanes

Silanes suitable for use in accordance with the present invention are dialkoxysilanes. Without being held to theory, it is believed that the hydrolyzed silanol portion of the silane can form an adhesive bond with the glass surface (silanols), thereby enhancing the adhesive force at the interface between the polymer and glass surface. The remaining portion of the silane molecule should then 'anchor' in some fashion and to some degree, with the surrounding ionomer resin 'matrix'. One way to achieve this is to choose functional groups which would interact in a favorable manner to allow the silane to either bond, chemically or through ionic or hydrogen bonding or sufficient van der Waals forces, or be of a size and shape that sterically, can "bridge" between the interlayer and glass surface, thereby increasing the adhesion over the same interlayer without the advantageous silane additive.

In one embodiment, each of the alkoxy groups individually contains from 1 to 3 carbon atoms. Suitable examples include diethoxydimethylsilane, diethoxyl(methyl)vinylsilane, 1,3-diethoxy-1,1,3,3-tertramethyldisiloxane, dimethoxydimethylsilane, dimethoxylmethylvinylsilane, methyl diethoxysilane, diisopropyldimethoxysilane, dicyclopentyldimethoxysilane, γ-aminopropyl-N-cyclohexylmethyldimethoxysilane, 3-aminopropylmethyldimethoxysilane, N-phenyl-3-aminopropylmethyldimethoxysilane, N-phenyl-3-aminopropylmethyldiethoxysilane, N-β-(aminoethyl)-γ-aminopropylmethyldimethoxysilane and 3-glycidoxypropylmethyl diethoxysilane.

In another embodiment, in addition to the alkoxy groups the silane also contains an "active" chemical group for bonding into the ionomer resin matrix, for example, a carboxylic acid-reactive group such as an amino group or a glycidyl group. Suitable examples include γ-aminopropyl-N-cyclohexylmethyldimethoxysilane, 3-aminopropylmethyldimethoxysilane, N-phenyl-3-aminopropylmethyldimethoxysilane, N-phenyl-3-aminopropylmethyldiethoxysilane, N-β-(aminoethyl)-γ-aminopropylmethyldimethoxysilane and 3-glycidoxypropylmethyl diethoxysilane.

Desirably the silane is a liquid under ambient conditions (for example, at 20° C.). Specific such examples include N-β-(aminoethyl)-γ-aminopropylmethyldimethoxysilane (CAS #3069-29-2) and 3-glycidoxypropylmethyldiethoxysilane (CAS #2897-60-1).

In another embodiment, in addition to the alkoxy groups the silane also may contain a less interactive chemical group which can reduce the degree of bonding or adherence into the interlayer resin matrix, for example, a methyl group, phenyl or octadecyl group.

In another embodiment, the coating can be formulated in such a way as to possess both adequate levels of adhesion to the glass substrate and also to the interlayer to which it has been deposited, while providing the ability to primarily fail (separate) in a cohesive fashion when sufficiently large forces are acting upon the laminate structure (e.g. impact event).

Additional Adhesion Modifiers

In addition to the use of the silanes, it is also possible to further control the adhesion of the interlayer to glass or the like, if desired.

For example, reactive functional group-containing olefinic polymers wherein the functional group is at least one group selected from a carboxyl group and a derivative group of a carboxyl group (herein below, referred to as carboxylic group) (herein below, referred to as a carboxylic group-containing olefinic polymer) can also be used as adhesion modifiers. Suitable carboxylic group-containing olefinic polymers are disclosed, for example, in U.S. Pat. No. 7,989,083.

Although a critical minimum level of adhesion is necessary to maintain sufficient laminate integrity (e.g. preventing delamination defects) and sufficient retention of glass in a post-fractured state, optimization or adjustment of the impact performance of the resulting laminate can be made by intent. Though an optimal addition amount of the adhesion modifier (cumulative) varies with the additive to be used and the resin to be adhesion modified, it is preferably adjusted in such a manner that an adhesive force of the resulting laminate to a glass is generally adjusted to about 3 or more and about 10 or less in a pummel test (described in International Patent Application WO 03/033583A1 or the like). In particular, in the case where high penetration resistance is required, the addition amount of the adhesion modifier is more preferably adjusted in such a manner that the adhesive force is about 3 or more and about 6 or less, whereas in the case where high glass shattering preventing properties are required, the addition amount of the adhesion modifier is more preferably adjusted in such a manner that the adhesive force is about 7 or more and about 10 or less.

Other Additives

Other than the aforementioned silanes and other adhesion modifiers, the resin composition and masterbatch of the present invention may contain one or more other additives including, for example, an antioxidant, an ultraviolet ray absorber, a photostabilizer, an antiblocking agent, a pigment, a dye, a heat shielding material (infrared ray absorber) and the like, or mixtures thereof. Such other additives are in a general sense well known to those of ordinary skill in the relevant art.

Examples of the antioxidant include phenol-based antioxidants, phosphorus-based antioxidants, sulfur-based antioxidants, and the like. Of those, phenol-based antioxidants are preferred, and alkyl-substituted phenol-based antioxidants are especially preferred.

Examples of the phenol-based antioxidant include acrylate-based compounds, such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; alkyl-substituted phenol-based compounds, such as 2,6-di-t-butyl-4-methylphenol, 2,6-di-t-butyl-4-ethylphenol, octadecyl-3-(3,5-di-t-butyl-4-hydroxyphenyl)propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-trix(2-methyl-4-hydroxy-5-t-butylphenyl) butane, 1,3,5-trimethyl-2,4,6-tris(3,5-di-t-butyl-4-hydroxybenzyl)benzene, tetrakis(methylene-3-(3',5'-di-t-butyl-4'-hydroxyphenyl)propionate)methane and triethylene glycol bis(3-(3-t-butyl-4-hydroxy-5-methylphenyl)propionate); triazine group-containing phenol-based compounds, such as 1,3,5-tris(2,6-dimethyl-3-hydroxy-4-t-butylbenzyl)-1,3,5-triazine-2,4,6(1H,3H,5H)-trione, 6-(4-hydroxy-3,5-di-t-butylanilino)-2,4-bis-octylthio-1,3,5-triazine, 6-(4-hydroxy-3,5-dimethyl anilino)-2,4-bis-octylthio-1,3,5-triazine, 6-(4-hydroxy-3-methyl-5-t-butylanilino)-2,4-bis-octyl thio-1,3,5-triazine and 2-octylthio-4,6-bis-(3,5-di-t-butyl-4-oxyanilino)-1,3,5-triazine; and the like.

Examples of the phosphorus-based antioxidant include monophosphite-based compounds, such as triphenyl phosphite, diphenylisodecyl phosphite, phenyldiisodecyl phosphite, tris(nonylphenyl) phosphite, tris(dinonylphenyl) phosphite, tris(2-t-butyl-4-methylphenyl) phosphite, tris(2,4-di-t-butyl) phosphite, tris(cyclohexylphenyl) phosphite, 2,2-methylenebis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene; diphosphite-based compounds, such as 4,4'-butylidene-bis(3-methyl-6-t-butylphenyl-di-tridecylphosphite), 4,4'-isopropylidene-bis(phenyl-di-alkyl(C12-C15)phosphite), 4,4'-isopropylidene-bis(diphenylmonoalkyl(C12-C15) phosphite), 1,1,3-tris(2-methyl-4-di-tridecylphosphite-5-t-butylphenyl)butane and tetrakis(2,4-di-t-butylphenyl)-4,4'-biphenylene phosphite; and the like. Of those, monophosphite-based compounds are preferred.

Examples of the sulfur-based antioxidant include dilauryl 3,3'-thiodipropionate, distearyl 3,3-thiodipropionate, lauryl stearyl 3,3'-thiodipropionate, pentaerythritol-tetrakis-(p-lauryl-thiopropionate), 3,9-bis(2-dodecylthioethyl)-2,4,8,10-tetraoxaspiro[5.5]undecane, and the like.

These antioxidants can be used solely or in combination of two or more thereof. In the final resin composition, the antioxidant utilized is typically about 0.001 parts by weight or more, or about 0.01 parts by weight or more, based on 100 parts by weight of the ionomer resin. In addition, the amount of antioxidant utilized is typically about 5 parts by weight or less, or about 1 part by weight or less, based on 100 parts by weight of the ionomer resin. Examples of the ultraviolet ray absorber include benzotriazole-based ultraviolet ray absorbers, such as 2-(5-methyl-2-hydroxyphenyl)benzotriazole, 2-[2-hydroxy-3,5-bis($\alpha,\alpha'$-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole and 2-(3,5-di-t-amyl-2-hydroxyphenyl)benzotriazole, 2-(2'-hydroxy-5'-t-octylphenyl)triazole; hindered amine-based ultraviolet ray absorbers, such as 2,2,6,6-tetramethyl-4-piperidyl benzoate, bis(2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate and 4-(3-(3,5-di-t-butyl-4-hydroxyphenyl)propionyloxy)-1-(2-(3-(3,5-di-t-butyl-4-hydroxy phenyl)propionyloxy)ethyl)-2,2,6,6-tetramethylpiperidine; benzoate-based ultraviolet ray absorbers, such as 2,4-di-t-butylphenyl-3,5-di-t-butyl-4-hydroxybenzoate and hexadecyl-3,5-di-t-butyl-4-hydroxybenzoate; and the like.

These ultraviolet ray absorbers can be used solely or in combination of two or more thereof. In the final resin composition, the amount of ultraviolet ray absorber utilized is typically about 10 ppm by weight or more, or about 100 ppm by weight or more, based on the weight of the ionomer resin. In addition, the amount of ultraviolet ray absorber utilized is typically about 50,000 ppm or less, or about 10,000 ppm or less, based on the weight of the ionomer resin.

In some embodiments, it is also possible to use two or more types of UV absorbers in combination.

In other embodiments, no UV absorber is added, or the laminate is substantially UV absorber additive free.

Examples of the photostabilizer include hindered amine-based materials, such as "ADEKA STAB LA-57" (a trade name) manufactured by Adeka Corporation, and "TINUVIN 622" (a trade name) manufactured by Ciba Specialty Chemicals Inc.

When a laminated glass is prepared by incorporating a heat-shielding fine particle or a heat-shielding compound as the heat-shielding material into the interlayer of the present invention to give a heat-shielding function to the laminate, a transmittance at a wavelength of 1,500 nm can be regulated to about 50% or less, or the TDS value (calculated from ISO 13837:2008) can be regulated to less than about 43%.

Examples of the heat-shielding fine particle include a metal-doped indium oxide, such as tin-doped indium oxide (ITO), a metal-doped tin oxide, such as antimony-doped tin oxide (ATO), a metal-doped zinc oxide, such as aluminum-doped zinc oxide (AZO), a metal element composite tungsten oxide represented by a general formula: $M_mWO_n$ (M represents a metal element; m is about 0.01 or more and about 1.0 or less; and n is about 2.2 or more and about 3.0 or less), zinc antimonate ($ZnSb_2O_5$), lanthanum hexaboride, and the like. Of those, ITO, ATO, and a metal element composite tungsten oxide are preferred, and a metal element composite tungsten oxide is more preferred. Examples of the metal element represented by M in the metal element composite tungsten oxide include Cs, Tl, Rb, Na, K, and the like, and in particular, Cs is preferred. From the viewpoint of heat shielding properties, m is preferably about 0.2 or more, or about 0.3 or more, and it is preferably about 0.5 or less, or about 0.4 or less.

From the viewpoint of transparency of the ultimate laminate, an average particle diameter of the heat shielding fine particle is preferably about 100 nm or less, or about 50 nm or less. It is to be noted that the average particle diameter of the heat shielding particle as referred to herein means one measured by a laser diffraction instrument.

In the final resin composition, a content of the heat shielding fine particle is preferably about 0.01% by weight or more, or about 0.05% by weight or more, or about 0.1% by weight or more, or about 0.2% by weight or more relative to the weight of the ionomer resin. In addition, the content of the heat shielding fine particle is preferably about 5% by weight or less, or about 3% by weight or less.

Examples of the heat shielding compound include phthalocyanine compounds, naphthalocyanine compounds, and the like. From the viewpoint of further improving the heat shielding properties, it is preferred that the heat shielding compound contains a metal. Examples of the metal include Na, K, Li, Cu, Zn, Fe, Co, Ni, Ru, Rh, Pd, Pt, Mn, Sn, V, Ca, Al, and the like, with Ni being especially preferred.

A content of the heat shielding compound is preferably about 0.001% by weight or more, or about 0.005% by weight or more, or about 0.01% by weight or more, based on the weight of the ionomer resin. In addition, the content of the heat shielding compound is preferably about 1% by weight or less, or about 0.5% by weight or less.

Production of Cohesive Modifier Compositions

The dispersion coating composition may include other additives known in the art. For example, the composition may include a wax additive, such as a microcrystalline wax or a polyethylene wax, which serves as an anti-blocking agent as well as to improve the coefficient of friction of the final coated substrate. Other types of additives include fumed silica, which reduces the tack of the coating at room temperature, fillers, cross-linking agents, anti-static agents, defoamers, dyes, brighteners, processing aids, flow enhancing additives, lubricants, dyes, pigments, flame retardants, impact modifiers, nucleating agents, anti-blocking agents, thermal stabilizers, UV absorbers, UV stabilizers, surfactants, chelating agents, and coupling agents and the like.

Inorganic fillers include calcium carbonate, titanium dioxide, silica, talc, barium sulfate, carbon black, ceramics, chalk or mixtures thereof. Organic fillers include natural starch, modified starch, chemically modified starch, rice starch, corn starch, wood flour, cellulose, and mixtures thereof.

Production of Surface Treated Interlayers

Coating methods include embodiments where the blend combination is in the form of an aqueous dispersion, extrusion coating wherein the blend combination is in molten form and lamination methods wherein the blend combination is in the form of a preformed film. The coating composition can be applied to one or both sides of the substrate, as well as to the surface of the glass or other rigid substrate.

Additionally, the production of highly grafted silane acid copolymers for direct incorporation into the interlayer, coextruded or laminated onto the surface, or to be disposed onto the surface of the interlayer in some fashion (electrostatic powder coating, ink-jet, gravure, slot-die coating or any other means known in the art.

Sheets/Interlayers

Sheets of the resin compositions of the present invention can be prepared by conventional melt extrusion or melt molding processes suitable for making interlayers for glass laminates. Such processes are well-known to those of ordinary skill in the relevant art, as exemplified by the previously incorporated publications.

The sheets can be monolayer or multilayer sheets. For example, multilayer sheets can be formed having a functional core layer sandwiched between two exterior layers and other optional interior layers. In one embodiment, at least one (or both) of the exterior layers of the multilayer interlayer is a sheet of the resin composition in accordance with the present invention.

As one example of a functional core layer can be mentioned an acoustic damping layer, such as a polystyrene copolymer intermediate film (see JP2007-91491A), a polyvinyl acetal layer (see US Published Patent Application No. 2013/0183507, U.S. Pat. No. 8,741,439, JP Published Patent Application No. 2012-214305A and U.S. Pat. No. 8,883, 317), a viscoelastic acrylic layer (see U.S. Pat. No. 7,121, 380), a layer containing a copolymer of styrene and a rubber-based resin monomer (see JP Published Patent Application No. 2009-256128A), a layer containing a polyolefin (see US Published Patent Application No. 2012/0204940), a layer containing an ethylene/vinyl acetate polymer (see International Patent Application No. WO 2015/013242A1), a layer containing an ethylene acid copolymer (see International Patent Application No. WO 2015/085165A1).

In one specific embodiment, the intermediate layer is thermoplastic elastomer resin, such as disclosed in International Patent Application Nos. WO 2016/076336A1, WO 2016/076337A1, WO 2016/076338A1 WO 2016/076339A1 and WO 2016/076340A1, as well as U.S. patent application Ser. No. 15/588,986 (filed 8 May 2017). In a more specific embodiment, the thermoplastic elastomer resin is a hydrogenated product of a block copolymer having:

(i) an aromatic vinyl polymer block (a) containing about 60 mol % or more of an aromatic vinyl monomer unit, based on the aromatic vinyl polymer block, and (ii) an aliphatic unsaturated polymer block (b) containing about 60 mol % or more of a conjugated diene monomer unit, based on the aliphatic unsaturated polymer block, wherein the aliphatic unsaturated polymer block (b) contains about 50 mol % or more in total of an isoprene unit and a butadiene unit as the conjugated diene monomer unit, and wherein the amount of residual carbon-carbon double bonds the aliphatic unsaturated polymer block derived from conjugated diene monomer units is from about 2 to about 40 mol %.

Further, the interlayer as a whole can be symmetric having a substantially consistent thickness, or can be asymmetric wherein a portion of the interlayer has a thickness greater than another portion (for example, partial or full "wedge", as discussed in U.S. patent application Ser. No. 15/588,986 (filed 8 May 2017) and U.S. Provisional Application No. 62/414,015 (filed 28 Oct. 2016)). Further, the laminate can be substantially clear or having coloring in all or a portion (for example, "shadeband" as discussed in U.S. patent application Ser. No. 15/588,986 (filed 8 May 2017) and U.S. Provisional Application No. 62/414,015 (filed 28 Oct. 2016)).

In an asymmetric construction such as a wedge, the thinner portion of the interlayer should possess the thicknesses of a symmetric construction, while the thickness of the thick portion will depend on various parameters such as wedge angle. In one embodiment of a wedge-shaped interlayer, the thicker edge has a thickness of about 1850 μm or less, or about 1600 μm or less, or about 1520 μm or less, or about 1330 μm or less, or about 1140 μm or less; and the thinner edge has a thickness of about 600 μm or more, or about 700 μm or more, or about 760 μm or more.

In addition, a concave and convex structure, such as an embossing, can be formed on the surface of the interlayer of the present invention by conventionally known methods for assistance in deairing in laminate production. The shape of the embossing is not particularly limited, and those which are conventionally known can be adopted.

In one embodiment, at least one surface (and preferably both surfaces) of the interlayer for a laminated glass is shaped. By shaping at least one surface of the interlayer for a laminated glass, in the case where a laminated glass is produced, an air bubble present at an interface between the interlayer for a laminated glass and a glass easily escapes to the outside of the laminated glass, and thus, the appearance of the laminated glass can be made favorable. It is preferred to shape at least one surface of the interlayer for a laminated glass by an embossing roll method. By shaping the surface of the interlayer for a laminated glass, a concave portion and/or a convex portion are/is formed on the surface of the interlayer for a laminated glass.

An embossing roll to be used in the embossing roll method can be produced, for example, by using an engraving mill (mother mill) having a desired concave-convex pattern and transferring the concave-convex pattern to the surface of a metal roll. Further, an embossing roll can also be produced using laser etching. Further, after forming a fine concave-convex pattern on the surface of a metal roll as described above, the surface with the fine concave-convex pattern is subjected to a blast treatment using an abrasive material such as aluminum oxide, silicon oxide, or glass beads, whereby a finer concave-convex pattern can also be formed.

Further, the embossing roll to be used in the embossing roll method is preferably subjected to a release treatment. In the case where an embossing roll which is not subjected to a release treatment is used, it becomes difficult to release the interlayer for a laminated glass from the embossing roll. Examples of a method for the release treatment include known methods such as a silicone treatment, a Teflon (registered trademark) treatment, and a plasma treatment.

The depth of the concave portion and/or the height of the convex portion (hereinafter sometimes referred to as "the height of the embossed portion") of the surface of the interlayer for a laminated glass shaped by an embossing roll method or the like are/is typically about 5 μm or more, or about 10 μm or more, or about 20 μm or more. The height of the embossed portion is typically about 150 μm or less, or about 100 μm or less, or about 80 μm or less.

In the invention, the height of the embossed portion refers to a maximum height roughness (Rz) defined in JIS B 0601 (2001). The height of the embossed portion can be measured by, for example, utilizing the confocal principle of a laser microscope or the like. Incidentally, the height of the embossed portion, that is, the depth of the concave portion or the height of the convex portion may vary within a range that does not depart from the gist of the invention.

Examples of the form of the shape imparted by an embossing roll method or the like include a lattice, an oblique lattice, an oblique ellipse, an ellipse, an oblique groove, and a groove. The inclination angle of such form is typically from about 10° to about 80° with respect to the film flow direction (MD direction). Further, the shaping pattern may be a regular pattern or an irregular pattern such as a random matte pattern, or a pattern such as disclosed in U.S. Pat. No. 7,351,468. The shaping by an embossing roll method or the like may be performed on one surface of the interlayer for a laminated glass, or may be performed on both surfaces, but is more typically performed on both surfaces.

Laminates

It is possible to produce laminates of the present invention by conventionally known methods. Examples thereof include using a vacuum laminator, using a vacuum bag, using a vacuum ring, using a nip roll, and the like. In addition, a method can be used in which, after temporary contact bonding, the resultant laminate is put into an autoclave for final bonding. Further description of these methods can be found in, for example, U.S. Pat. No. 7,642,307.

In the case of using a vacuum laminator, for example, a known instrument which is used for production of a solar cell can be used, and the assembly is laminated under a reduced pressure of about $1 \times 10^{-6}$ MPa or more and about $3 \times 10^{-2}$ MPa or less at a temperature of about 100° C. or higher, or about 130° C. or higher, and about 200° C. or lower, or about 170° C. or lower. The method of using a vacuum bag or a vacuum ring is, for example, described in EP Published Patent Application No. 1235683A1 (CA Published Patent Application No. 2388107A1) and, for example, the assembly is laminated under a pressure of about $2 \times 10^{-2}$ MPa at about 130° C. or higher and about 145° C. or lower.

In the case of using a nip roll, for example, there is exemplified a method in which after conducting first temporary contact bonding at a temperature of a flow starting temperature of the skin resin or lower, temporary contact bonding is further conducted under a condition close to the flow starting temperature. Specifically, for example, there is exemplified a method in which the assembly is heated at about 30° C. or higher and about 100° C. or lower by an infrared heater or the like, then de-aerated by a roll, and further heated at about 50° C. or higher and about 150° C. or lower, followed by conducting contact bonding by a roll to achieve bonding or temporary bonding.

Though the autoclave process which is supplementarily conducted after the temporary contact bonding is variable depending upon the thickness or constitution of a module, it is, for example, carried out under a pressure of about 1 MPa or more and about 15 MPa or less at a temperature of about 120° C. or higher and about 160° C. or lower for about 0.5 hours or more and about 2 hours or less.

Well-known "no-autoclave" processes may alternatively be used to process laminates.

Advantageously, the glass to be used for preparing a laminated glass is not particularly limited. Inorganic glasses, such as a float sheet glass, a polished sheet glass, a figured glass, a wired sheet glass, a heat-ray absorbing glass, and conventionally known organic glasses, such as polymethyl methacrylate and polycarbonate, and the like can be used. These glasses may be any of colorless, colored, transparent, or non-transparent glasses. These glasses may be used solely, or may be used in combination of two or more thereof.

The laminated glass of the present invention can be suitably used for a windshield for automobile, a side glass for automobile, a sunroof for automobile, a rear glass for automobile, or a glass for head-up display; a building member for a window, a wall, a roof, a sunroof, a sound insulating wall, a display window, a balcony, a handrail wall, or the like; a partition glass member of a conference room; a solar panel; and the like. Further information on such uses can be found by reference to the previously incorporated publications.

In one embodiment, this invention relates to a laminate structure comprising a stack of at least one glass substrate adhered to an adhesive polymeric interlayer. The interfacial region or zone of the adhesive polymeric interlayer (API) comprises discrete zones.

As discussed previously, the discrete zones are substantially discrete, that is, the zones, which may or may not cover generally the entire area of the adhesive polymeric interlayer (API) surface, in the planar direction, are substantially separate from each other with defined boundaries. The likely random imperfections in discreteness of the zones given the limitations of the materials, and/or the process of making the materials—for example, two zones that are substantially discrete may "bleed into" each other, de minimis—are acknowledged in the present invention. The discrete zones in a given plane may be co-planar to at least one of the glass substrate, or to the API layer. The discrete debonding zones are different from the API in at least one physical and/or one chemical characteristic.

In one embodiment, the laminate structure can comprise more than one glass substrate and corresponding polymeric interlayers in between. For example, the number of glass substrates can be 1, 2, 3, . . . 0.18, 19, and 20.

Embodiments described below use a two-glass substrate with one API layer, but only as an exemplar. It is understood that the description applies to multiple glass substrates with corresponding multiple API layers.

In one embodiment, the laminated structure of the present invention comprises more than one discrete debonding zones.

In one embodiment, the discrete debonding zone comprises a polymeric material chemically and/or physically different from that of the API. For example, the adhesive discrete debonding zone and the API differ in terms of molecular weight, crystallinity, density, glass transition temperature, melt-flow index, chemical composition, additive, chemical modification, or a combination of one or more of such characteristics.

In another embodiment, this invention relates to an adhesive polymeric interlayer (API), wherein one of the first or second discrete zones comprises the first polymeric material, and the other of the first and second discrete zones comprises a first material chemically and/or physically different from the first polymeric material. In yet another embodiment, this invention relates to an adhesive polymeric interlayer (API), wherein the first material is characterized by: (i) a molecular weight different than that of the first polymeric material, (ii) a crystallinity different than that of the first polymeric material, (iii) a density different than that of the first polymeric material, (iv) a glass transition temperature different than that of the first polymeric material, (v) a melt flow index different than that of the first polymeric material, or (vi) a combination of one or more of said characteristics.

In another aspect, the invention provides debonding region with a controlled debonding treatment that is substantially discrete and creates debonding zones with variable fracture toughness with higher and lower fracture energy.

Controlled Debonding Zones Characteristics

Peel Adhesion Difference Between Discrete Debonding Zones

In an embodiment of the invention, the polymeric interlayer comprises more than one discrete zone or a controlled debonding zone, alternatively called debonding zone, such that the difference in mean peel adhesion between the zone with minimum peel adhesion ($Z_{min}$) and the zone with maximum peel adhesion ($Z_{max}$) is at least about 2 multiples. Stated differently, $(Z_{max}/Z_{min}) \geq 2$. In an embodiment of the invention, a laminate comprises an interlayer with multiple debonding zones on the surface of the API, such that the difference in peel strength or mean peel adhesion between any two zones $Z_1$ and $Z_2$ is greater than or equal to 0, or, their ratio is greater than or equal to 1. In other words, $Z_1 - Z_2 \geq 0$, or $Z_1/Z_2 \geq 1$. However, in this embodiment, the $(Z_{max}/Z_{min}) \geq 2$ condition is maintained.

In one embodiment, the peel strength ratio of the zone with maximum peel strength ($Z_{max}$) to the zone with the minimum peel strength ($Z_{min}$), that is, ($Z_{max}/Z_{min}$) is greater than or equal to 5. In one embodiment, all zones have different peel strengths; one or more zones have the same peel strength; or one or more zones have different peel strengths.

To elaborate further, this invention encompasses the embodiment, wherein more than one zones discrete from each other demonstrate different peel strength, but the ($Z_{max}/Z_{min}) \geq 2$ condition is maintained. For example, in a laminate with four zones in the interlayer at the interface, $Z_1$, $Z_2$, $Z_3$, and $Z_4$, $Z_1$ is the zone with maximum peel strength and $Z_3$ is the zone with minimum peel strength. Zones $Z_1$, $Z_2$, $Z_3$, and $Z_4$ have different peel strengths. In an equation form:

$(Z_1/Z_3) \geq 2$; and $Z_1 \neq Z_2 \neq Z_3 \neq Z_4$.

In an embodiment of the invention, the interlayer comprises more than one zones at the interface discrete from each other demonstrate the same peel strength, or different peel strength, but the $(Z_{max}/Z_{min}) \geq 2$ condition is maintained. For example, in a laminate with ten zones in the interlayer, $Z_1$, $Z_2$, $Z_3$, $Z_4$, $Z_5$, $Z_6$, $Z_7$, $Z_8$, $Z_9$, and $Z_{10}$, $Z_4$ is the zone with maximum peel strength and $Z_8$ is the zone with minimum peel strength. Zones $Z_2$, $Z_6$, and $Z_9$ have the same peel strength. Zones $Z_1$, $Z_2$, and $Z_7$ have different peel strengths. In an equation form:

$Z_2 = Z_6 = Z_9$;

$(Z_4/Z_8) \geq 2$; and $Z_1 \neq Z_2 \neq Z_7$.

In one embodiment, $Z_{max}$ is the mean peel strength of the untreated API surface comprising discrete zones. In other words, for example in a leopard-spots type of arrangement of the discrete zones, the dark spots are the discrete zones treated by controlled debonding zone treatment, and the inter-zone space on the API surface that is untreated has a mean peel strength of $Z_{max}$. In another embodiment, $Z_{min}$ is the mean peel strength of the API surface that has been treated with controlled debonding zone treatment. And interspersed on the treated API surface are provided discrete zones that have a discrete zone that corresponds to $Z_{max}$ mean peel strength. In other words, a spectrum of discrete zones exists on the API surface, some treated, some untreated, the ratio of two zones $(Z_{max}/Z_{min}) \geq 2$. In between the discrete zones with a $Z_{min}$ and a $Z_{max}$ mean peel strengths exist all other discrete zones comprising various mean peel strength numbers that are same or not same, and that which are treated or not treated for debonding.

Shape Difference Between Controlled Debonding Discrete Zones

In one embodiment, the polymeric interlayer comprises more than one discrete zones, such that the discrete (debonding) zones have regular shapes. The debonding zone is defined according to the peel adhesion strength. Stated another way, to a normal eye an interlayer may appear homogeneous and uniform, but for the purposes of the present invention, the debonding zones are defined by the difference in their peel strengths.

Figure 10:
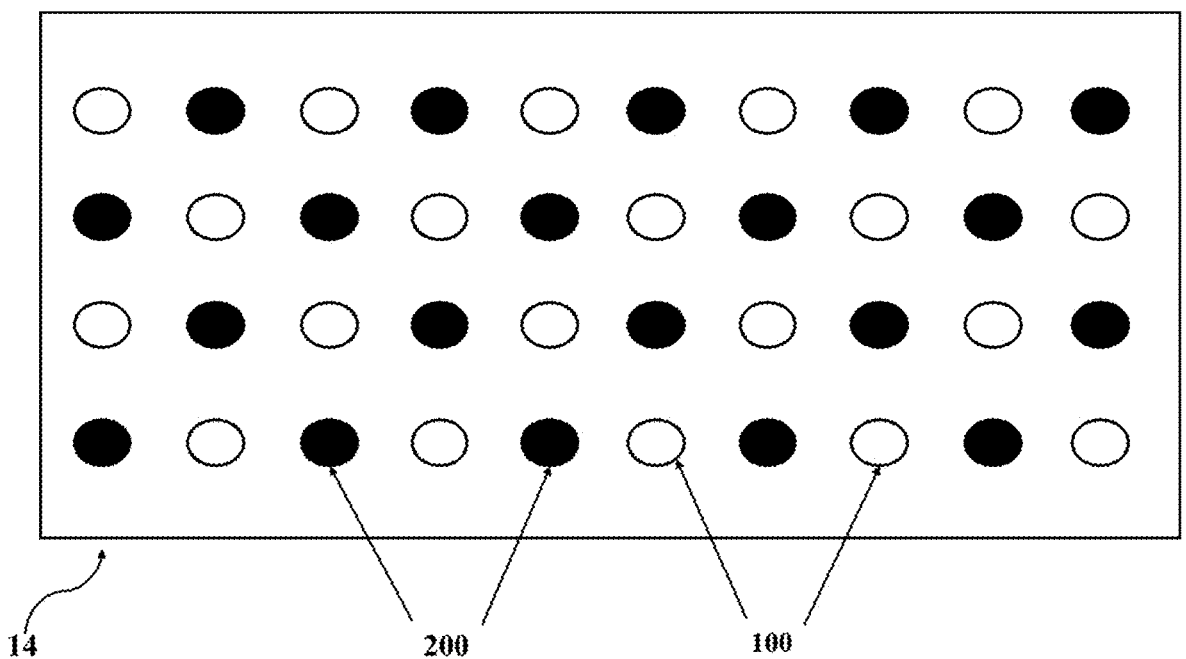
FIG. 10 shows a representative grid-like pattern of an interlayer with dot-shaped zones.

Regular shapes include for example, circles, square, rectangles, ovals, triangles, and such other shapes, with an effective area generally greater than the thickness of the interlayer, in one embodiment. Irregular shapes include random shapes with closed boundaries, with effective area generally greater than the thickness of the interlayer in another embodiment. In one embodiment, the debonding zones are spaced adjacent one another. In another embodiment, the debonding zones are separated by interstitial space. In one embodiment, some debonding zones are spaced adjacent one another, and other debonding zones are separated by interstitial space. Other shapes include one-dimensionally oriented patterns such as gridlines, crisscross lines, lattice, interweave, random lines, concentric and eccentric circles, spaghetti patterns, flat strips, etc. FIG. 10 depicts a representative interlayer 14 having two zones, whereby dots are distributed in a grid-like pattern. Dots 100 are representative of the zones with a minimum mean peel adhesion and dots 200 are representative of the zones with a maximum mean peel adhesion. In one embodiment, a cluster of smaller shapes would form a zone, with a second cluster of smaller shapes that would form a second zone. In such embodiments, the aggregate peel strength of each cluster is measured, and the cluster of shapes is considered a debonding zone. The shapes within the cluster could be random shapes, regular, mixed regular shapes, mixed random shapes, or mixed random and regular shapes. The debonding zones as clusters could also comprise one-dimensionally oriented patterns such as gridlines, crisscross lines, random lines, concentric and eccentric circles, spaghetti patterns, flat strips, etc.

In case of gridlines, and such other one-dimensionally oriented shapes on the interlayer, the difference in peel strength between a gridline and the adjacent debonding zone may be measured by preparing a separate interlayer debonding zone with the strength of the gridline, and comparing it with the debonding zone on the interlayer of interest in between two gridlines, that is, in the interstitial spaces between two gridlines. Even in case of one-dimensionally oriented patterns, the area of such shapes may determine the peel-strength difference between a controlled debonding zone and the interstitial spaces or the difference between two adjacent controlled debonding zones.

The debonding zone is defined according to the peel adhesion strength. Stated another way, to a normal eye the interfacial region of the API may appear homogeneous and uniform, but for the purposes of the present invention, the debonding zones are defined by the difference in their peel strengths.

In one embodiment of the laminate structures described above, the weight content of the discrete zones, as a percentage of the total of the API including said discrete zones, is in the range of 1% to about 30%. Stated differently, the weight content is any one of the following numbers, as measured in percentage of the API: 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30. The weight content can be any number within a range defined by any two numbers herein, including the endpoints of the range.

In one embodiment of the laminate structures described above, the weight content of the discrete zones, as a percentage of the total of the API including said discrete zones, is in the range of 0.00001% to about 30%. Stated differently, the weight content is any one of the following numbers, as measured in percentage of the API: 0.00001, 0.00002, 0.00005, 0.00008, 0.00010, 0.001, 0.005, 0.008, 0.010, 0.05, 0.1, 0.5, 1.0.

In another embodiment of the laminate structures described above, the weight content of the discrete debonding zones, as a percentage of the total of the API including said discrete debonding zones, is in the range of 0.001% to about 1%. Stated differently, the weight content is any one of the following numbers, as measured in percentage of the API: 0.001, 0.10, 0.020, 0.030, 0.040, 0.050, 0.060, 0.070, 0.080, 0.090, and 1.00. The weight content can be any number within a range defined by any two numbers herein, including the endpoints of the range.

In one embodiment, the separation between two discrete debonding zones is clearly demarcated. Stated another way, the difference in peel strength is sufficiently drastic to show a difference. In another embodiment, the difference between two zones is more diffuse. In one embodiment, there is a spatial distance between two discrete debonding zones of at least about 0.1 mm; or about 0.5 mm; or about 1.0 mm; or about 2.0 mm; or about 3.0 mm; or about 4.0 mm; or about 5.0 mm; or about 10.0 mm; or about 25.0 mm; or about 50.0 mm; or about 100.0 mm.

In one embodiment, the debonding zones' peel strengths are engendered by using different polymer or the same polymer to form the interlayer. In both cases, the present invention envisages the scenario where the molecular weight of the polymer is used to generate the debonding zones. In another embodiment, the thickness of the polymer interlayer is used to generate the debonding zones. In yet another embodiment, external treatment of the polymer interlayer is used to generate the debonding zones. In one embodiment, the debonding zones are generated by treatment of the interlayer polymeric adhesive and/or the laminate glass adhering to the polymeric interlayer. The debonding treatment can include the application of a chemically active substance or mixture which can alter the adhesive/debonding characteristics at or near the interface between the rigid substrate and the polymeric interlayer. A treatment can alternatively include the application of an energetic 'beam', such as electron beam, gamma, plasma, electron discharge, laser, ion-beam or other energetic means such as, plasma, flame-treatment, UV/VIS/IR radiation, microwaves or chemical alteration, via, coating techniques, chemical vapor deposition, and the like. Combinations of a chemical substance(s) with energetic sources can also be employed as a treatment. The treatment may be of an infinitesimally small dimension (i.e. only surface atomic or molecular monolayer affected by the treatment or the treatment may be of a finite thickness (approaching up to 10% (we need to decide on this number) of the interlayer thickness. The treatment may be applied to either the rigid substrate or to the polymeric interlayer or both. It is generally most advantageous to apply the treatment to the polymeric interlayer. The application directly to and as part of the interlayer provides for ease of the manufacturing (e.g. roll-to-roll processing and the like).

In one embodiment, a debonding zones are prepared by providing masks with specific patterns such that the curing light or curing effect reaches the surface of the interlayer in a fashion such that the adhesive tendencies image the mask. So, for example, in one embodiment, a masks with various patterns can be envisioned such that the desired debonding zone equivalents on the mask are covered in glass with different refractive indices or shapes (concave and convex, for example), so that the curing light reaches the interlayer surface in a frequency that generates specific adhesive patterns.

In an embodiment, the invention provides a polymeric interlayer comprising at least two zones, wherein the zone with maximum mean peel adhesion has a mean peel adhesion that is at least about 2 times greater than a mean peel adhesion of the zone with minimum mean peel adhesion; or about 3 times greater than a mean peel adhesion of the zone with minimum mean peel adhesion; or about 4 times greater than a mean peel adhesion of the zone with minimum mean peel adhesion; or about 5 times greater than a mean peel adhesion of the zone with minimum mean peel adhesion; or about 6 times greater than a mean peel adhesion of the zone with minimum mean peel adhesion; or about 7 times greater than a mean peel adhesion of the zone with minimum mean peel adhesion; or about 8 times greater than a mean peel adhesion of the zone with minimum mean peel adhesion; or about 9 times greater than a mean peel adhesion of the zone with minimum mean peel adhesion.

In an embodiment, the invention provides a polymeric interlayer comprising at least two zones, wherein the zone with maximum mean peel adhesion has a mean peel adhesion that is at least about 10 times greater than a mean peel adhesion of the zone with minimum mean peel adhesion; or wherein the zone with maximum mean peel adhesion has a mean peel adhesion that is at least about 15 times greater than a mean peel adhesion of the zone with minimum mean peel adhesion; or wherein the zone with maximum mean peel adhesion has a mean peel adhesion that is at least about 20 times greater than a mean peel adhesion of the zone with minimum mean peel adhesion; or wherein the zone with maximum mean peel adhesion has a mean peel adhesion that is at least about 25 times greater than a mean peel adhesion of the zone with minimum mean peel adhesion; or wherein the zone with maximum mean peel adhesion has a mean peel adhesion that is at least about 30 times greater than a mean peel adhesion of the zone with minimum mean peel adhesion; or wherein the maximum mean peel adhesion is at least about 35 times greater than the minimum mean peel adhesion; or wherein the maximum mean peel adhesion is at least about 40 times greater than the minimum mean peel adhesion; or wherein the maximum mean peel adhesion is at least about 45 times greater than the minimum mean peel adhesion; or wherein the maximum mean peel adhesion is at least about 50 times greater than the minimum mean peel adhesion; or wherein the maximum mean peel adhesion is at least about 55 times greater than the minimum mean peel adhesion; or wherein the maximum mean peel adhesion is at least about 60 times greater than the minimum mean peel adhesion; or wherein the maximum mean peel adhesion is at least about 65 times greater than the minimum mean peel adhesion; or wherein the maximum mean peel adhesion is at least about 70 times greater than the minimum mean peel adhesion; or wherein the maximum mean peel adhesion is at least about 75 times greater than the minimum mean peel adhesion; or wherein the maximum mean peel adhesion is at least about 80 times greater than the minimum mean peel adhesion; or wherein the maximum mean peel adhesion is at least about 85 times greater than the minimum mean peel adhesion; or wherein the maximum mean peel adhesion is at least about 90 times greater than the minimum mean peel adhesion; or wherein the maximum mean peel adhesion is at least about 95 times greater than the minimum mean peel adhesion; or wherein the maximum mean peel adhesion is at least about 100 times greater than the minimum mean peel adhesion; or wherein the maximum mean peel adhesion is at least about 105 times greater than the minimum mean peel adhesion; or wherein the maximum mean peel adhesion is at least about 110 times greater than the minimum mean peel adhesion; or wherein the maximum mean peel adhesion is at least about 115 times greater than the minimum mean peel adhesion; or wherein the maximum mean peel adhesion is at least about 120 times greater than the minimum mean peel adhesion; or wherein the maximum mean peel adhesion is at least about 125 times greater than the minimum mean peel adhesion; or wherein the maximum mean peel adhesion is at least about 130 times greater than the minimum mean peel adhesion; or wherein the maximum mean peel adhesion is at least about 135 times greater than the minimum mean peel adhesion; or wherein the maximum mean peel adhesion is at least about 140 times greater than the minimum mean peel adhesion; or wherein the maximum mean peel adhesion is at least about 145 times greater than the minimum mean peel adhesion; or wherein the maximum mean peel adhesion is at least about 150 times greater than the minimum mean peel adhesion; or wherein the maximum mean peel adhesion is at least about 155 times greater than the minimum mean peel adhesion; or wherein the maximum mean peel adhesion is at least about 160 times greater than the minimum mean peel adhesion; or wherein the maximum mean peel adhesion is at least about 165 times greater than the minimum mean peel adhesion; or wherein the maximum mean peel adhesion is at least about 170 times greater than the minimum mean peel adhesion; or wherein the maximum mean peel adhesion is at least about 175 times greater than the minimum mean peel adhesion; or wherein the maximum mean peel adhesion is at least about 180 times greater than the minimum mean peel adhesion; or wherein the maximum mean peel adhesion is at least about 185 times greater than the minimum mean peel adhesion; or wherein the maximum mean peel adhesion is at least about 190 times greater than the minimum mean peel adhesion; or wherein the maximum mean peel adhesion is at least about 195 times greater than the minimum mean peel adhesion; or wherein the maximum mean peel adhesion is at least about 200 times greater than the minimum mean peel adhesion; or wherein the maximum mean peel adhesion is at least about 205 times greater than the minimum mean peel adhesion; or wherein the maximum mean peel adhesion is at least about 210 times greater than the minimum mean peel adhesion; or wherein the maximum mean peel adhesion is at least about 215 times greater than the minimum mean peel adhesion; or wherein the maximum mean peel adhesion is at least about 200 times greater than the minimum mean peel adhesion; or wherein the maximum mean peel adhesion is at least about 225 times greater than the minimum mean peel adhesion; or wherein the maximum mean peel adhesion is at least about 230 times greater than the minimum mean peel adhesion; or wherein the maximum mean peel adhesion is at least about 235 times greater than the minimum mean peel adhesion; or wherein the maximum mean peel adhesion is at least about 240 times greater than the minimum mean peel adhesion; or wherein the maximum mean peel adhesion is at least about 245 times greater than the minimum mean peel adhesion; or wherein the maximum mean peel adhesion is at least about 250 times greater than the minimum mean peel adhesion.

In an embodiment, the maximum mean peel adhesion is at least about 10 times greater than the minimum mean peel adhesion. In an embodiment, the maximum mean peel adhesion is at least about 20 times greater than the minimum mean peel adhesion. In an embodiment, the maximum mean peel adhesion is at least about 30 times greater than the minimum mean peel adhesion. In an embodiment, the maximum mean peel adhesion is at least about 40 times greater than the minimum mean peel adhesion. In an embodiment, the maximum mean peel adhesion is at least about 50 times greater than the minimum mean peel adhesion. In an embodiment, the maximum mean peel adhesion is at least about 60 times greater than the minimum mean peel adhesion. In an embodiment, the maximum mean peel adhesion is at least about 70 times greater than the minimum mean peel adhesion. In an embodiment, the maximum mean peel adhesion is at least about 80 times greater than the minimum mean peel adhesion. In an embodiment, the maximum mean peel adhesion is at least about 90 times greater than the minimum mean peel adhesion. In an embodiment, the maximum mean peel adhesion is at least about 100 times greater than the minimum mean peel adhesion. In an embodiment, the maximum mean peel adhesion is at least about 110 times greater than the minimum mean peel adhesion. In an embodiment, the maximum mean peel adhesion is at least about 120 times greater than the minimum mean peel adhesion. In an embodiment, the maximum mean peel adhesion is at least about 130 times greater than the minimum mean peel adhesion. In an embodiment, the maximum mean peel adhesion is at least about 140 times greater than the minimum mean peel adhesion. In an embodiment, the maximum mean peel adhesion is at least about 150 times greater than the minimum mean peel adhesion. In an embodiment, the maximum mean peel adhesion is at least about 160 times greater than the minimum mean peel adhesion. In an embodiment, the maximum mean peel adhesion is at least about 170 times greater than the minimum mean peel adhesion. In an embodiment, the maximum mean peel adhesion is at least about 180 times greater than the minimum mean peel adhesion. In an embodiment, the maximum mean peel adhesion is at least about 190 times greater than the minimum mean peel adhesion. In an embodiment, the maximum mean peel adhesion is at least about 200 times greater than the minimum mean peel adhesion. In an embodiment, the maximum mean peel adhesion is at least about 210 times greater than the minimum mean peel adhesion. In an embodiment, the maximum mean peel adhesion is at least about 220 times greater than the minimum mean peel adhesion. In an embodiment, the maximum mean peel adhesion is at least about 230 times greater than the minimum mean peel adhesion. In an embodiment, the maximum mean peel adhesion is at least about 240 times greater than the minimum mean peel adhesion. In an embodiment, the maximum mean peel adhesion is at least about 250 times greater than the minimum mean peel adhesion.

In an embodiment, the invention provides a polymeric interlayer comprising at least two zones, wherein the zone with maximum mean peel adhesion has a mean peel adhesion that is from about 2 times to about 250 times greater than a mean peel adhesion of the zone with minimum mean peel adhesion; or wherein or wherein the maximum mean peel adhesion is from about 3 times to about 225 times greater than the minimum mean peel adhesion; or wherein or wherein the maximum mean peel adhesion is from about 4 times to about 200 times greater than the minimum mean peel adhesion; or wherein or wherein the maximum mean peel adhesion is from about 5 times to about 175 times greater than the minimum mean peel adhesion; or wherein or wherein the maximum mean peel adhesion is from about 5 times to about 150 times greater than the minimum mean peel adhesion; or wherein or wherein the maximum mean peel adhesion is from about 5 times to about 125 times greater than the minimum mean peel adhesion; or wherein or wherein the maximum mean peel adhesion is from about 5 times to about 100 times greater than the minimum mean peel adhesion; or wherein or wherein the maximum mean peel adhesion is from about 10 times to about 95 times greater than the minimum mean peel adhesion; or wherein the maximum mean peel adhesion is from about 15 times to about 90 times greater than the minimum mean peel adhesion; or wherein the maximum mean peel adhesion is from about 20 times to about 85 times greater than the minimum mean peel adhesion; or wherein the maximum mean peel adhesion is from about 25 times to about 80 times greater than the minimum mean peel adhesion; or wherein the maximum mean peel adhesion is from about 30 times to about 75 times greater than the minimum mean peel adhesion; or wherein the maximum mean peel adhesion is from about 35 times to about 70 times greater than the minimum mean peel adhesion; or wherein the maximum mean peel adhesion is from about 40 times to about 65 times greater than the minimum mean peel adhesion; or wherein the maximum mean peel adhesion is from about 45 times to about 60 times greater than the minimum mean peel adhesion; or wherein the maximum mean peel adhesion is from about 50 times to about 55 times greater than the minimum mean peel adhesion.

In an embodiment, the invention provides a polymeric interlayer comprising at least two zones, wherein the zone with maximum mean peel adhesion has a mean peel adhesion that is from about 2 times to about 5 times greater than a mean peel adhesion of the zone with minimum mean peel adhesion; or wherein or wherein the maximum mean peel adhesion is from about 5 times to about 10 times greater than the minimum mean peel adhesion; or wherein or wherein the maximum mean peel adhesion is from about 10 times to about 15 times greater than the minimum mean peel adhesion; or wherein the maximum mean peel adhesion is from about 15 times to about 20 times greater than the minimum mean peel adhesion; or wherein the maximum mean peel adhesion is from about 20 times to about 25 times greater than the minimum mean peel adhesion; or wherein the maximum mean peel adhesion is from about 25 times to about 30 times greater than the minimum mean peel adhesion; or wherein the maximum mean peel adhesion is from about 30 times to about 35 times greater than the minimum mean peel adhesion; or wherein the maximum mean peel adhesion is from about 35 times to about 40 times greater than the minimum mean peel adhesion; or wherein the maximum mean peel adhesion is from about 40 times to about 45 times greater than the minimum mean peel adhesion; or wherein the maximum mean peel adhesion is from about 45 times to about 50 times greater than the minimum mean peel adhesion; or wherein the maximum mean peel adhesion is from about 50 times to about 55 times greater than the minimum mean peel adhesion; or wherein the maximum mean peel adhesion is from about 55 times to about 60 times greater than the minimum mean peel adhesion; or wherein the maximum mean peel adhesion is from about 60 times to about 65 times greater than the minimum mean peel adhesion; or wherein the maximum mean peel adhesion is from about 65 times to about 70 times greater than the minimum mean peel adhesion; or wherein the maximum mean peel adhesion is from about 70 times to about 75 times greater than the minimum mean peel adhesion; or wherein the maximum mean peel adhesion is from about 75 times to about 80 times greater than the minimum mean peel adhesion; or wherein the maximum mean peel adhesion is from about 80 times to about 85 times greater than the minimum mean peel adhesion; or wherein the maximum mean peel adhesion is from about 85 times to about 90 times greater than the minimum mean peel adhesion; or wherein the maximum mean peel adhesion is from about 90 times to about 95 times greater than the minimum mean peel adhesion; or wherein the maximum mean peel adhesion is from about 95 times to about 100 times greater than the minimum mean peel adhesion or wherein the maximum mean peel adhesion is from about 100 times to about 105 times greater than the minimum mean peel adhesion; or wherein the maximum mean peel adhesion is from about 105 times to about 110 times greater than the minimum mean peel adhesion; or wherein the maximum mean peel adhesion is from about 110 times to about 115 times greater than the minimum mean peel adhesion; or wherein the maximum mean peel adhesion is from about 115 times to about 120 times greater than the minimum mean peel adhesion; or wherein the maximum mean peel adhesion is from about 120 times to about 125 times greater than the minimum mean peel adhesion; or wherein the maximum mean peel adhesion is from about 125 times to about 130 times greater than the minimum mean peel adhesion; or wherein the maximum mean peel adhesion is from about 130 times to about 135 times greater than the minimum mean peel adhesion; or wherein the maximum mean peel adhesion is from about 135 times to about 140 times greater than the minimum mean peel adhesion; or wherein the maximum mean peel adhesion is from about 140 times to about 145 times greater than the minimum mean peel adhesion; or wherein the maximum mean peel adhesion is from about 145 times to about 150 times greater than the minimum mean peel adhesion; or wherein the maximum mean peel adhesion is from about 150 times to about 155 times greater than the minimum mean peel adhesion; or wherein the maximum mean peel adhesion is from about 155 times to about 160 times greater than the minimum mean peel adhesion; or wherein the maximum mean peel adhesion is from about 160 times to about 165 times greater than the minimum mean peel adhesion; or wherein the maximum mean peel adhesion is from about 165 times to about 170 times greater than the minimum mean peel adhesion; or wherein the maximum mean peel adhesion is from about 170 times to about 175 times greater than the minimum mean peel adhesion; or wherein the maximum mean peel adhesion is from about 175 times to about 180 times greater than the minimum mean peel adhesion; or wherein the maximum mean peel adhesion is from about 180 times to about 185 times greater than the minimum mean peel adhesion; or wherein the maximum mean peel adhesion is from about 185 times to about 190 times greater than the minimum mean peel adhesion; or wherein the maximum mean peel adhesion is from about 190 times to about 195 times greater than the minimum mean peel adhesion; or wherein the maximum mean peel adhesion is from about 195 times to about 200 times greater than the minimum mean peel adhesion; or wherein the maximum mean peel adhesion is from about 200 times to about 205 times greater than the minimum mean peel adhesion; or wherein the maximum mean peel adhesion is from about 205 times to about 210 times greater than the minimum mean peel adhesion; or wherein the maximum mean peel adhesion is from about 210 times to about 215 times greater than the minimum mean peel adhesion; or wherein the maximum mean peel adhesion is from about 215 times to about 220 times greater than the minimum mean peel adhesion; or wherein the maximum mean peel adhesion is from about 220 times to about 225 times greater than the minimum mean peel adhesion; or wherein the maximum mean peel adhesion is from about 225 times to about 230 times greater than the minimum mean peel adhesion; or wherein the maximum mean peel adhesion is from about 230 times to about 235 times greater than the minimum mean peel adhesion; or wherein the maximum mean peel adhesion is from about 235 times to about 240 times greater than the minimum mean peel adhesion; or wherein the maximum mean peel adhesion is from about 240 times to about 245 times greater than the minimum mean peel adhesion; or wherein the maximum mean peel adhesion is from about 245 times to about 250 times greater than the minimum mean peel adhesion.

In an embodiment, the invention provides a polymeric interlayer comprising at least two zones, wherein at least one of the zones has a mean peel adhesion of from about 0.1 to about 4.0 kJ/m$^2$; or wherein at least one of the zones has a mean peel adhesion of from about 0.25 to about 3.5 kJ/m$^2$; or wherein at least one of the zones has a mean peel adhesion of from about 0.5 to about 3.0 kJ/m$^2$; or wherein at least one of the zones has a mean peel adhesion of from about 0.75 to about 2.5 kJ/m$^2$; or wherein at least one of the zones has a mean peel adhesion of from about 1.0 to about 2.0 kJ/m$^2$; or wherein at least one of the zones has a mean peel adhesion of from about 1.25 to about 1.5 kJ/m$^2$.

In yet another embodiment, the invention provides a polymeric interlayer comprising at least two zones, wherein at least one of the zones has a mean peel adhesion of from about 0.1 to about 0.5 kJ/m$^2$; or wherein at least one of the zones has a mean peel adhesion of from about 0.5 to about 1.0 kJ/m$^2$; or wherein at least one of the zones has a mean peel adhesion of from about 1.0 to about 1.5 kJ/m$^2$; or wherein at least one of the zones has a mean peel adhesion of from about 1.5 to about 2.0 kJ/m$^2$; or wherein at least one of the zones has a mean peel adhesion of from about 2.0 to about 2.5 kJ/m$^2$; or wherein at least one of the zones has a mean peel adhesion of from about 2.5 to about 3.0 kJ/m$^2$; or wherein at least one of the zones has a mean peel adhesion of from about 3.0 to about 3.5 kJ/m$^2$; or wherein at least one of the zones has a mean peel adhesion of from about 3.5 to about 4.0 kJ/m$^2$.

In yet another embodiment, the invention provides a polymeric interlayer comprising at least two zones, wherein at least one of the zones has a mean peel adhesion of from about 8.0 to about 12.0 kJ/m$^2$; or wherein at least one of the zones has a mean peel adhesion of from about 8.5 to about 11.5 kJ/m$^2$; or wherein at least one of the zones has a mean peel adhesion of from about 9.0 to about 11.0 kJ/m$^2$; or wherein at least one of the zones has a mean peel adhesion of from about 9.5 to about 10.5 kJ/m$^2$.

In yet another embodiment, the invention provides a polymeric interlayer comprising at least two zones, wherein at least one of the zones has a mean peel adhesion of from about 8.0 to about 8.5 kJ/m$^2$; or wherein at least one of the zones has a mean peel adhesion of from about 8.5 to about 9.0 kJ/m$^2$; or wherein at least one of the zones has a mean peel adhesion of from about 9.0 to about 9.5 kJ/m$^2$; or wherein at least one of the zones has a mean peel adhesion of from about 10.0 to about 10.5 kJ/m$^2$; or wherein at least one of the zones has a mean peel adhesion of from about 10.5 to about 11.0 kJ/m$^2$; or wherein at least one of the zones has a mean peel adhesion of from about 11.0 to about 11.5 kJ/m$^2$; or wherein at least one of the zones has a mean peel adhesion of from about 11.5 to about 12.0 kJ/m$^2$.

In one embodiment comprising at least two zones, the mean peel adhesion of the zone with the maximum mean peel adhesion is in the range of from about 0.3 kJ/m$^2$ to about 12.0 kJ/m$^2$. Stated another way, the mean peel adhesion can be any one of the following numbers in kJ/m$^2$. 0.3, 0.4, 0.5, . . . , 1.0, 1.5, 2.0, . . . 3.0, 4.0, 5.0, 6.0, 7.0, 8.0, 9.0, 10.0, 11.0, and 12.0.

In one embodiment, such mean peel adhesion is within the range defined by selecting any two numbers above, including the end-points of such range.

In an embodiment, the invention provides a polymeric interlayer comprising at least two zones, wherein the zones are distributed in an ordered pattern. In an embodiment, the zones are distributed in a grid, in concentric circles or in a dot pattern. In another embodiment, the invention provides a polymeric interlayer comprising at least two zones, wherein the zones are distributed stochastically.

In another embodiment, the invention provides a polymeric interlayer comprising at least two zones, wherein at least one of the zones comprises a polyvinylacetal, an ionomer, a thermoplastic elastomer, a silane, an ethylvinylacetate, or combinations thereof. In an embodiment, at least one of the zones comprises a polyvinylacetal. In an embodiment, at least one of the zones comprises an ionomer. In an embodiment, at least one of the zones comprises a thermoplastic elastomer. In an embodiment, at least one of the zones comprises a silane. In an embodiment, at least one of the zones comprises an ethylvinylacetate. In an embodiment, at least one of the zones comprises a combination of one of these materials.

In yet another embodiment, the invention provides a polymeric interlayer comprising at least two zones, wherein the zones each comprise a polyvinylacetal, an ionomer, a thermoplastic elastomer, a silane, an ethylvinylacetate, or combinations thereof. In an embodiment, the zones each comprise a polyvinylacetal. In yet another embodiment, both of the zones comprise an ionomer. In an embodiment, the zones each comprise a thermoplastic elastomer. In an embodiment, the zones each comprise a silane. In an embodiment, the zones each comprise an ethylvinylacetate. In an embodiment, the zones each comprise a combination of these materials.

In another embodiment, the invention provides a polymeric interlayer comprising at least two zones, wherein at least one of the zones comprises the ionomer and the ionomer is a sodium-neutralized ethylene·α,β-unsaturated carboxylic acid copolymer. In another embodiment, the invention provides a polymeric interlayer comprising at least two zones, wherein the zones each comprise the ionomer and the ionomer is a sodium-neutralized ethylene·α,β-unsaturated carboxylic acid copolymer.

In another embodiment, the invention provides a polymeric interlayer comprising at least two zones, wherein at least one of the zones comprises the polyvinylacetal and the polyvinylacetal is a polyvinylbutyral. In another embodiment, the invention provides a polymeric interlayer comprising at least two zones, wherein the zones each comprise the polyvinylacetal and the polyvinylacetal is a polyvinylbutyral.

In yet another embodiment, the invention provides a polymeric interlayer comprising at least two zones, wherein at least one of the zones further comprises an adhesion modifying agent. In an embodiment, the adhesion modifying agent is a silane, an alkali metal salt, an alkaline earth metal salt or a carboxylic group-containing olefinic polymer. In an embodiment, the adhesion modifying agent is a silane. In an embodiment, the adhesion modifying agent is an alkali metal salt. In an embodiment, the adhesion modifying agent is an alkaline earth metal salt. In an embodiment, the adhesion modifying agent is a carboxylic group-containing olefinic polymer.

In another embodiment, the invention provides a polymeric interlayer comprising at least two zones, wherein at least one of the zones comprises the adhesion modifying agent in a range of from about 5% to about 25% by weight of combined weight in the zone. In another embodiment, the invention provides a polymeric interlayer comprising at least two zones, wherein at least one of the zones comprises the adhesion modifying agent in a range of from about 10% to about 20% by weight of combined weight in the zone.

In another embodiment, the invention provides a polymeric interlayer comprising at least two zones, wherein at least one of the zones comprises the adhesion modifying agent in a range of from about 5% to about 10% by weight of combined weight in the zone; or wherein at least one of the zones comprises the adhesion modifying agent in a range of from about 10% to about 15% by weight of combined weight in the zone; or wherein at least one of the zones comprises the adhesion modifying agent in a range of from about 15% to about 20% by weight of combined weight in the zone; or wherein at least one of the zones comprises the adhesion modifying agent in a range of from about 20% to about 25% by weight of combined weight in the zone.

In another embodiment, the invention provides a polymeric interlayer comprising at least two zones, wherein at least one of the zones comprises the adhesion modifying agent in a range of from about 50% to about 75% by weight of combined weight in the zone. In another embodiment, the invention provides a polymeric interlayer comprising at least two zones, wherein at least one of the zones comprises the adhesion modifying agent in a range of from about 60% to about 70% by weight of combined weight in the zone.

In another embodiment, the invention provides a polymeric interlayer comprising at least two zones, wherein at least one of the zones comprises the adhesion modifying agent in a range of from about 50% to about 55% by weight of combined weight in the zone; or wherein the adhesion modifying agent is present in a range of from about 55% to about 60% by weight of combined weight in the zone; or wherein the adhesion modifying agent is present in a range of from about 65% to about 70% by weight of combined weight in the zone; or wherein the adhesion modifying agent is present in a range of from about 70% to about 75% by weight of combined weight in the zone.

In yet another embodiment, the invention provides a polymeric interlayer comprising at least two zones, wherein the interlayer has a thickness of from about 0.1 mm to about 10.0 mm; or wherein the interlayer has a thickness of from about 0.25 mm to about 7.5 mm; or wherein the interlayer has a thickness of from about 0.35 mm to about 5.0 mm; or wherein the interlayer has a thickness of from about 0.5 mm to about 2.5 mm.

In yet another embodiment, the invention provides a polymeric interlayer comprising at least two zones, wherein the interlayer has a thickness of from about 0.1 mm to about 1.0 mm; or wherein the interlayer has a thickness of from about 1.0 mm to about 2.0 mm; or wherein the interlayer has a thickness of from about 2.0 mm to about 3.0 mm; or wherein the interlayer has a thickness of from about 3.0 mm to about 4.0 mm; or wherein the interlayer has a thickness of from about 4.0 mm to about 5.0 mm; or wherein the interlayer has a thickness of from about 5.0 mm to about 6.0 mm; or wherein the interlayer has a thickness of from about 6.0 mm to about 7.0 mm; or wherein the interlayer has a thickness of from about 7.0 mm to about 8.0 mm; or wherein the interlayer has a thickness of from about 8.0 mm to about 9.0 mm; or wherein the interlayer has a thickness of from about 9.0 mm to about 10.0 mm.

In a further embodiment, the invention provides a polymeric interlayer comprising at least two zones, wherein the interlayer is disposed between two panes of glass. In an embodiment, at least one of the glass panes is float glass. In an embodiment, both of the glass panes are float glass. In an embodiment, the interlayer is in contact with the tin side of the float glass.

In a further embodiment, the invention provides a polymeric interlayer comprising at least two zones, wherein at least one of the zones is shaped as a dot, a circle, a square, a rectangle, a pentagon, a hexagon; or is amorphous. In a further embodiment, the invention provides a polymeric interlayer comprising at least two zones, wherein the zones are each shaped as a dot, a circle, an oval, a triangle, a square, a rectangle, a pentagon, a hexagon; or is amorphous. In an embodiment, at least one of the zones are shaped as a dot. In an embodiment, at least one of the zones are shaped as a circle. In an embodiment, at least one of the zones are shaped as an oval. In an embodiment, at least one of the zones are shaped as a triangle. In an embodiment, at least one of the zones are shaped as a square. In an embodiment, at least one of the zones are shaped as a rectangle. In an embodiment, at least one of the zones are shaped as a pentagon. In an embodiment, at least one of the zones are shaped as a hexagon. In an embodiment, at least one of the zones are amorphous.

In a further embodiment, the invention provides a polymeric interlayer comprising at least two zones, wherein at least one of the zones is shaped as gridlines, crisscross lines, random lines, concentric circles, eccentric circles, spaghetti patterns and flat strips. In a further embodiment, the invention provides a polymeric interlayer comprising at least two zones, wherein the zones are each shaped as gridlines, crisscross lines, random lines, concentric circles, eccentric circles, spaghetti patterns and flat strips. In an embodiment, at least one of the zones are shaped as gridlines. In an embodiment, at least one of the zones are shaped as criss-cross lines. In an embodiment, at least one of the zones are shaped as random lines. In an embodiment, at least one of the zones are shaped as concentric circles. In an embodiment, at least one of the zones are shaped as eccentric circles. In an embodiment, at least one of the zones are shaped as a spaghetti pattern. In an embodiment, at least one of the zones are shaped as a flat strip.

In a further embodiment, the invention provides a polymeric interlayer comprising at least two zones, wherein the zones have a size in a range of from about 0.5 times a thickness of the interlayer to about 10 times the thickness of the interlayer; or wherein the zones have a size in a range of from about 1.5 times the thickness to about 9.0 times the thickness of the interlayer; or wherein the zones have a size in a range of from about 2.0 times the thickness to about 8.0 times the thickness of the interlayer; or wherein the zones have a size in a range of from about 3.0 times the thickness to about 7.0 times the thickness of the interlayer; or wherein the zones have a size in a range of from about 4.0 times the thickness to about 6.0 times the thickness of the interlayer; or wherein the zones have a size in a range of from about 4.5 times the thickness to about 5.5 times the thickness of the interlayer; or wherein the zones have a size that is about 5.0 times the thickness to of the interlayer.

In a further embodiment, the invention provides a polymeric interlayer comprising at least two zones, wherein the zones have a size in a range of from about 0.5 times a thickness of the interlayer to about 1.5 times the thickness of the interlayer; or wherein the zones have a size in a range of from about 1.5 times the thickness to about 2.0 times the thickness of the interlayer; or wherein the zones have a size in a range of from about 2.0 times the thickness to about 3.0 times the thickness of the interlayer; or wherein the zones have a size in a range of from about 3.0 times the thickness to about 4.0 times the thickness of the interlayer; or wherein the zones have a size in a range of from about 4.0 times the thickness to about 5.0 times the thickness of the interlayer; or wherein the zones have a size in a range of from about 5.0 times the thickness to about 6.0 times the thickness of the interlayer; or wherein the zones have a size in a range of from about 5.0 times the thickness to about 6.0 times the thickness of the interlayer; or wherein the zones have a size in a range of from about 6.0 times the thickness to about 7.0 times the thickness of the interlayer; or wherein the zones have a size in a range of from about 7.0 times the thickness to about 8.0 times the thickness of the interlayer; or wherein the zones have a size in a range of from about 8.0 times the thickness to about 9.0 times the thickness of the interlayer; or wherein the zones have a size in a range of from about 9.0 times the thickness to about 10.0 times the thickness of the interlayer.

In yet a further embodiment, the invention provides a polymeric interlayer comprising at least two zones, wherein the zones are shaped as a dot or circle having a diameter in the range of from about 0.5 times a thickness of the interlayer to about 10 times the thickness of the interlayer; or wherein the zones are shaped as a dot or circle having a diameter in the range of from about 1.5 times the thickness to about 9.0 times the thickness of the interlayer; or wherein the zones are shaped as a dot or circle having a diameter in the range of from about 2.0 times the thickness to about 8.0 times the thickness of the interlayer; or wherein the zones are shaped as a dot or circle having a diameter in the range of from about 3.0 times the thickness to about 7.0 times the thickness of the interlayer; or wherein the zones are shaped as a dot or circle having a diameter in the range of from about 4.0 times the thickness to about 6.0 times the thickness of the interlayer; or wherein the zones are shaped as a dot or circle having a diameter in the range of from about 5.5 times the thickness to about 5.5 times the thickness of the interlayer; or wherein the zones are shaped as a dot or circle having a diameter that is about 5.0 times the thickness to of the interlayer.

In yet a further embodiment, the invention provides a polymeric interlayer comprising at least two zones, wherein the zones are shaped as a dot or circle having a diameter in the range of from about 0.5 times a thickness of the interlayer to about 1.5 times the thickness of the interlayer; or wherein the zones are shaped as a dot or circle having a diameter in the range of from about 1.5 times the thickness to about 2.0 times the thickness of the interlayer; or wherein the zones are shaped as a dot or circle having a diameter in the range of from about 2.0 times the thickness to about 3.0 times the thickness of the interlayer; or wherein the zones are shaped as a dot or circle having a diameter in the range of from about 3.0 times the thickness to about 4.0 times the thickness of the interlayer; or wherein the zones are shaped as a dot or circle having a diameter in the range of from about 4.0 times the thickness to about 5.0 times the thickness of the interlayer; or wherein the zones are shaped as a dot or circle having a diameter in the range of from about 5.0 times the thickness to about 6.0 times the thickness of the interlayer; or wherein the zones are shaped as a dot or circle having a diameter in the range of from about 5.0 times the thickness to about 6.0 times the thickness of the interlayer; or wherein the zones are shaped as a dot or circle having a diameter in the range of from about 6.0 times the thickness to about 7.0 times the thickness of the interlayer; or wherein the zones are shaped as a dot or circle having a diameter in the range of from about 7.0 times the thickness to about 8.0 times the thickness of the interlayer; or wherein the zones are shaped as a dot or circle having a diameter in the range of from about 8.0 times the thickness to about 9.0 times the thickness of the interlayer; or wherein the zones are shaped as a dot or circle having a diameter in the range of from about 9.0 times the thickness to about 10.0 times the thickness of the interlayer.

In yet another embodiment, this invention relates to an adhesive polymeric interlayer (API) as described above, wherein an effective diameter of the discrete zone is in a range of from about 0.1 mm to about 50 mm. In one embodiment, the invention provides an API wherein an effective diameter of the discrete zone selected from one of the following numbers or is in a range defined by any two numbers including the endpoints of such range, as measured in mm:

0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

In yet another embodiment, this invention relates to an adhesive polymeric interlayer (API) as described above, wherein the effective diameter of the regular shaped discrete zone, the random shaped discrete zone, or the cluster discrete zone is from about 1 multiple to about 150,000,000-multiples of the thickness of the discrete zone. An exemplary set of multiples includes the following numbers, those included within a range formed by any two numbers below: 1, 5, 10, 20, 100, 150, 200, 1000, 5000, 10000, 20000, 50000, 100000, 200000, 500000, 1000000, 5000000, 10000000, 20000000, 50000000, 100000000, 120000000, 125000000, and 150000000.

In one embodiment, the invention provides an interlayer that comprises discrete debonding treated zones that have a surface area on one side that is a percentage number of the area of the substrate or the API surface where the percentage number is one of the following numbers, or is within a range defined by any two of the following numbers, including the endpoints of such range:

1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 51, 52, 53, 54, 55, 56, 57, 58, 59, 60, 61, 62, 63, 64, 65, 66, 67, 68, 69, 70, 71, 72, 73, 74, 75, 76, 77, 78, 79, and 80.

In yet a further embodiment, the invention provides a polymeric interlayer comprising at least two sets of discrete zones, wherein one set of discrete zones, for example, the controlled debonding treatment zones covers a surface area of: from about 1% to about 80% of the surface areas of one of the glass substrate; from about 10% to about 60% of one of the glass panes; from about 20% to about 50% of one of the glass substrate; from about 30% to about 40% of the surface areas of one of the glass substrate; from about 5% to about 25% of the surface areas of one of the glass substrate; from about 1% to about 35% of the surface areas of one of the glass substrate; from about 15% to about 55% of one of the glass panes; from about 25% to about 45% of one of the glass panes; from about 10% to about 15% of one of the glass panes; from about 15% to about 20% of one of the glass panes; from about 20% to about 25% of one of the glass panes; from about 25% to about 30% of one of the glass panes; from about 30% to about 35% of one of the glass panes; from about 35% to about 40% of one of the glass panes; from about 40% to about 45% of one of the glass panes; from about 45% to about 50% of one of the glass panes; from about 50% to about 55% of one of the glass panes; or from about 55% to about 60% of one of the glass panes.

In one embodiment, this invention envisions the same area coverage or a different area coverage between a first glass substrate and the corresponding API surface and a second glass substrate and the corresponding API surface, for example in a glass substrate 1/API/glass substrate 2 laminate.

In one embodiment, this invention also envisions stacks of laminates. So, for example if glass substrate was designated as "A" and the API was designated as "B", the following laminates are envisioned herein:

A1/B1; A1/B1/A2; A1/B1/A2/B2/A3; A1/B1/A2/B2/B3/A3 . . . ; and A1/B1B2B3/A2/B4/A3; and so on and so forth. At least one of the API layers in such a stack of the invention comprises the discrete zones as described herein.

The above can be represented by a general formula:

$(A_xB_yA_w)_z$:

wherein y, $1 \leq y \leq 90$;
wherein z, $1 \leq z \leq 30$; and
wherein x=1, and w=1; or x=0 and w=1; or x=1 and w=0.
In other words, an $A_0$ means the substrate does not present in that arrangement at that spot in a stack.

In one embodiment, this invention envisions another protective layer—abrasion-resistance coated polyester for example. While this invention has been described with a focus on a rigid substrate (e.g. glass), in some cases a coated polyester, polycarbonate, nylon, and other polymeric substrates are also included.

In one embodiment of the invention, thinner interlayers are plied together to make a thicker interlayer.

In yet a further embodiment, the invention provides a polymeric interlayer comprising at least two zones, wherein one of the zones covers a surface area of from about 1% to about 35% of one of the glass panes; or wherein one of the zones covers a surface area of from about 5% to about 30% of one of the glass panes; or wherein one of the zones covers a surface area of from about 5% to about 25% of one of the glass panes; or wherein one of the zones covers a surface area of from about 10% to about 20% of one of the glass panes.

In yet a further embodiment, the invention provides a polymeric interlayer comprising at least two zones, wherein one of the zones covers a surface area of from about 1% to about 5% of one of the glass panes; or wherein one of the zones covers a surface area of from about 5% to about 10% of one of the glass panes; or wherein one of the zones covers a surface area of from about 10% to about 15% of one of the glass panes; or wherein one of the zones covers a surface area of from about 15% to about 20% of one of the glass panes; or wherein one of the zones covers a surface area of from about 20% to about 25% of one of the glass panes; or wherein one of the zones covers a surface area of from about 25% to about 30% of one of the glass panes; or wherein one of the zones covers a surface area of from about 30% to about 35% of one of the glass panes.

In yet another embodiment, the invention provides a polymeric interlayer comprising the number of zones per $cm^2$ in the range 0.04 to 10,000 including the endpoints of the range. Elaborating further, for example, in one embodiment, the number of zones per $cm^2$ include any one of the following numbers and any number within a range defined by any two numbers below, including the endpoints:

0.04, 0.05, 0.06, 0.07, 0.08, 0.09, 0.1, 0.5, 0.8, 1.0, 10, 20, 50, 100, 200, 500, 1000, 2000, 3000, 4000, 5000, 6000, 7000, 8000, 9000, and 10000.

In one embodiment, the number of zones described above are measured per $cm^2$, per inch, per $ft^2$, and per $m^2$.

In another embodiment, the invention provides a polymeric interlayer comprising three zones; or wherein the interlayer comprises at least four zones; or wherein the interlayer comprises at least five zones; or wherein the interlayer comprises at least six zones; or wherein the interlayer comprises at least seven zones; or wherein the interlayer comprises at least eight zones; or wherein the interlayer comprises at least nine zones; or wherein the interlayer comprises at least ten zones. In an embodiment, the invention provides a laminate comprising the polymeric interlayer described herein. In an embodiment, the laminate comprises wood, plastic or glass. In an embodiment, the laminate comprises wood. In an embodiment, the laminate comprises plastic. In an embodiment, the laminate comprises glass.

The invention will be further understood from the following specific examples of the properties of the laminated glass. However, it will be understood that these examples are not to be construed as limiting the scope of the present invention in any manner.

EXPERIMENTAL

Sample Preparation

In these examples, adhesion, laminate breakage behavior, and durability after breakage have been studied on laminates fabricated from annealed float glass and a monolayer terionomer interlayer sold by Kuraray America, Inc. (Wilmington, DE, USA) under the trademark "SENTRYGLAS® XTRA" as described in U.S. patent Ser. No. 16/050,728, filed Jul. 31, 2018. The ter-ionomer is a partially neutralized ethylene acid terpolymer ionomer obtained from E.I. du Pont de Nemours & Co. (Wilmington, DE, USA) (21.7% methacrylic acid, 3.5% i-butyl acrylate, Na 25% neutralized, MI=3.8).

Float glass is manufactured by floating the molten soda-lime-silica melt on a bath of molten metallic tin. The glass "tin" side is the glass that contacted the molten tin during manufacture and the glass "air" side is the opposite side that did not come into contact with the molten tin. Trace tin (Sn) impurities in the glass "tin" surface influence polymer-glass adhesion. Float glass is available from Guardian Industries, Inc., Galax VA, USA.

All glass was washed prior to fabrication of the laminates using soapy de-ionized water at 50° C. and rinsed thoroughly using de-ionized water. Generally, to produce soapy water, soap or detergent is added to water in an amount to form a lather when mixed.

Adhesion promoter: the active ingredient in the adhesion promotion treatment is gamma-aminopropyltriethoxysilane (Silquest A-1100, available from Momentive Performance Materials, Inc., Waterford, NY USA). A solution of the following composition (weight %) was used: 2-propanol (92.00%), water (7.90%), acetic acid (0.01%), gamma-aminopropyltriethoxysilane (0.09%).

Laminate Fabrication: a pre-press assembly, in which the polymer interlayer laminate films and glass were stacked in the desired order at room temperature, was placed into a disposable vacuum bag and held for 60 minutes under a vacuum of 25-30 inches of water to remove any air contained between the layers of the pre-press assembly. The pre-press assembly was loaded while still applying a vacuum to the bag into an air autoclave. The samples and bags were heated to 135° C. under an applied hydrostatic air pressure of 0.7 MPa. The vacuum to the bag was removed after reaching 135° C. and the laminates were held for 90 minutes in an air autoclave at an applied hydrostatic pressure of 0.7 MPa. The samples were then cooled at an approximate rate of 4° C./minute under constant pressure. After approximately 25 minutes of cooling, when the air temperature was less than about 50° C., the excess pressure was vented and the laminate was cooled to room temperature and removed from the autoclave.

The process used in the examples is similar to many standard industrial processes for the fabrication of laminated glass and resulted in materials with high clarity and minimal imperfections (bubbles etc.).

Control Examples—Uniform Adhesion Treatment

Various levels of uniform adhesion were achieved by specifying the glass/polymer orientation and/or applying an adhesion promoter to the glass surfaces. Table 1 lists samples made with various uniform adhesion levels.

TABLE 1

List of comparative examples with varying levels of adhesion (uniform treatments).

| Sample | Glass | Polymer | Glass-Polymer Orientation | Adhesion Promotion | Pattern Treatment |
|---|---|---|---|---|---|
| CE-1 | Annealed Float | SentryGlas® XTRA™ | Tin-Side \| Polymer | Yes | None |
| CE-2 | Annealed Float | SentryGlas® XTRA™ | Tin-Side \| Polymer | No | None |
| CE-3 | Annealed Float | SentryGlas® XTRA™ | Air-Side \| Polymer | No | None |

Patterned Adhesion Samples

The tin-surface of each glass piece was adhesion promoted by lightly wiping with a cloth soaked in the same adhesion promoter described above. The glass surfaces were allowed to dry at room temperature before proceeding.

Rubber stamp pads were used to transfer an ink pattern to the glass surface. The ink was StazOn 31-Jet Black made by Tsukineko Corporation (May 11, 2010, Arakawa Arakawa-ku, 116-0002 Japan). This ink adheres well to the glass but poorly to the polymer and hence produces a region of low adhesion between the inked regions and polymer.

Two stochastic patterns were investigated. Pattern characteristics are defined in Table 2.

TABLE 2

Characteristics of two stochastic pattern treatments

| Pattern | Circularity | Mean Size [mm] | Solidity | Area Fraction [%] |
|---|---|---|---|---|
| Stochastic-A | 0.82 | 0.25 | 0.91 | 28.1 |
| Stochastic-B | 0.68 | 3.7 | 0.90 | 28.9 |

Samples were fabricated according to Table 3.

TABLE 3

List of examples with varying levels of adhesion (stochastic treatments).

| Sample | Glass | Polymer | Glass-Polymer Orientation | Adhesion Promotion | Pattern Treatment |
|---|---|---|---|---|---|
| E-1 | Annealed Float | SentryGlas® XTRA™ | Tin-Side \| Polymer | Yes | Stochastic-A |
| E-2 | Annealed Float | SentryGlas® XTRA™ | Tin-Side \| Polymer | Yes | Stochastic-B |

Test Methods
Adhesion

Adhesion is a key requirement for laminated glass. A standard peel test method was used to characterize adhesion in the samples described.

Laminates were prepared for adhesion tests following the approaches described with two important modifications. First, a 25.4 mm wide strip of a thin polyester release tape (25 mm×25 mm) was applied to one edge of one piece of glass prior to assembly of the glass and polymer components. This tape only lightly adheres to the glass and enables a strip of polymer to be gripped by the peel-testing fixture. Secondly, a thin release film (Teflon® 13 mm) was placed between the polymer and one of the glass pieces. This allows the removal of one piece of glass so that a strip of polymer can be peeled off one of the glass pieces. Prior to peel testing, a 40 mm wide strip of polymer was separated from the adjacent polymer by cutting two channels using a sharp knife. Care was taken to make sure the channels were deep enough to fully cut through the polymer and detach it from adjacent material.

A peel configuration of 90 degrees was used and run with an extension rate of 0.18 mm/s at 23° C. and 50% RH. An MTS Criterion M45 universal testing machine, with a 1 kN load cell operating in displacement control mode was used for the measurements. The force-displacement characteristic were recorded at a frequency of 1 Hz. Five samples were tested for each adhesion treatment and the peel force was recorded as a function of extension.

FIG. 1 shows a typical peel measurement. With uniform adhesion control methods, a steady-state peel force is attained after an interfacial crack initiates. The peel force demonstrates small fluctuations. The energy to create unit area of interface is defined as the peel energy, γ, and for the 90 degree peel geometry is given by:

$$\gamma = \frac{P}{w}$$

Here, P is the peel force and w is the peel arm width. Using units of Newtons and mm, this yields a peel energy in units of $kJ/m^2$. The mean peel energy has been determined by fitting a horizontal line to the steady-state peel force response.

Figure 2:
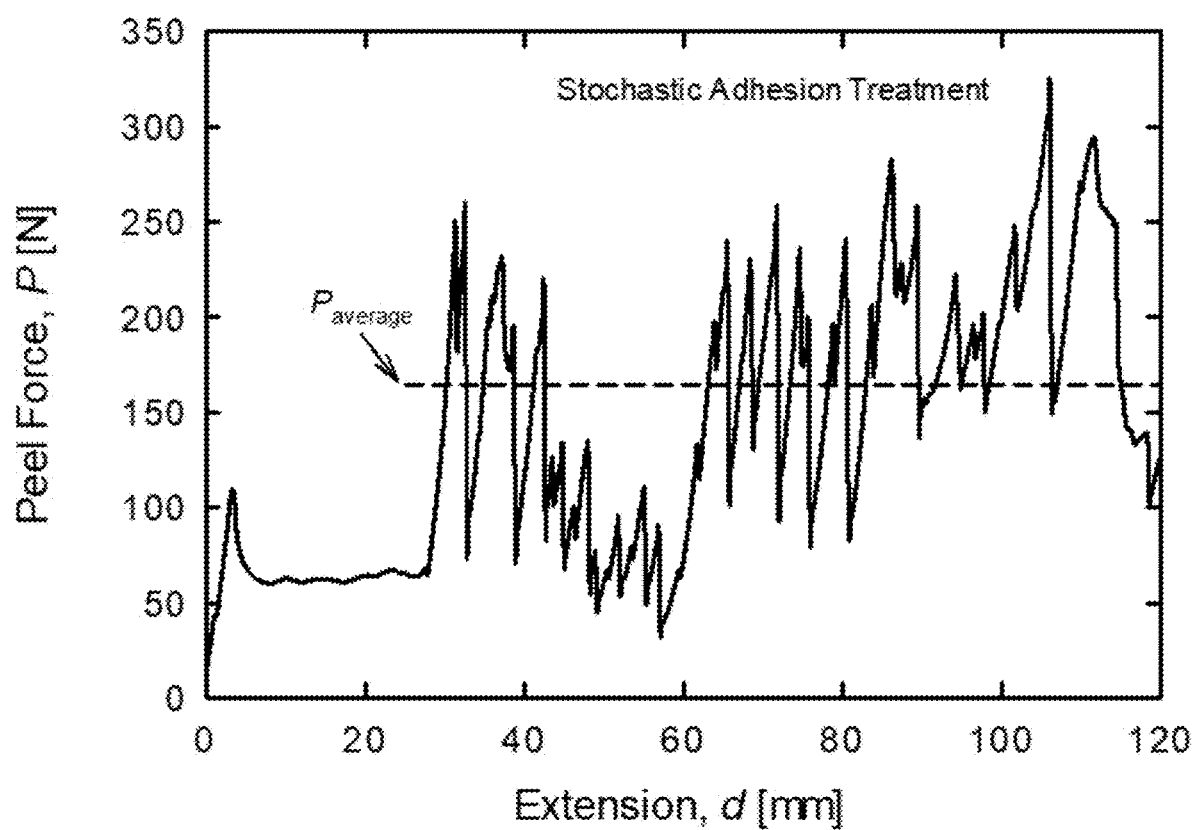
FIG. 2 shows the peel force of an interlayer/glass 'laminate' which possessing a controlled debonding zone treatment with a 'stochastic' type geometry.

FIG. 2 shows a peel measurement for stochastic adhesion control. The force response shows large fluctuations as the interfacial crack runs and then is arrested in a complex fashion. The peel adhesion energy has been determined by fitting a horizontal line to the peel force response in the patterned region as shown in FIG. 2.

Laminate Breakage—Ball-On-Ring

A key performance attribute of laminated safety glass is the behavior during and after glass breakage. Specifically, the tear and penetration resistance of a laminate are key to its safety performance. In order to evaluate the laminate breakage properties a ball-on-ring testing protocol was developed.

Figure 3:
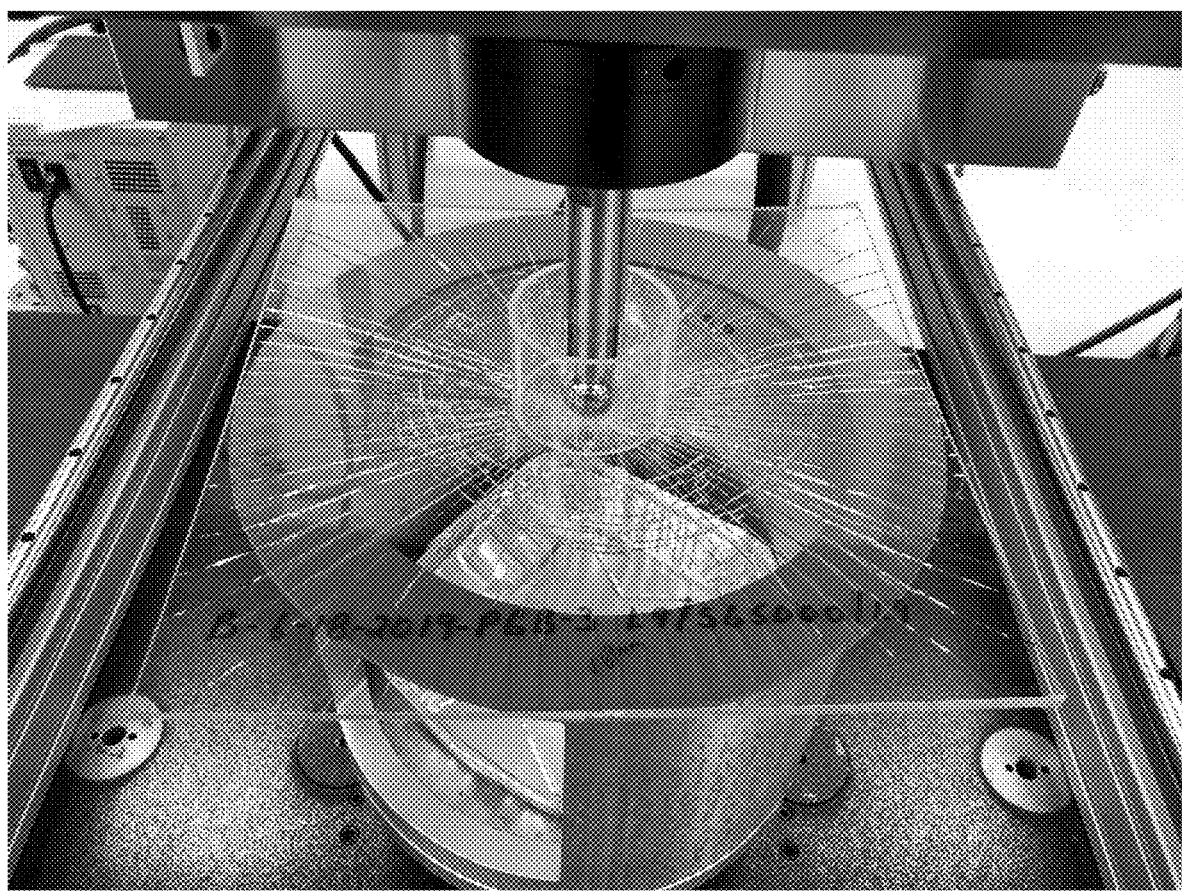
FIG. 3 shows a 'ball on ring' apparatus used for the measurement of laminate tear energy.

In this test, a glass laminate is supported on a circular ring made from aluminum and loaded at its center using a hard metal ball (tungsten carbide). The supporting ring diameter=250 mm, the loading ball diameter=25.4 mm. The samples were loaded at 10 mm/sec and the tests were carried out at 23° C./50% RH. FIG. 3 is a sketch of the cross-section of the testing geometry. Note that a thin (1 mm) rubber gasket was placed between the supporting ring and laminated glass sample to obviate contact breakage of the glass. An MTS Criterion M45 universal testing machine, with a 30 kN load cell operating in displacement control mode was used for the measurements. The force-displacement characteristic were recorded at a frequency of 1 Hz. Five samples were tested for each adhesion state.

Laminate constructions tested were all: 1.9 mm Glass|0.89 mm SentryGlas® XTRA™ 1.9 mm Glass. Sample size 305 mm×305 mm. Prior to testing, the glass surface was lightly abraded with 400 grit emery paper (silicon carbide grit) at the center. It is well-know that glass strength is primarily determined by flaws in the glass surface. This surface damage treatment resulted in controlled breakage in the sample center and reduced the variability of the first cracking event.

Figure 4:
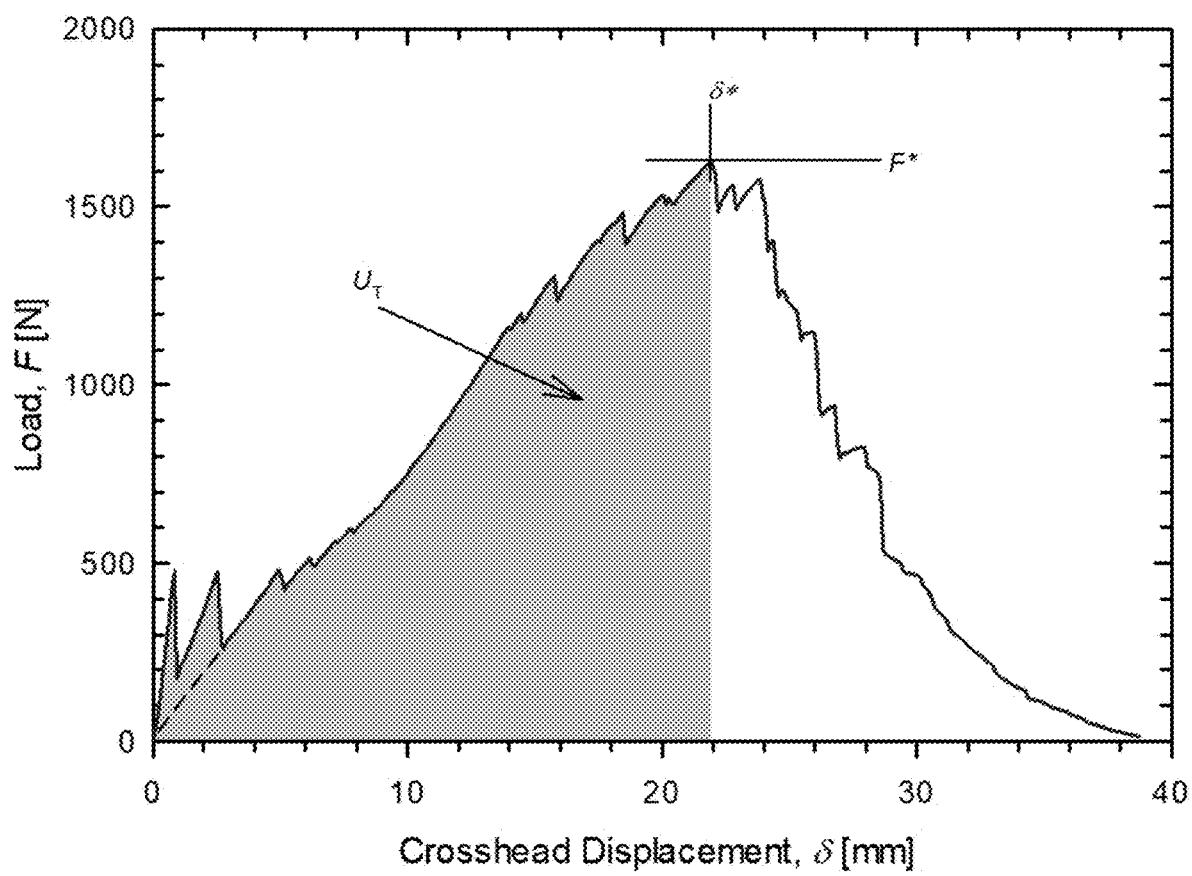
FIG. 4 show a typical load/displacement plot provided by the 'ball on ring' apparatus as the ball contacts and then progressively pushes through the laminate, thus creating a tear in the interlayer.

A typical load-displacement trace is shown in FIG. 4. The tear energy of the laminate, UT, is defined as the area under the load-displacement curve up to the peak load, F* (δδ*) at which a tear in the laminate initiate $U_T = \int_0^{\delta*} F(\delta)$.

Note that the first two smaller peaks are removed before this calculation is made since these peaks result from the first cracking of each glass ply. Thus, the tear energy represents to work done during laminate deformation after first-cracking of each glass ply.

Durability—Glass Retention During Thermal Cycling of Broken Laminates

Glass retention after laminate breakage is an important performance requirement of laminated safety glass. In order to evaluate the durability of a laminate in the post-glass breakage state, laminates that had been tested in the ball-on-ring breakage test were subsequently subjected to thermal cycling. Since it is known that water affects adhesion and that freeze-thaw events are particularly deleterious, broken laminates were subjected to the following thermal cycling test protocol.

Starting at room temperature (23° C.), ramp (2° C./minute) to −40° C. (1 hour hold), ramp (2° C./minute) to 50° C. (1 hour hold), ramp (2° C./minute) to 23° C. One cycle takes 3.5 hours. The chamber humidity was maintained at 80% RH when the temperature was above 0° C.

The cycle was repeated up to 100 times and the sample weight loss recorded at selected intervals. Sample weight loss resulted from detachment of glass fragments from the broken laminate during thermal cycling.

EXAMPLES

Comparative Example—CE1

A laminate consisting of 1.9 mm annealed glass|0.89 mm SentryGlas® XTRA™|1.9 mm annealed glass, with the polymer interlayer oriented against the glass "tin" surface, where the glass "tin" surfaces have been treated with a gamma-aminopropyltriethoxysilane adhesion promoter has been tested for adhesion, tear resistance and durability following the test methods described. This configuration treatment represents a uniform adhesion state. Performance results are shown in Table 4.

Comparative Example—CE2

A laminate consisting of 1.9 mm annealed glass|0.89 mm SentryGlas® XTRA™|1.9 mm annealed glass, with the polymer interlayer oriented against the glass "tin" surface, has been tested for adhesion, tear resistance and durability following the test methods described. This configuration treatment represents a uniform adhesion state. Performance results are shown in Table 4.

Comparative Example—CE3

A laminate consisting of 1.9 mm annealed glass|0.89 mm SentryGlas® XTRA™|1.9 mm annealed glass, with the polymer interlayer oriented against the glass "air" surface, has been tested for adhesion, tear resistance and durability following the test methods described. This configuration treatment represents a uniform adhesion state. Performance results are shown in Table 4.

Example—E1

A laminate consisting of 1.9 mm annealed glass|0.89 mm SentryGlas® XTRA™|1.9 mm annealed glass, with the polymer interlayer oriented against the glass "tin" surface, where the glass "tin" surfaces have been treated with a gamma-aminopropyltriethoxysilane and a stochastic adhesion release ink pattern (Stochastic-A, Table 2) has been tested for adhesion, tear resistance and durability following the test methods described. This configuration treatment represents a stochastically varying adhesion state. Performance results are shown in Table 4.

Example—E2

A laminate consisting of 1.9 mm annealed glass|0.89 mm SentryGlas® XTRA™|1.9 mm annealed glass, with the polymer interlayer oriented against the glass "tin" surface, where the glass "tin" surfaces have been treated with a gamma-aminopropyltriethoxysilane and a stochastic adhesion release ink pattern (Stochastic-B, Table 2) has been tested for adhesion, tear resistance and durability following the test methods described. This configuration treatment represents a stochastically varying adhesion state. Performance results are shown in Table 4.

TABLE 4

Adhesion, tear resistance and durability performance of examples

| Example | Adhesion Type | Mean Peel Adhesion, γ [kJ/m²] | Laminate Tear Energy, $U_T$ [J] | Weight Loss of Broken Laminate after 30 cycles [%] |
| --- | --- | --- | --- | --- |
| CE-1 | Uniform | 6.78 | 13.57 | 0.01 |
| CE-2 | Uniform | 2.33 | 15.30 | 0.24 |
| CE-3 | Uniform | 3.43 | 14.56 | 0.12 |
| E-1 | Stochastic | 2.44 | 16.43 | 0.08 |
| E-2 | Stochastic | 4.91 | 15.37 | 0.05 |

Materials

The materials used in the examples are as follows:

The glass used in the Examples was soda-lime glass, standard annealed (obtained from Guardian Industries, Inc., Galax VA, USA).

Ionomer 1 (I1)—a partially neutralized ethylene acid dipolymer ionomer obtained from The Dow Company, Midland, MI (21.7% methacrylic acid, Na 26% neutralized, MI=1.8 @190° C.).

Silane 2 (S2)—3-glycidoxypropylmethyldiethoxysilane (CoatOSil® 2287, available from Momentive Performance Materials, Inc., Waterford, NY USA).

Treatment Solution 'A' was prepared from mixture on promoter: the active ingredient in the adhesion promotion treatment is gamma-aminopropyltriethoxysilane (Silquest A-1100, available from Momentive Performance Materials, Inc., Waterford, NY USA). A solution of the following composition (weight %) was used: 2-propanol (92.00%), water (7.90%), acetic acid (0.01%), gamma-aminopropyl-triethoxysilane (0.09%). The solution was allowed to 'age' for 24 hours prior to use to allow for hydrolysis of the silane to occur.

Treatment Solution 'B' was prepared from a mixture of the active ingredient in the adhesion reduction treatment is: Methyltrimethoxysilane, CAS Number 1185-55-3, available from Sigma-Aldrich, 400 Summit Drive, Burlington, MA 01803. A solution of the following composition (weight %) was used: 2-propanol (91.90%), water (7.90%), acetic acid (0.01%), methyltrimethoxysilane (0.19%). The solution was allowed to 'age' for 24 hours prior to use to allow for hydrolysis of the silane to occur.

PVA: Polyvinyl alcohol, Elvanol® 90-50, CAS Number 9002-89-5, available from Kuraray America, Inc. 2625 Bay Area Blvd. Houston, TX 77058.

PVA 3D Printer filament: Inland PVA175N051.75-mm filament.

Aqueous solutions were prepared for each of the above PVA materials by dissolving into demineralized water under stirring at 80° C. and then was allowed to cool to room temperature. Solution 'C' was prepared at a 1.0% w/w concentration from the Elvanol® 90-50 PVA and Solution 'D' was prepared at a 0.5% w/w/concentration from the Inland PVA filament and were both used without any further workup.

Ionomer Sheet Preparation

Treatment Solution 'A' and 'B' where applied using a felt-nibbed pen with a tip diameter of 0.2-mm. Other diameters were also tried and ranged from 0.05-mm to 2.0-mm. The choice of tip diameter along with the flow characteristics and surface energy and surface tension of the treatment solution, surface texture/roughness, etc. are some factors relating to the final deposit quantity and size/shape of the 'patterned' features on the various surfaces. Most of the samples were prepared by application to a prewashed annealed glass surface (one choice of a rigid substrate), but alternatively, the treatment solutions can be applied to the polymeric interlayer and combinations thereof.

Laminate Preparation Method

Glass laminates were prepared from each of the ionomer sheets by the following method. Annealed glass sheets (100×100×3 mm) were washed with a solution of trisodium phosphate (5 g/l) in de-ionized water at 50° C. for 5 min, then rinsed thoroughly with de-ionized water and dried. Three layers of each respective ionomer sheets (about 0.76 mm thick each) as listed in Table 1 were stacked together and placed between two liters of glass sheet (to yield an interlayer thickness of 2.28 mm).

The moisture level of the ionomer sheet was kept at or below 0.08% by weight by minimizing contact time to the room environment (about 35% RH) or was exposed for a period of 10 days (samples placed in an Espec Humidity chamber—Model LHU-113) at the temperature and humidity levels as indicated in the following examples.

The moisture level of the ionomer sheet was measured using a coulometric Karl Fischer method (Metrohm Model 800) with a heating chamber temperature of 150° C. for the sample vials. The ionomer sheeting was cut into small pieces to fit into the sample vials weighing a total of 0.40 grams.

The pre-lamination assembly was then taped together with a piece of polyester tape in a couple locations to maintain relative positioning of each layer with the glass lites. A nylon fabric strip was placed around the periphery of the assembly to facilitate air removal from within the layers. The assembly was placed inside a nylon vacuum bag, sealed and then a connection was made to a vacuum pump. A vacuum was applied to allow substantial removal of air from within (air pressure inside the bag was reduced to below 50 millibar absolute). The bagged assembly was then heated in a convection air oven to 120° C. and held for 30 min. A cooling fan was then used to cool the assembly down to near room temperature and the assembly was disconnected from the vacuum source and the bag removed yielding a fully pre-pressed assembly of glass and interlayer.

The assembly was then placed into an air autoclave and the temperature and pressure were increased from ambient to 135° C. at 13.8 bar over 15 min. This temperature and pressure was held for 30 min and then the temperature was decreased to 40° C. at a cooling of about 2.5° C./min whereby the pressure was then dropped back to ambient (over 15 min) and the final laminates were removed from the autoclave.

Ball Drop Impact Testing

A conventional impact test widely used to test the laminates in the safety glazing industry is the five-pound (2.27-kg) steel ball drop test. This test is defined in American National Standard Z26.1-1983 Section 5.26 Penetration Resistance, Test 26. The purpose of this test is to determine whether the glazing material has satisfactory penetration resistance. For automotive windshields, a minimum performance level is set at eight out of ten samples passing a twelve foot (3.66-m) ball drop without the ball penetrating the sample within 5 seconds of the impact. The test method calls for controlling laminate temperature between 77 to 104° F. (25 to 40° C.). The laminates (separated to provide air circulation) were placed in a controlled temperature oven, a minimum of 2 hours prior to impact to equilibrate to 23° C.+/−2° C. Rather than dropping the five-pound ball (2.27-kg) from 12 feet (3.66-m), a variety of drop heights ranging from 2.44-m to 6.71-m were used to assess the "mean" support height (the height at which it is estimated that 50% of the samples would be penetrated). At each various drop impact height, the length of any tear in the laminate and interlayer was also measured and by testing multiple samples at each drop height (avg. of 3 laminates), the height necessary to create a tear of 2.54-cm and 12.7-cm was also computed.

Cyclic Weathering: Production of Delamination Durability Laminates

Annealed float glass of 300 mm by 300 mm dimensions of 3.0 mm thickness was washed thoroughly and allowed to dry. Whatman filter paper (#1) of circular dimensions of 70-mm, the center of the filter disk was placed at one corner of the glass so that a 90 degree circular arc of the paper was within the area of the glass. The faces of the glass was oriented either 'air' or 'tin-side' to the internal faces of the glass laminate assembly. The filter paper was placed such that it was between the interface of one lite of glass and the interlayer. This assembly and design served the purpose of creating a 'weak' interface where delamination was assured (within the filter paper area) as the filter paper provided a barrier for adhesion of the interlayer to develop to the glass internal surface. The filter paper also acted as a wedge since it occupied additional volume in the corner region thereby creating a spreading force which could delaminate regions beyond the outside edge of the filter paper. The filter paper also allowed for a pathway for water to 'wick' through the filter paper and potentially further disrupt the adhesiveness between the interlayer and the glass.

The laminates prepared above were then immersed into room temperature demineralized water for 1 hour followed by placing the laminates into a chamber adjusted to −20° C. for 16 hours. Laminates were then removed and allowed to warm back to room temperature (23° C.+/−2° C.) for 7 hours. The process was repeated for a total of 10 cycles and then the degree of debonding/delamination was observed by visual inspection. Image analysis was performed on the laminates to quantify the extent of the debonding if present and that data is reported in Table 5.

Haze Measurement

Figure 5:
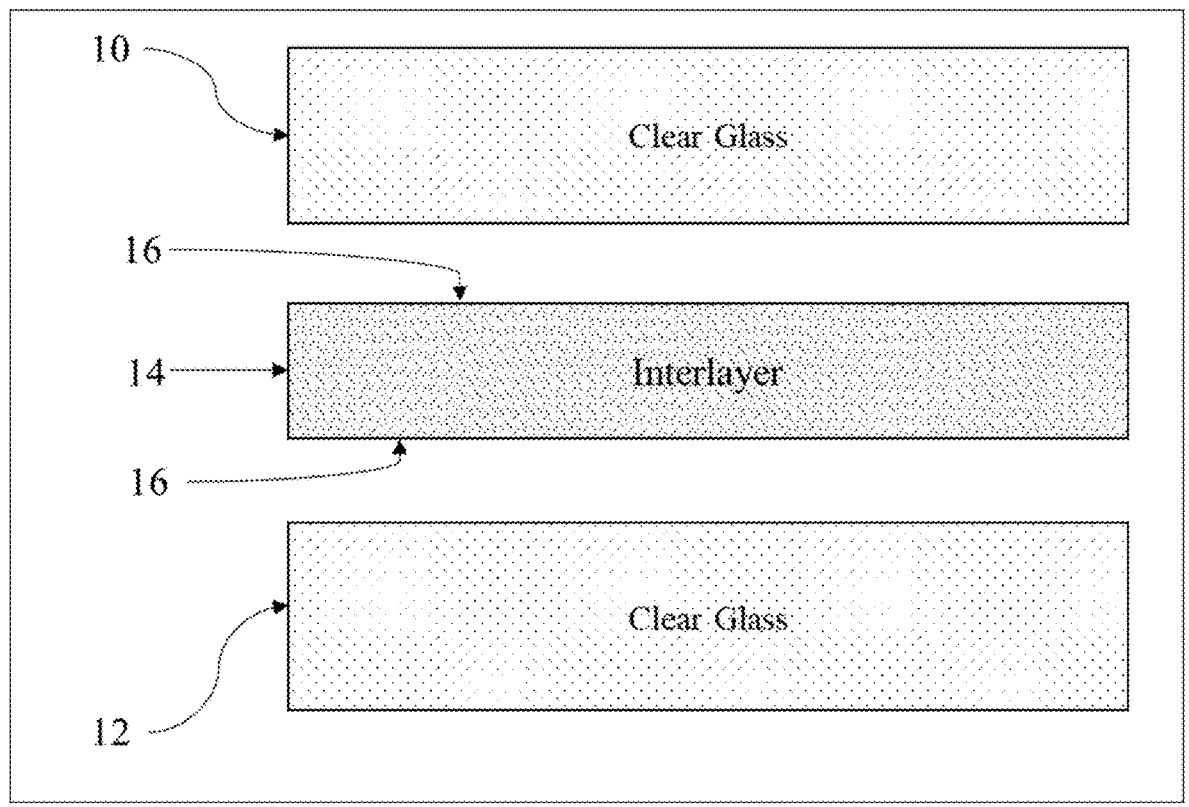
FIG. 5 shows a conventional arrangement of top glass lite 10, interlayer 14, and bottom glass lite 12. Interlayer surfaces 16 are typically imparted with a surface roughness or embossed texture to allow for deairing during laminate processing. In the conventional art, the composition of the surface is essentially the same as the bulk interlayer composition, i.e. there is no attempt to alter its makeup for tailoring interaction with fusion with the glass surface in the formation of the laminated article.
Figure 6:
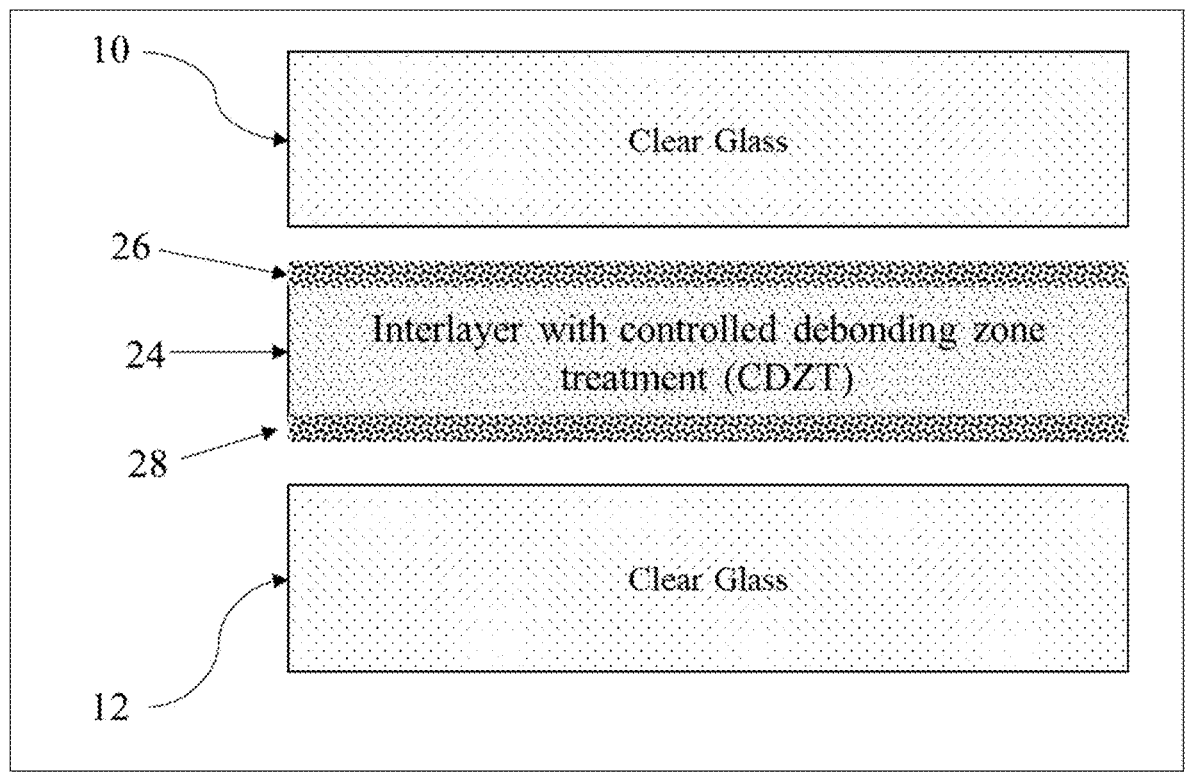
FIG. 6 show a cross-sectional diagram of the said art (controlled debonding zone treatment). The treatment may be applied to the rigid substrate surface or be applied or be positioned at or near the surface of the polymeric interlayer, or both.
Figures 7A, 7B, 7C, 7D, 7E:
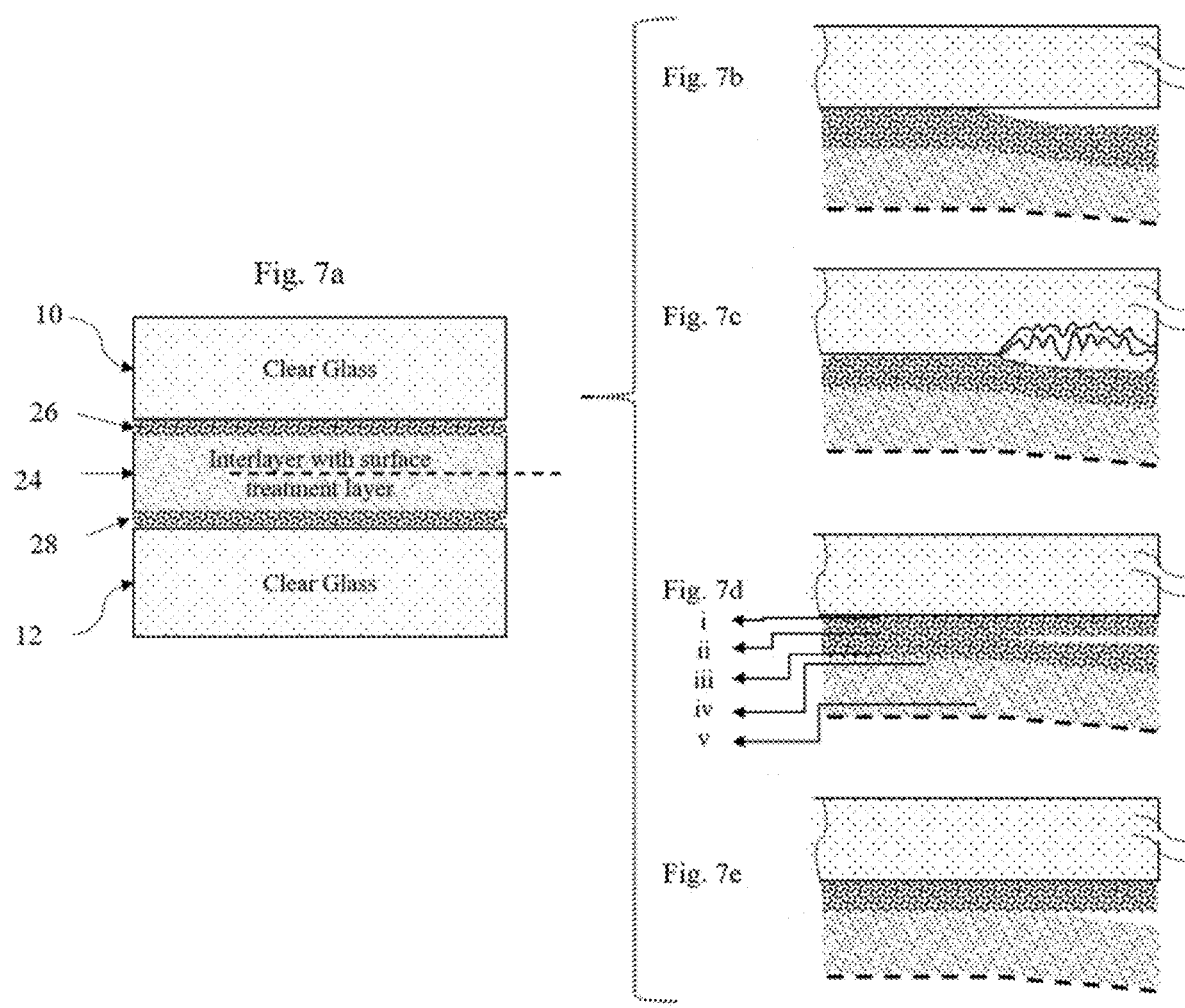
FIGS. 7a-e are schematic cross-sectional views of certain embodiments of the present invention.
Figure 8:
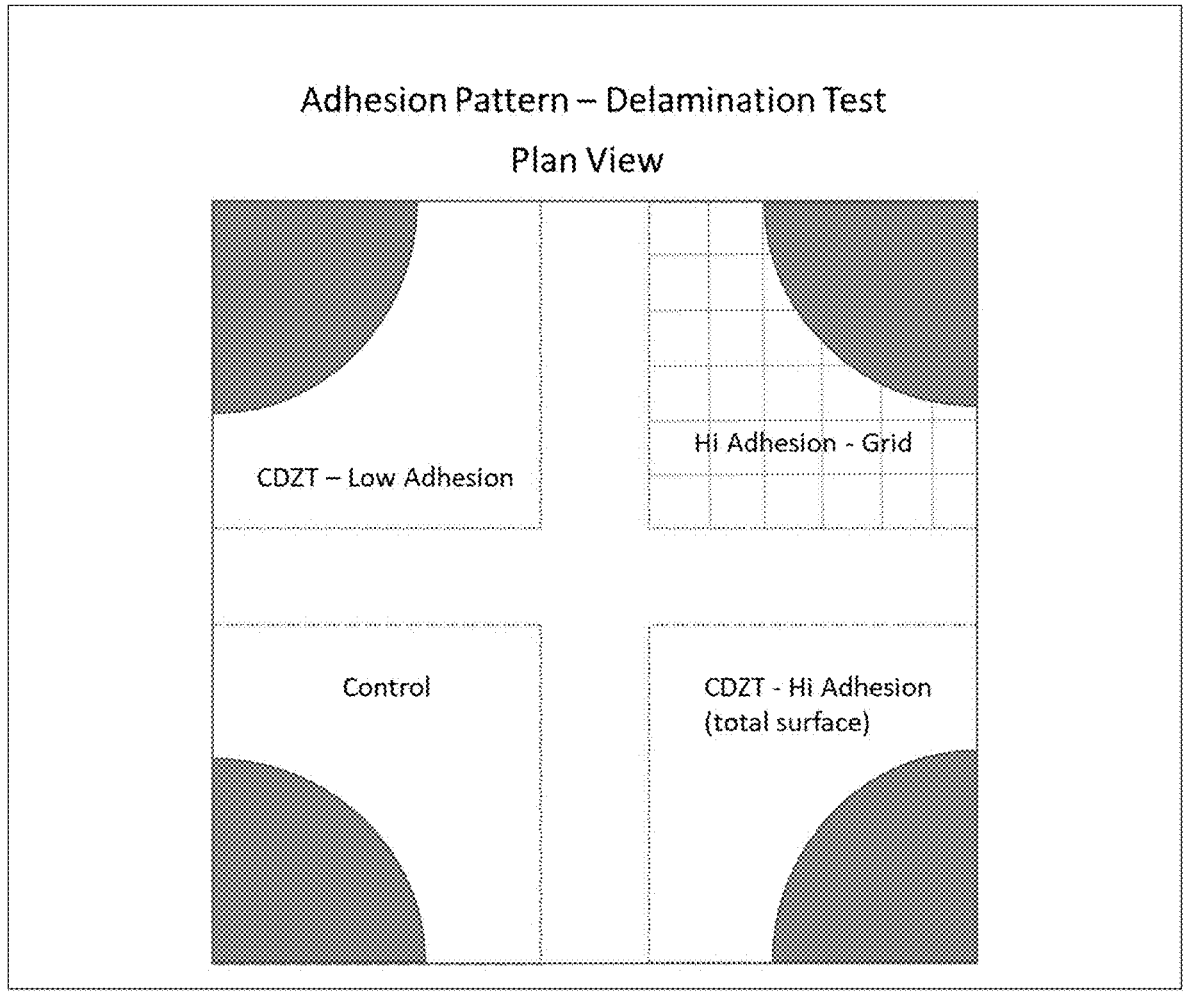
FIG. 8 shows a 'plan view' of the arrangement of the Delamination Test as described in the example section.
Figure 9:
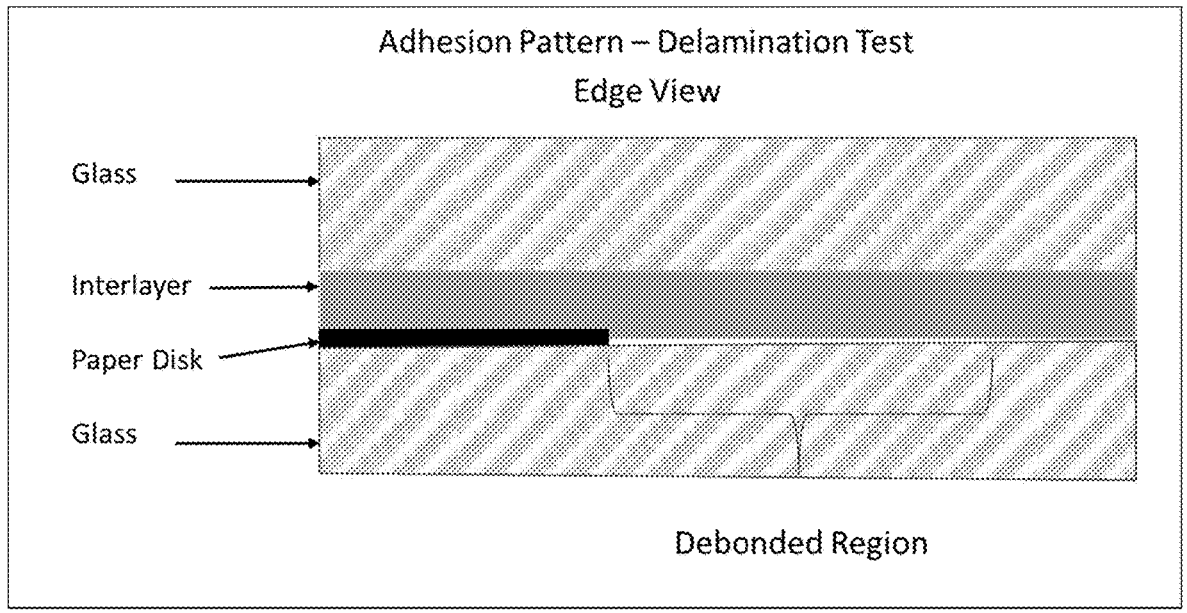
FIG. 9 shows a 'cross-sectional' type view of the arrangement of the Delamination Test as described in the example section.

The laminates were thoroughly cleaned using WINDEX glass cleaner (S.C. Johnson & Son, Inc.) and lintless cloths and were inspected to ensure that they were free of bubbles and other defects which might otherwise interfere with making valid optical measurements. The laminates were then evaluated by means of a Haze-gard Plus hazemeter (Byk-Gardner) to obtain a measurement of percent haze. The measurement of haze followed the practice outlined in American National Standard (ANSI Z26.1-1966) "Safety Code for Safety Glazing Materials for Glazing Motor Vehicles Operating on Land Highways". Test section 5.17 and 5.18 along with FIGS. 5 and 6 in such standard detail the appropriate method and instrumental setup to measure the haze level of a glazing material. The Haze-gard Plus hazemeter meets the proper criteria for this standard was used in all forthcoming measurements. Haze standards which are traceable to the National Bureau of Standards (now NIST) were used to ensure that the instrument was well-calibrated and operating properly.

Haze results are presented in Table 5 below:

TABLE 5

Laminate Haze

| Example | Interlayer | Surface Treatment | Haze (%) |
| --- | --- | --- | --- |
| CE-1 | SG5000 | None | 0.45 |
| EX-1 | SG5000 | Dots (Solution 'A') | 0.48 |
| EX-2 | SG5000 | Lines (Solution 'A') | 0.42 |
| EX-3 | SG5000 | Grid (Solution 'A') | 0.42 |
| EX-4 | SG5000 | PVA solution coating (C) | 0.45 |

As can be seen from the results above, the addition of the debonding zone treatments added did not materially detrimentally impact the optical clarity/haze of the resulting laminate.

Peel Adhesion Measurement

To allow for measurement of peel adhesion, some samples were prepared as above with the following exceptions.

Annealed glass was scribed, cut into 100 mm×300 mm rectangles and then washed per the procedure described earlier. Thin polyester tape (25 um thickness×25 mm width) with silicone adhesive was applied to the glass surface on the 'side-of-interest' (air or tin-side) in two parallel strips providing a uniform 25 mm wide bonding area in between. This procedure allows for the creation of a very well defined bonding area without the need to cut through the polymer layer to create a peel strip as is conventionally performed in standard peel adhesion methodologies. Over top of the interlayer specimen, a thin 4-mil sheet of FEP film was placed over the plastic sheeting prior to placing the second piece of glass on top to provide a relatively flat surface for the lamination step and to act as a release layer for removal of the top piece of glass. All lamination steps were then carried out as stated above. Afterwards, 90 degree angle peel adhesion measurements were made on a variety of samples produced by the process above via a mechanical testing device (INSTRON Model 1122, Instron Industrial Products, Norwood, MA USA). The peels were conducted at a cross-head speed of 1-cm/min. rate under standard laboratory conditions (nominal 23° C. and 50% RH). After peeling approximately 100-mm of the sample, demineralized water was applied to the glass and peel interface, so that the interface was now fully immersed into liquid water. The peel rate was then reduced to 0.25-mm/min. and the test was allowed to continue for several hours until approximately another 100-mm of the sample was tested. Sufficient water was present to ensure the sample was maintained in the 'wet' state during this final testing period. The data was collected via the computer software (INSTRON Bluehill III software, Instron Industrial Products, Norwood, MA USA) and an average force level was computed for the "dry" and the "wet-state" peel test sections.

The results are presented in Table 6 below.

TABLE 6

| Examples | Interlayer | Surface Treatment | Debonding Zone Distribution | Volume fraction | 90° Peel Adhesion kJ/m² Dry | 90° Peel Adhesion (kJ/m²) Wet |
|---|---|---|---|---|---|---|
| CE-1-1 | SG5000 | Solution 'A' | Entire surface coverage | 1.000 | 7.10 | 3.05 |
| CE-1-2 | SG5000 | Solution 'B' | Entire surface coverage | 1.000 | 0.02 | detached |
| EX-1-2 | SG5000 | Solution 'A' | Dots 'D-1' | 0.297 | na | 0.68 |
| EX-1-3 | SG5000 | Solution 'A' | Dots 'D-2' | 0.567 | na | 2.07 |
| EX-1-4 | SG5000 | Solution 'B' | Dots 'D-3' | 0.567 | na | 0.23 |
| EX-1-5 | SG5000 | Solution 'A' | Grid 'G-1' | 0.021 | na | 0.09 |
| EX-1-6 | SG5000 | Solution 'A' | Grid 'G-2' | 0.042 | na | 0.17 |
| EX-1-7 | SG5000 | Solution 'A' | Grid 'G-3' | 0.091 | na | 0.29 |
| EX-1-8 | SG5000 | Solution 'A' | Grid 'G-4' | 0.319 | na | 1.26 |
| EX-1-9 | SG5000 | Solution 'A' | Lines 'L-1' | 0.050 | na | 0.14 |
| EX-1-10 | SG5000 | Solution 'A' | Lines 'L-2' | 0.083 | na | 0.21 |
| EX-1-11 | SG5000 | Solution 'A' | Lines 'Z-1' | 0.055 | 1.017 | 0.22 |
| EX-1-12 | SG5000 | Solution 'A' | Lines 'Z-2' | 0.088 | na | 0.42 |
| EX-1-13 | SG5000 | Solution 'B' | Lines 'L-1' | 0.083 | na | 0.10 |
| EX-1-14 | SG5000 | Adhesive Mask & Solution 'A' | Lines 'L-3' | 0.083 | na | 0.33 |
| EX-1-17 | SG5000 | Solution 'A' | Hexagons 'H-1' | 0.180 | na | 0.75 |
| CE-1-2 | SG5000 | PVA (Soln. D) | Normal surfaces | 0.0 | 1.18 | na |
| EX-1-18 | SG5000 | PVA (Soln. D) | control area/ solid coverage | 0.0/1.0 | 1.38/0.07 | na |
| EX-1-19 | SG5000 | PVA (Soln. C) | | 0.0/1.0 | 1.17/0.10 | na |
| CE-1-3 | PVB | PVA (Soln. D) | Normal surfaces | 0.0 | 4.21 | na |
| EX-1-20 | PVB | PVA (Soln. D) | control area/ solid coverage | 0.0/1.0 | 3.90/1.73 | na |
| EX-1-21 | PVB | PVA (Soln. C) | control area/ solid coverage | 0.0/1.0 | 4.01/3.43 | na |

CE-1-1 prepared with the entire surface area being treated with Solution 'A' as expected, was found to debond at a relatively high energy level of 7.10 kJ/m² under the 'dry' (as-prepared) peel sample test conditions. It also maintained relatively high debonding energy (3.05 kJ/m²) even when tested under 'wet' conditions. CE-1-2 was prepared with the entire surface area being treated with Solution 'B', which was found to create a low (0.02 kJ/m²) debonding energy level. It can be seen that when Solution 'A' is applied (able to create higher fracture energy levels) to the surface of the glass, the adhesion level is increased in some general manner related to the surface coverage (volume fraction) of the specific pattern geometry that is present, but not necessarily in a direct relationship. Various pattern geometries/designs are illustrated in Table 7 along with their respective debonding/delamination sizes (max. distance from paper wedge insert and total debonded area).

TABLE 7

Debonding → Delamination Results

| Example # | Glass Orientation | Description | Spacing (mm) | Maximum Debonded Distance (mm) | Debonded Area (mm²) |
|---|---|---|---|---|---|
| CE-D-001 | ATTA | Control | na | 13 | 4885 |
| CE-D-002 | ATTA | Control (low) | na | 23 | 9840 |
| CE-D-003 | ATTA | Control (hi) | na | 1 | 2 |
| EX-D-002 | ATTA | Grid (0.16) | 4.1 | 1 | 4 |
| EX-D-003 | TAAT | Grid (0.16) | 4.1 | 4 | 28 |
| EX-D-004 | ATTA | Grid (0.20) | 5.1 | 2 | 36 |
| EX-D-005 | TAAT | Grid (0.20) | 5.1 | 5 | 125 |
| EX-D-006 | ATTA | Grid (0.24) | 6.1 | 4 | 76 |
| EX-D-007 | TAAT | Grid (0.24) | 6.1 | 6 | 391 |
| EX-D-008 | ATTA | Grid (0.31) | 7.9 | 8 | 489 |
| EX-D-009 | ATTA | Grid (0.49) | 12.4 | 11 | 660 |
| EX-D-010 | ATTA | Hexagons | 4.25 | 1 | 4 |
| EX-D-011 | ATTA | Lines | 6.1 | 13 | 2183 |
| EX-D-012 | ATTA | Lines (crossed) | 6.1 | 5 | 377 |
| EX-D-013 | ATTA | Triangles | 5.9 | 1 | 6 |

TABLE 8

Ball Drop Testing - bimodal-low

| Example | Interlayer Type | Surface Treatment | Ball Drop Height (m) | Pass/Fail | Interlayer Tear Length (cm) | Glass Loss (gms) |
|---|---|---|---|---|---|---|
| CE-2-01 | I1 | Control - no surface treatment | 2.44 | Pass | 0 | 20.4 |
| CE-2-02 | I1 | Control - no surface treatment | 3.66 | Pass | 2 | 37.7 |

TABLE 8-continued

Ball Drop Testing - bimodal-low

| Example | Interlayer Type | Surface Treatment | Ball Drop Height (m) | Pass/ Fail | Interlayer Tear Length (cm) | Glass Loss (gms) |
|---|---|---|---|---|---|---|
| CE-2-03 | I1 | Control - no surface treatment | 4.88 | Fail | 15 | 75.4 |
| CE-2-04 | I1 | Control - no surface treatment | 6.10 | Fail | 14 | 102.8 |
| CE-2-05 | I1 | Complete surface coverage | 3.66 | Pass | 0 | 63 |
| CE-2-06 | I1 | Complete surface coverage | 4.88 | Pass | 0 | 181.8 |
| CE-2-07 | I1 | Complete surface coverage | 6.10 | Fail* | 0 | 946.7 |
| CE-2-08 | I2 | Control - no surface treatment | 2.44 | Fail | 15 | 13.3 |
| CE-2-09 | I2 | Control - no surface treatment | 3.66 | Fail | 30# | 20.1 |
| CE-2-10 | I2 | Control - no surface treatment | 4.88 | Fail | 30# | 33.1 |
| EX-2-01 | I1 | Surface treatment - Sol. 'A' FIG. 1 | 3.66 | Pass | 0 | 60.0 |
| EX-2-02 | I1 | Surface treatment - Sol. 'A' FIG. 1 | 4.88 | Pass | 3 | 40.2 |
| EX-2-03 | I1 | Surface treatment - Sol. 'A' FIG. 1 | 6.10 | Pass | 4 | 71.2 |
| EX-2-04 | I1 | Surface treatment - Sol. 'A' FIG. 1 | 6.71 | Pass | 5 | 97.0 |
| EX-2-05 | I1 | Surface treatment - Sol. 'A' FIG. 2 | 4.88 | Pass | 0 | 46.5 |
| EX-2-06 | I2 | Surface treatment - Sol. 'A' FIG. 1 | 3.66 | Fail | 13 | 19.4 |

Note:
Sample was split into two large pieces upon impact

TABLE 9

Impact Testing -bimodal-high

| | Impact Drop Height (meter) | | | |
|---|---|---|---|---|
| Example | 2.5-cm Tear | 10-cm Tear | Penetration | Average* Glass Loss (gms.) |
| CE- XXX (Control) | 3.66 | 5.49 | 6.10 | 54 |
| EX-YYY (Grid) | 3.66 | 6.10 | 6.40 | 55 |
| CE- ZZZ (Primer) | 3.05 | 4.88 | 5.49 | 49 |

*Note:
Average glass loss was calculated for each sample set from one sample laminate each impacted at 2.44, 3.66, 4.27, 4.88 and 5.49 meter drop heights

Having now fully described this invention, it will be appreciated by those skilled in the art that the same can be performed within a wide range of equivalent parameters, concentrations, and conditions without departing from the spirit and scope of the invention and without undue experimentation.

The invention claimed is:

1. An adhesive polymeric interlayer (API), comprising:
a first polymeric material,
a first surface and a second surface,
a first discrete zone on the first surface with a maximum mean peel adhesion, and
a second discrete zone on the first surface with a minimum mean peel adhesion greater than about 0.01 kJ/m$^2$,
wherein the maximum mean peel adhesion is at least about 2 times greater than the minimum mean peel adhesion,
wherein both the first discrete zone and the second discrete zone have mean peel adhesion of from about 0.5 to about 7.0 KJ/m$^2$.

2. The API as recited in claim 1, wherein one of said first or second discrete zones comprises the first polymeric material, and the other of the first and second discrete zones comprises a first material chemically and/or physically different from the first polymeric material.

3. The API as recited in claim 2, wherein the first material is characterized by: (i) a molecular weight different than that of the first polymeric material, (ii) a crystallinity different than that of the first polymeric material, (iii) a density different than that of the first polymeric material, (iv) a glass transition temperature different than that of the first polymeric material, (v) a melt flow index different than that of the first polymeric material, or (vi) a combination of one or more of said characteristics.

4. The API as recited in claim 1, wherein said first and/or second discrete zones are distributed in an ordered pattern.

5. The API as recited in claim 1, wherein said first and/or second discrete zones are distributed stochastically.

6. The API as recited in claim 1, wherein one of said first or second discrete zones is substantially continuous, and the other of said first or second discrete zones is characterized by:
(i) a regular shape, and/or
(ii) a stochastic or a random shape.

7. The API as recited in claim 1, wherein the weight content of one of said first and second discrete zones as a percentage of the total of the API is in the range of from about 0.00001% to about 30%.

8. The API as recited in claim 1, wherein the maximum mean peel adhesion is from about 2 times to about 250 times greater than the minimum mean peel adhesion.

9. The API as recited in claim 1, wherein the first discrete zone or the second discrete zone has a mean peel adhesion of from about 0.01 to about 12.0 KJ/m$^2$.

10. The API as recited in claim 1, wherein said first polymeric material comprises a polyvinylacetal, an ionomer, a thermoplastic elastomer, an ethyl vinylacetate, or combinations thereof.

11. The API as recited in claim 1, wherein said first polymeric material comprises a polyvinylacetal, an ionomer, a thermoplastic elastomer, a silane, an ethyl vinylacetate, or combinations thereof.

12. The API as recited in claim 11, wherein the second discrete zone is the first polymeric material, and the first polymeric material is an ionomer resin.

13. The API as recited in claim 11, wherein the first discrete zone is the first polymeric material, and the first polymeric material is a polyvinylacetal.

14. The API as recited in claim 11, further comprising an adhesion modifying agent.

15. The API as recited in claim 14, wherein the adhesion modifying agent is present in a range of from about 0.001% to about 75% by weight of the first polymeric material.

16. The API as recited in claim 1, wherein one of the first or second discrete zones has a thickness of from about 0.001 mm to about 10.0 mm.

17. The API as recited in claim 1, wherein each discrete zone is shaped as a dot, a circle, a partial circle, an oval, a partial oval, a triangle, a square, a rectangle, a pentagon, a hexagon, a heptagon, or is amorphous.

18. The API as recited in claim 17, wherein an effective diameter of each discrete zone is in a range of from about 0.1 mm to about 50 mm.

19. The API as recited in claim 1, wherein the peel strength ratio of the zone with maximum peel strength ($Z_{max}$) to the zone with the minimum peel strength ($Z_{min}$), that is, ($Z_{max}/Z_{min}$) is greater than or equal to 5.

20. The API as recited in claim 19, wherein:
the API comprises the first discrete zone, the second discrete zone, and optionally one or more additional discrete zones;
all of said discrete zones have different peel strength,
two or more of said discrete zones have the same peel strength, or
two or more of said discrete zones have different peel strength.

21. The API as recited in claim 6, wherein the effective diameter of the regular shaped discrete zone or the random shaped discrete zone is from about 1 multiple to about 150,000,000-multiples of the thickness of the discrete zone.

22. A laminate structure, comprising a stack of:
(i) a first glass substrate; and
(ii) API as recited in claim 1;
wherein said first glass substrate adheres to said API.

23. The laminate structure as recited in claim 22, wherein the first and second discrete zones have a surface area that is:
(i) from about 1% to about 80% of the surface area of one side of the first glass substrate;
(ii) from about 10% to about 60% of the surface area of one side of the first glass substrate;
(iii) from about 20% to about 50% of the surface area of one side of the first glass substrate;
(iv) from about 30% to about 40% of the surface area of one side of the first glass substrate;
(v) from about 5% to about 25% of the surface area of one side of the first glass substrate; or
(vi) from about 1% to about 35% of the surface area of one side of the first glass substrate.

24. The laminate structure as recited in claim 22, wherein the first discrete zone or the second discrete zone has a mean peel adhesion of:
(i) from about 0.01 to about 12.0 KJ/m$^2$;
(ii) from about 0.1 to about 4.0 KJ/m$^2$;
(iii) from about 0.5 to about 3.0 KJ/m$^2$;
(iv) from about 8.0 to about 12.0 KJ/m$^2$; or
(v) from about 9.0 to about 11.0 KJ/m$^2$.

25. The laminate structure as recited in claim 22, wherein the API comprises the first discrete zone, the second discrete zone, and optionally one or more additional discrete zones, wherein a density of said discrete zones is from 0.04 to 10,000 zones per cm$^2$.

26. A laminate structure, comprising a stack of:
(i) a first glass substrate;
(ii) API as recited in claim 1; and
(iii) a second glass substrate;
wherein said first glass substrate adheres to said second glass substrate through said API.

* * * * *